United States Patent
Yamanouchi

(10) Patent No.: US 9,287,906 B2
(45) Date of Patent: Mar. 15, 2016

(54) TRANSMISSION APPARATUS AND WIRELESS SIGNAL TRANSMISSION METHOD

(71) Applicant: Shingo Yamanouchi, Tokyo (JP)

(72) Inventor: Shingo Yamanouchi, Tokyo (JP)

(73) Assignee: NEC CORPORATION, Tokyo (JP)

(*) Notice: Subject to any disclaimer, the term of this patent is extended or adjusted under 35 U.S.C. 154(b) by 79 days.

(21) Appl. No.: 14/365,868

(22) PCT Filed: Nov. 2, 2012

(86) PCT No.: PCT/JP2012/007033
§ 371 (c)(1),
(2) Date: Jun. 16, 2014

(87) PCT Pub. No.: WO2013/094106
PCT Pub. Date: Jun. 27, 2013

(65) Prior Publication Data
US 2014/0348266 A1     Nov. 27, 2014

(30) Foreign Application Priority Data
Dec. 19, 2011   (JP) .................. 2011-277032

(51) Int. Cl.
*H04B 1/04* (2006.01)
*H04L 25/03* (2006.01)
(Continued)

(52) U.S. Cl.
CPC .............. *H04B 1/0475* (2013.01); *H04L 25/02* (2013.01); *H04L 27/2614* (2013.01); *H04L 27/2621* (2013.01); *H04B 2001/0416* (2013.01); *H04B 2201/70706* (2013.01); *H04L 27/3411* (2013.01)

(58) Field of Classification Search
CPC ............ H04L 27/2614; H04L 27/2621; H04L 27/3411; H04L 27/2053; H04L 27/2601; H04L 27/2618; H04L 27/362; H04B 2201/70706

USPC ............ 455/102, 103, 115.1, 114.3; 375/296, 375/297

See application file for complete search history.

(56) References Cited

U.S. PATENT DOCUMENTS 5,302,914 A * 4/1994 Arntz .................... H03F 1/34 330/124 R
5,349,300 A * 9/1994 Matz .................... H03G 3/3042 330/107

(Continued)

FOREIGN PATENT DOCUMENTS

JP    H05-130191 A    5/1993
JP    2000-138645 A   5/2000

(Continued)

OTHER PUBLICATIONS

Nobuhiko Miki et al., "Carrier Aggregation Realizing Increased Bandwidth in LTE-Advanced", NTT DoCoMo Technical Journal, vol. 18, No. 2, pp. 12-21.

(Continued)

*Primary Examiner* — Duc M Nguyen

(57) ABSTRACT

RF input signals having mutually different carrier frequencies are input from a signal generator to a power amplifier, the power amplifier amplifying the RF input signals and outputting them as RF output signals. The signal generator has a function for reducing the PAR of the waveform combining the RF input signals. The PAR reduction of the combined waveform of the RF input signals is performed through a control on the transmission timing of the RF input signals via a delay adjuster installed in the signal generator, or through an amplitude constraint on the RF input signals via a limiter installed in the signal generator. In this manner, a transmission device with improved power efficiency is provided.

12 Claims, 43 Drawing Sheets

(51) Int. Cl.
 *H04L 27/26* (2006.01)
 *H04L 25/02* (2006.01)
 *H04L 27/34* (2006.01)

(56) References Cited

U.S. PATENT DOCUMENTS

| | | | | | |
|---|---|---|---|---|---|
| 5,381,449 | A * | 1/1995 | Jasper | ............... | H04L 5/0048 332/103 |
| 5,710,990 | A * | 1/1998 | Long | ............... | H01Q 3/26 455/103 |
| 7,110,727 | B2 * | 9/2006 | Dekker | ............... | H04B 1/0483 455/115.1 |
| 8,098,744 | B2 * | 1/2012 | Chen | ............... | H04L 27/2614 375/260 |
| 8,472,535 | B2 * | 6/2013 | Wallen | ............... | H04L 27/2614 375/260 |
| 8,582,687 | B2 * | 11/2013 | Terry | ............... | H04L 27/2615 370/208 |
| 8,817,900 | B2 * | 8/2014 | McGowan | ......... | H04L 27/2614 330/149 |
| 8,824,574 | B2 * | 9/2014 | McCallister | ....... | H04L 27/2623 375/260 |
| 2005/0111576 | A1 * | 5/2005 | Anvari | ............... | H04L 27/2614 375/297 |
| 2006/0247898 | A1 * | 11/2006 | Cha | ............... | H04L 27/2623 702/188 |
| 2014/0235186 | A1 * | 8/2014 | Belot | ............... | H04B 1/406 455/125 |

FOREIGN PATENT DOCUMENTS

| | | |
|---|---|---|
| JP | 2002-523963 A | 7/2002 |
| JP | 2002-305489 A | 10/2002 |
| JP | 2003-46480 A | 2/2003 |
| JP | 2004-32450 A | 1/2004 |
| JP | 2004-289428 A | 10/2004 |
| JP | 3714917 B2 | 11/2005 |
| JP | 2008-252256 A | 10/2008 |
| JP | 2008-294519 A | 12/2008 |
| JP | 4354649 B2 | 10/2009 |
| WO | 2010/047512 A2 | 4/2010 |
| WO | 2010/087214 A1 | 8/2010 |
| WO | 2010/148530 A1 | 12/2010 |

OTHER PUBLICATIONS

Paolo Colantonio et al., "A Design Technique for Concurrent Dual-Band Harmonic Tuned Power Amplifier", IEEE Transactions on Microwave Theory and Techniques, vol. 56, No. 11, Nov. 2008, pp. 2545-2555.

Shouhei Kousai et al. "An Octave-Range, Watt-Level, Fully-Integrated CMOS Switching Power Mixer Array for Linearization and Back-Off-Efficiency Improvement", IEEE Journal of Solid-State Circuits, vol. 44, No. 12, Dec. 2009, pp. 3376-3392.

Paul Saad et al., "Design of a Highly Efficient 2-4-GHz Octave Bandwidth GaN-HEMT Power Amplifier", IEEE Transactions on Microwave Theory and Techniques, vol. 58, No. 7, Jul. 2010, pp. 1677-1685.

Kin-Lu Wong et al., "On-Board Printed Coupled-Fed Loop Antenna in Close Proximity to the Surrounding Ground Plane for Penta-Band WWAN Mobile Phone", IEEE Transactions on Antennas and Propagation, vol. 59, No. 3, Mar. 2011, pp. 751-757.

German Cortes-Medellin, "Non-Planar Quasi-Self-Complementary Ultra-Wideband Feed Antenna", IEEE Transactions on Antennas and Propagation, vol. 59, No. 6, Jun. 2011, pp. 1935-1944.

International Search Report for PCT Application No. PCT/JP2012/007033, mailed on Feb. 8, 2013.

* cited by examiner

US 9,287,906 B2

TRANSMISSION APPARATUS AND WIRELESS SIGNAL TRANSMISSION METHOD

This application is a National Stage Entry of PCT/JP2012/007033 filed Nov. 2, 2012, which claims priority from Japanese Patent Application 2011-277032 filed Dec. 19, 2011, the contents of all of which are incorporated herein by reference, in their entirety.

TECHNICAL FIELD

The present invention relates to a transmission apparatus and a wireless signal transmission method. In particular, the present invention relates to a transmission apparatus and a wireless signal transmission method which are used for wireless communications and with which RF (Radio Frequency) signals on a plurality of bands are transmitted.

BACKGROUND ART

A transmission-purpose power amplifier used for a wireless communication device particularly, from among other constituent parts of the wireless communication device, consumes power. Accordingly, the significant challenge in developing wireless communication devices is to improve the power efficiency of a power amplifier (PA). In recent years, the dominating communication standards are linear modulation for the purpose of improving spectral efficiency. This linear modulation has small tolerance for signal distortion.

Accordingly, in order to maintain the linearity, the average output power is set such that the instantaneous maximum output (peak) power becomes equal to or smaller than the saturation output of a power amplifier (PA). That is, as the ratio between the peak power and the average power in an amplified signal (Peak-to-Average Ratio, hereinafter abbreviated as PAR) increases, the average output power must be set to a value much lower than the saturation output of the power amplifier (PA) in order to maintain the linearity.

However, a power amplifier (PA) in general exhibits the following characteristic: as the average output power is reduced to assume a lower proportion relative to the saturation output power, the ratio between the DC supply power of the power amplifier (PA) and the obtained transmission power (the power efficiency) is reduced. A reduction in the power efficiency hinders energy saving.

The PAR of a communication signal has a unique value for each communication standard. With recent high speed wireless communications such as CDMA (Code Division Multiple Access), WLAN (Wireless Local Area Network), digital terrestrial television broadcasting, and LTE (Long Term Evolution), the PAR assumes a great value of about a few dB to ten-odd dB. Such a great PAR causes a great reduction in the power efficiency of the power amplifier (PA).

As means for solving the problem of a reduction in the power efficiency attributed to the great PAR, there is a method in which a communication signal is subjected to processing for reducing the PAR, and thereafter the communication signal is input to a power amplifier (PA).

An exemplary scheme for reducing the PAR of a communication signal is disclosed in Patent Literature 1: Japanese Unexamined Patent Application Publication No. 2000-138645 "Multi-Carrier Transmission Circuit and Communication Device". FIG. 37 is a block configuration diagram showing the block configuration of a transmission apparatus disclosed in Patent Literature 1, in which a structure for reducing the PAR of a communication signal is shown. Patent Literature 1 particularly provides a scheme for reducing the PAR of a multi-carrier signal intended for use in the CDMA technique. In FIG. 37, channel signals of respective carriers are input to input terminals 1-1, 1-2, . . . , 1-$n$, respectively. The channel signals are upconverted to respective carrier frequencies by modulators 5-1, 5-2, . . . , and 5-$n$. Thereafter, the signals are combined at an adding circuit 6 and output as a multi-carrier signal from the output terminal 8. The multi-carrier signal is input from the output terminal 8 to a power amplifier (PA: not shown in FIG. 37).

In connection with the multi-carrier signal, the peak is enhanced when the carrier signals are in phase, whereas the peak is reduced when the carrier signals are in opposite phase. Accordingly, with the transmission apparatus shown in FIG. 37, the phase of each of the carrier signals is detected by phase detectors 4-1, 4-2, . . . , 4-$n$, and output to a control circuit 7. Thus, in the situation where the carrier signals are in phase, the control circuit 7 controls variable attenuators 2-1, 2-2, . . . , 2-$n$ such that the variable attenuators 2-1, 2-2, . . . , 2-$n$ attenuate the channel signals. Thus, a reduction in the PAR of the combined multi-carrier signal is realized. In this manner, with the transmission apparatus disclosed in Patent Literature 1, as the phase information is acquired, an accurate PAR reduction can be achieved.

Similarly to Patent Literature 1, an exemplary scheme for reducing the PAR of a communication signal by controlling the phase of each carrier signal is disclosed in Patent Literature 2: Japanese Unexamined Patent Application Publication No. H05-130191 "Method for Reducing Peak/Average Value Ratio by Controlling Phase of Multi-Sub-Channel Signal". FIG. 38 is a block configuration diagram showing the block configuration of a transmission apparatus disclosed in Patent Literature 2. Similarly to Patent Literature 1, in Patent Literature 2 the structure for reducing the PAR of a communication signal is shown.

In the structure of a transmission apparatus 80 disclosed in Patent Literature 2 shown in FIG. 38, serial data input to a serial/M parallel converter 51 is converted into data signals of lower speeds, and output to 16 QAM/symbol converters 52. The data signals output from the serial/M parallel converters 51 pass through 16 QAM/symbol converters 52, pilot symbol inserters 53, low-pass filters 54, quadrature modulators 56, and phase shifters 86, and combined at a multiplexer 57, to be output to a power amplifier 58.

In the transmission apparatus 8 shown in FIG. 38, when the data signals respectively output from the phase shifters 86 are in phase, the peak value of the data signal combined at the multiplexer 57 becomes the maximum. Accordingly, in order to prevent the data signals respectively output from the phase shifters 86 from becoming in-phase, the phase of each of the data signals is adjusted at each of the phase shifters 86. Thus, the peak value of the data signal combined at the multiplexer 57 can be reduced.

Further, Patent Literature 3: Japanese Patent No. 3714917 "Peak Limiter and Multi-Carrier Amplifier Apparatus" discloses a PAR reduction scheme in which a simplified circuit structure is achieved in exchange for reduced accuracy, which is attributed to lack of acquisition of phase information. FIG. 39 is a block configuration diagram showing the block configuration of a transmission apparatus disclosed in Patent Literature 3, in which, similar to Patent Literature 1, the structure for reducing the PAR of a communication signal is shown. Patent Literature 3 particularly provides a scheme for reducing the PAR of a multi-carrier signal intended for use in the CDMA technique.

An instantaneous amplitude value $a_1(t)$ of an input signal 1 ($I_1(t)$, $Q_1(t)$) is generally given by:

$$a_1(t)=\text{sqrt}[\{I_1(t)\}^2+\{Q_1(t)\}^2]$$

Here, sqrt [ ] is a function providing a square root. The instantaneous power $P_1(t)$ of the input signal 1 is proportional to $\{a_1(t)\}^2$. Further, an instantaneous amplitude value $a_2(t)$ of an input signal 2 ($I_2(t)$, $Q_2(t)$) is given by the following, similarly to the input signal 1:

$$a_2(t)=\text{sqrt} [I_2(t)]^2+\{Q_2(t)\}^2]$$

The instantaneous power $P_2(t)$ of the input signal 2 is proportional to $\{a_2(t)\}^2$.

In the peak limiter 11 shown in FIG. 39, an instantaneous power detecting unit 12 detects, as the approximating instantaneous power of a multi-carrier signal, combined power of the input signal 1 and the input signal 2, which is $P(t)=P_1(t)+P_2(t) \propto \{a_1(t)\}^2+\{a_2(t)\}^2$. In practice, accurate instantaneous power of the multi-carrier signal is, as mentioned in Patent Literature 1, depends on not only the amplitudes $a_1(t)$ and $a_2(t)$ but also phase $\theta_1(t)=\arctan(Q_1(t)/I_1(t))$ of the input signal 1 and phase $\theta_2(t)=\arctan(Q_2(t)/I_2(t))$ of the input signal 2.

However, in Patent Literature 3, since the instantaneous power is approximately derived solely by the amplitudes $a_1(t)$ and $a_2(t)$, the phase detector is omitted, whereby the simplified circuit is achieved. Further, when the instantaneous power detected by the instantaneous power detecting unit 12, i.e., $P(t)=P_1(t)+P_2(t) \propto \{a_1(t)\}^2+\{a_2(t)\}^2$, exceeds a predetermined peak threshold value, a limiter unit 14 suppresses the signal amplitudes, to thereby reduce the PAR of the signal. The signal whose PAR is reduced is output as an output signal 21 and an output signal 22. The output signal 21 and the output signal 22 are up-converted to the carrier frequencies by a modulator (not shown in FIG. 39), and input to a power amplifier (PA: not shown in FIG. 39).

Similarly to Patent Literature 3, Patent Literature 4: Japanese Patent No. 4354649 "Time Offset Technique for Increasing the Capacity of a CDMA System" also discloses a PAR reduction scheme in which a simplified circuit structure is achieved in exchange for reduced accuracy, which is attributed to lack of acquisition of phase information. Patent Literature 4 also provides a scheme for reducing the PAR of a multi-carrier signal particularly intended for use in the CDMA technique. FIG. 40 is a schematic diagram showing the concept of the scheme for reducing the PAR of a communication signal disclosed in Patent Literature 4. FIG. 40 shows transmission waveforms of a CDMA system 70, in which a first transmission waveform 74A and a second transmission waveform 74B are transmitted together.

In the CDMA system 70, pilot portions 78 have particularly high signal power. In the case where the first transmission waveform 74A and the second transmission waveform 74B are transmitted at the same timing, the pilot portion 78 which is the high power portion of the first transmission waveform 74A and that of the second transmission waveform 74B overlap each other at the same timing. Accordingly, the peak of the signal power may be disadvantageously increased.

Accordingly, as shown in FIG. 40, allowing the send-out timing of the second transmission waveform 74B to be displaced by a time-offset of t0, the pilot portion 78 which is the high power portion of the first transmission waveform 74A and that of the second transmission waveform 74B are prevented from temporarily overlapping each other, whereby the peak of the signal power is reduced. Note that, in Patent Literature 4, similarly to Patent Literature 3, the peak transmission power is also estimated by the sum of power of the transmission waveforms.

Further, similarly to Patent Literature 3, a PAR reduction scheme in which no phase information is acquired is disclosed in Patent Literature 5: Japanese Unexamined Patent Application Publication No. 2002-305489 "Code Multiplex Signal Transmission Apparatus". FIG. 41 is a circuit diagram showing a carrier multiplexing circuit that reduces the PAR of a communication signal disclosed in Patent Literature 5.

A carrier multiplexing circuit 50 shown in FIG. 41 includes code multiplex signal transmitting units $51_1$ to $51_n$ and an adding unit 52a. The code multiplex signal transmitting units $51_1$ to $51_n$ respectively output RF signals on respective carrier frequencies to the adding unit 52a. The adding unit 52a combines the RF signals on the respective carrier frequencies and input the combined signal to the power amplifier 53a.

Note that the code multiplex signal transmitting units $51_1$ to $51_n$ each include a code multiplex signal generating unit 61, a peak suppressing unit 62, a delay unit 63, a filter 64, a frequency shifting unit 65, and a transmission circuit 66.

In the carrier multiplexing circuit 50, the amplitudes of input/output signals $x_1$ to $x_n$ of the delay units 63 in the respective code multiplex signal transmitting units $51_1$ to $51_n$ are sensed and compared by a comparator $56a_2$ in an amplitude control unit 56a, and a selector $56a_3$ in the amplitude control unit 56a selects a signal having the great amplitude peak out of the signals $x_1$ to $x_n$. The signal selected by the selector $56a_3$ is multiplied by a suppression coefficient by multiplier units $56a_{11}$ to $56a_{1n}$. By the multiplication by the suppression coefficient, out of the RF signals output from the code multiplex signal transmitting units $51_1$ to $51_n$, the RF signal with the great amplitude peak has its amplitude suppressed. Accordingly, the amplitude peak value of the combined RF signal output from the adding unit 52a is also suppressed.

In the foregoing, the conventional techniques for reducing the PAR of a communication signal are summarized. The conventional techniques for reducing the PAR of a communication signal as described above are intended to be used in the situation where frequencies of respective carrier signals are close to one another, such as the multi-carrier CDMA communication scheme, i.e., the situation where the frequency difference $\Delta f$ between the carrier frequencies and the modulation bandwidth $f_{BB}$ of the carrier signals become substantially equivalent ($\Delta f \cong f_{BB}$).

On the other hand, as disclosed in Non-Patent Literature 1: Nobuhiko Miki et al. "Carrier Aggregation Realizing Increased Bandwidth in LTE-Advanced", the Carrier Aggregation (CA) technique in which a plurality of band fragments are used as gathered is employed in recent communication standards, in order to realize wireless communications of higher speeds. The CA technique enables a plurality of bands to be bundled to secure a wide band, to thereby increase the transmission rates.

Further, in the Inter-band Non-contiguous CA mode ($\Delta f >> f_{BB}$) in which the carrier frequencies are fully separated from one another, the communication stability can be improved by establishing simultaneous communications at a plurality of carrier frequencies differing in the propagation characteristic. Further, application of the CA technique enables communications supporting the case where the band allocation among a plurality of service providers is intermittent, or where a band is shared.

FIG. 42 is a block configuration diagram showing the block configuration of a transmitter disclosed in Patent Literature 6: Japanese Unexamined Patent Application Publication No.

2004-289428 "Multiband Power Amplifier Module". In the transmitter shown in FIG. 42, a power amplifier (PA) 311, a power amplifier 321, and a power amplifier 331 amplify and output a communication system signal on a carrier frequency $f_1$, whereas a power amplifier PA 312, a power amplifier 322 and a power amplifier 332 amplify and output a communication system signal on a carrier frequency $f_2$. The output signals from the power amplifier 331 and the power amplifier 332 are combined at matching circuits 251 and 252 and a multiplexer circuit 60, and the combined signal is output to an output terminal 41.

FIG. 43 shows an explanatory diagram that describes the transfer function from an output terminal 51b of the power amplifier 331 in the transmitter shown in FIG. 42 to the output terminal 41 and the transfer function from an output terminal 52b of the power amplifier 332 to the output terminal 41. As shown in FIG. 43, only the RF signal on the frequency $f_1$ is transmitted from the output terminal 51b to the output terminal 41, and only the RF signal on the frequency $f_2$ is transmitted from the output terminal 52b to the output terminal 41. Accordingly, the RF signal on the frequency $f_1$ output from the power amplifier 331 will not establish a sneak path to the power amplifier 332. Also, the RF signal on the frequency $f_2$ output from the power amplifier 332 will not establish a sneak path to the power amplifier 331.

Thus, the power loss attributed to any sneak path of the RF signals is suppressed. In the transmitter of the conventional technique disclosed in Patent Literature 6, since the RF signals differing in frequency are individually amplified and output by the two power amplifiers 331 and 332, two RF signals differing in frequency can be simultaneously transmitted.

CITATION LIST

Patent Literature

Patent Literature 1: Japanese Unexamined Patent Application Publication No. 2000-138645 (pp. 4-6)
Patent Literature 2: Japanese Unexamined Patent Application Publication No. H05-130191 (pp. 4-5)
Patent Literature 3: Japanese Patent No. 3714917 (pp. 5-8)
Patent Literature 4: Japanese Patent No. 4354649 (pp. 7-13)
Patent Literature 5: Japanese Unexamined Patent Application Publication No. 2002-305489 (pp. 4-8)
Patent Literature 6: Japanese Unexamined Patent Application Publication No. 2004-289428 (pp. 4-7)

Non Patent Literature

Non Patent Literature 1: Nobuhiko Miki et al. "Carrier Aggregation Realizing Increased Bandwidth in LTE-Advanced", NTT DoCoMo Technical Journal, Vol. 18, No. 2
Non Patent Literature 2: P. Colantonio et al. "A Design Technique for Concurrent Dual-Band Harmonic Tuned Power Amplifier", IEEE Transactions on Microwave Theory and Techniques, vol. 56, no. 11, pp. 2545-2555, 2008
Non Patent Literature 3: S. Kousai et al. "An Octave-Range, Watt-Level, Fully-Integrated CMOS Switching Power Mixer Array for Linearization and Back-Off-Efficiency Improvement", IEEE Journal of Solid-State Circuits, vol. 44, no. 12,
Non Patent Literature 4: P. Saad et al. "Design of a Highly Efficient 2-4 GHz Octave Bandwidth GaN-HEMT Power Amplifier", IEEE Transactions on Microwave Theory and Techniques, vol. 58, no. 7, pp. 1677-1685, 2010
Non Patent Literature 5: K. L. Wong et al. "On-Board Printed Coupled-Fed Loop Antenna in Close Proximity to the Surrounding Ground Plane for Penta-Band WWAN Mobile Phone", IEEE Transactions on Antennas and Propagation, vol. 59, no. 3, pp. 751-757, 2011
Non Patent Literature 6: G. Cortes-Medellin, "Non-Planer Quasi-Self-Complementary Ultra-Wideband Feed Antenna", IEEE Transactions on Antennas and Propagation, vol. 59, no. 6, pp. 1935-1944, 2011

SUMMARY OF INVENTION

Technical Problem

The following analysis of the present invention will be given.

With the conventional techniques disclosed in Patent Literatures 1 and 2, though the peak power of a communication signal can be detected and controlled highly precisely, an increase in the circuit scale incurred by addition of the phase detecting function and an increase in costs associated therewith are disadvantageous. On the other hand, with the conventional techniques disclosed in Patent Literature 3 to 5, though a simplified circuit and reduced costs are achieved, the precision in peak power detection and control is reduced by omission of the phase detecting function.

Further, with the conventional techniques disclosed in Patent Literature 1 to 5, since they are intended to be used for the multi-carrier communication system ($\Delta f \cong f_{BB}$), there is a trade-off relation between the precision in detection and control of the peak power of a communication signal and the simplified circuit scale and reduced costs, as described above. A problem to be solved by the present invention is how to achieve both the accuracy in detection and control of the peak power of a communication signal and the simplified circuit scale and reduced costs, in connection with a transmission apparatus supporting the Inter-band Non-contiguous CA mode ($\Delta f \gg f_{BB}$).

Further, in the multi-carrier communication system ($\Delta f \cong f_{BB}$) which is intended in the conventional techniques disclosed in Patent Literatures 1 to 5, the frequencies of two carrier signals are satisfactorily close to each other. Accordingly, the frequency dependence of the characteristics of a power amplifier (PA) between two carrier signal frequencies is satisfactorily small. That is, the gain difference of the power amplifier (PA) with two carrier frequencies when two carrier signals are simultaneously input to the power amplifier (PA), the dependence of the characteristics of the power amplifier (PA) such as saturation output and P1 dB (1 dB compression point) on the input power ratio between the two carrier signals are so small that they are negligible.

Accordingly, the conventional PAR reduction techniques disclosed in Patent Literature 1 to 5 do not take into consideration the gain difference of a power amplifier (PA) between two carrier frequencies, or variations in the characteristics such as the gain, saturation output, P1dB and the like of the power amplifier (PA) attributed to the input power ratio between two carrier signals. That is, in the conventional PAR (peak-to-average power ratio) reduction techniques disclosed in Patent Literature 1 to 5, the processes are all closed in the signal source at the stage before the power amplifier (PA). Further, the conventional PAR (peak-to-average power ratio) reduction techniques do not include a mechanism for sensing the power amplifier (PA) characteristics, and a mechanism for correcting a signal input to the power amplifier (PA) based on the sensed power amplifier (PA) characteristics.

On the other hand, with the Inter-band Non-contiguous CA mode ($\Delta f \gg f_{BB}$), the frequencies of two carrier signals are greatly separated from each other. Accordingly, the frequency dependence of the characteristics of the power amplifier (PA) between the frequencies of two carrier signals is so great that it is not negligible. For example, the gain difference of the power amplifier (PA) with two carrier frequencies when two carrier signals are simultaneously input to the power amplifier (PA) is generally so great that it is not negligible.

Accordingly, in connection with the PAR (peak-to-average power ratio) reduction technique supporting the Inter-band Non-contiguous CA mode Of $\gg f_{BB}$), it is necessary to take into consideration the gain difference of the power amplifier (PA) with two carrier frequencies, and dependence of the characteristics of the power amplifier (PA) such as the saturation output, P1dB and the like on the input power ratio of the two carrier signals. This is because, when variations in the characteristics are not taken into consideration, detection and control of the peak power are not performed properly. Then, what results is a problem that the peak power of a communication signal is set to exceed the saturation output of the power amplifier (PA), or a problem that the peak power of a communication signal is set excessively lower than the saturation output of the power amplifier (PA), resulting in an undesired reduction in power efficiency.

Object of Present Invention

In order to solve the problems described above, an object of the present invention is to provide, in connection with a transmission apparatus supporting the Inter-band Non-contiguous CA mode ($\Delta f \gg f_{BB}$), means for sensing the frequency dependence of the characteristics of a power amplifier (PA) with a plurality of frequencies of carrier signals as described above, and properly detecting and controlling the peak power of a communication signal based on the result of sensing the frequency dependence of the characteristics of the power amplifier (PA).

Solution to Problems

In order to solve the problems described above, a transmission apparatus and a wireless signal transmission method of the present invention employ the following characteristic structures.

A transmission apparatus according to one aspect of the present invention includes: at least a signal generator that generates RF (Radio Frequency) signals on a plurality of carrier frequency bands to be transmitted, and a power amplifier that amplifies the RF signals from the signal generator. The signal generator is characterized by having a PAR reducing function of reducing a PAR (Peak-to-Average Ratio) that represents a ratio between a peak value and an average value in a combined amplitude obtained as a result of calculation in which an amplitude square value of the RF signal at each carrier frequency band is weighted with a specified gain and added with each other, the specified gain being specified as appropriate for each carrier frequency band.

In the transmission apparatus according to the present invention, the signal generator may have, as the PAR reducing function, a function of setting a send-out timing of the RF signals to a timing specified for each of the carrier frequency bands.

In the transmission apparatus according to the present invention, the signal generator may have, as the PAR reducing function, a function of limiting amplitude values of the RF signals to be equal to or smaller than a specified threshold value previously specified for each of the carrier frequency bands.

Moreover, in the transmission apparatus according to the present invention, as the specified gain value, a gain value of the power amplifier at each of the carrier frequency bands may be employed.

A wireless signal transmission method according to another aspect of the present invention is a wireless signal transmission method for generating RF (Radio Frequency) signals on a plurality of carrier frequency bands to be transmitted, and sending out the RF signals via a power amplifier, the wireless signal transmission method being characterized by including: a PAR (Peak-to-Average Ratio) reducing step of reducing a PAR that represents a ratio between a peak value and an average value in a combined amplitude obtained as a result of calculation in which an amplitude square value of the RF signal at each carrier frequency band is weighted with a specified gain and added with each other, the specified gain being specified as appropriate for each carrier frequency band.

The wireless signal transmission method according to the present invention includes as the reducing PAR, a function of setting a send-out timing of the RF signal to a timing specified for each of the carrier frequency bands.

Moreover, the wireless signal transmission method according to the present invention includes as the reducing PAR, a function of limiting amplitude values of the RF signals to be equal to or smaller than a specified threshold value previously specified for each of the carrier frequency bands.

Moreover, in the wireless signal transmission method according to the present invention, as the specified gain value, a gain value of the power amplifier at each of the carrier frequency bands may be employed.

Advantageous Effects of Invention

With the transmission apparatus and the wireless signal transmission method of the present invention, since the transmission apparatus includes means for reducing the PAR (peak-to-average power ratio) of input RF (Radio Frequency) signals, it becomes possible to achieve the effect of providing a transmission apparatus including a power amplifier that supports the CA (Carrier Aggregation) technique according to which signals on a plurality of frequencies can be simultaneously amplified with enhanced power efficiency.

DESCRIPTION OF EMBODIMENTS

Figure 1:
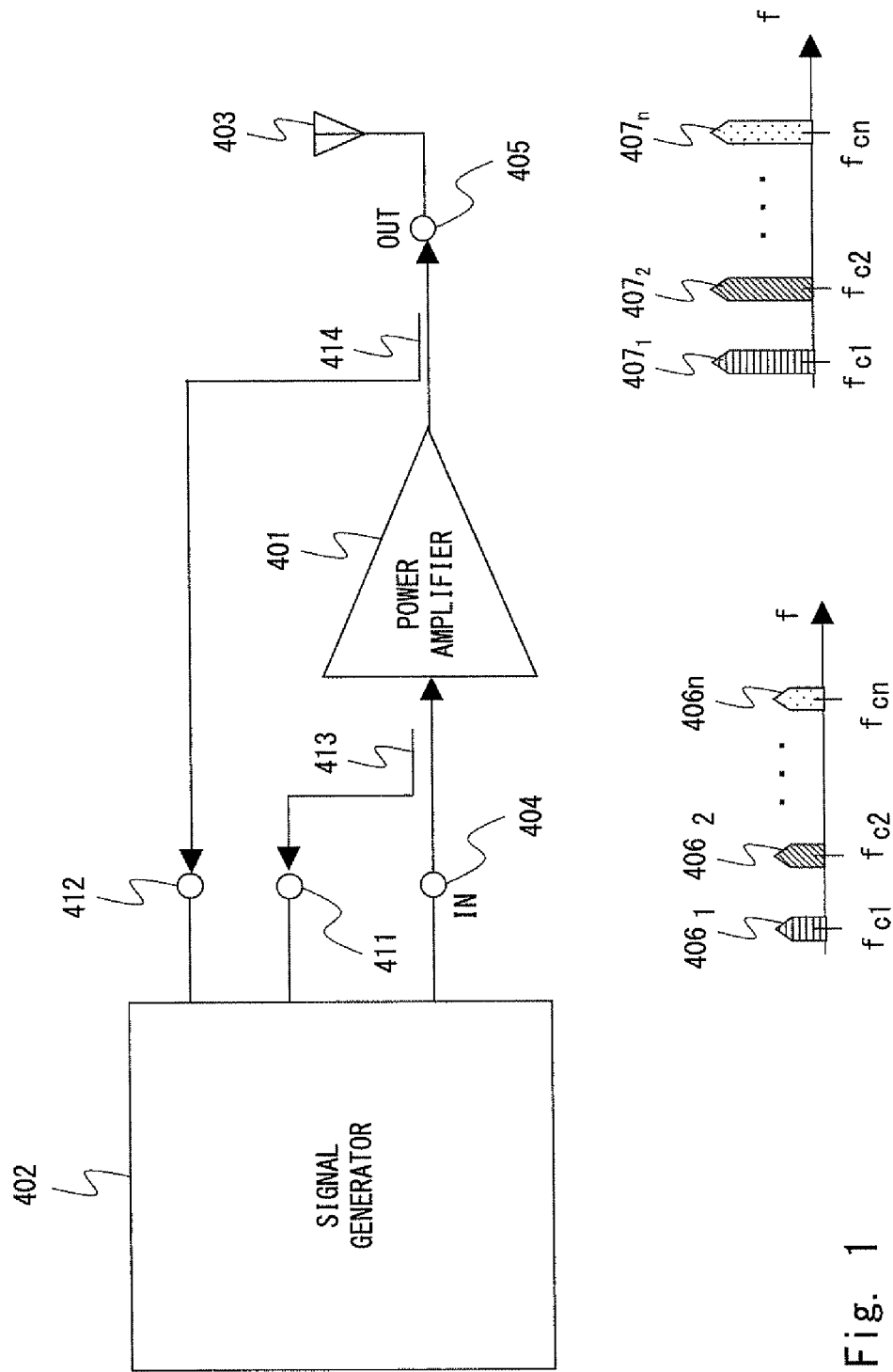
FIG. 1 is a block configuration diagram showing the block configuration of a transmission apparatus according to a first embodiment of the present invention.

In the following, with reference to the accompanying drawings, a description will be given of preferred embodiments of a transmission apparatus and a wireless signal transmission method of the present invention. Note that, in the drawings referred to in the following, identical or corresponding parts are denoted by identical reference signs, and the description thereof will not be repeated.

(Characteristics of Present Invention)

Prior to the description of embodiments of the present invention, an overview description will be given of the characteristics of the present invention. The present invention is characterized in realizing a transmission apparatus that includes a power amplifier supporting the CA (Carrier Aggregation) technique according to which signals on a plurality of frequencies generated by a signal generator can be simultaneously amplified.

That is, the present invention is directed to a transmission apparatus that transmits RF (Radio Frequency) signals on a plurality of bands. The transmission apparatus at least includes a signal generator generating transmission signals on a plurality of carrier frequencies and a power amplifier that amplifies the transmission signals from the signal generator. The signal generator is characterized by reducing the ratio between a peak value and an average value in the sum (i.e., a combined amplitude) obtained by calculation in which an amplitude square value of the transmission signal at each carrier frequency band is weighted with a specified gain and added with each other, the specified gain being specified as appropriate for each carrier frequency band. Furthermore, the signal generator senses the frequency dependence of the characteristics of the power amplifier, and properly detects and controls the peak power of a communication signal based on the result of sensing the frequency dependence of the characteristics of the power amplifier.

Thus, as a result of the above, the PAR (peak-to-average power ratio) of a transmission signal is reduced. As a result, both the accuracy of detecting and controlling the peak power of a transmission signal and the simplified circuit scale and reduced costs can be achieved, and signals on a plurality of frequencies can be simultaneously amplified.

First Embodiment

FIG. 1 is a block configuration diagram showing the block configuration of a transmission apparatus according to a first embodiment of the present invention. The transmission apparatus according to the first embodiment shown in FIG. 1 at least includes a power amplifier 401, a signal generator 402, a load 403 of the power amplifier 401, a coupler 413, and a coupler 414. The power amplifier 401 and the signal generator 402 are connected to each other via a terminal 404. Further, the power amplifier 401 and the load 403 are connected to each other via a terminal 405. The coupler 413 is arranged at the terminal 404 which is the input terminal of the power amplifier 401. Further, the coupler 413 is connected to the signal generator 402 via a terminal 411. The coupler 414 is arranged at the terminal 405 which is the output terminal of the power amplifier 401. Further, the coupler 414 is connected to the signal generator 402 via a terminal 412.

The signal generator 402 simultaneously generates RF signals $406_1, 406_2, \ldots, 406_n$ having different carrier frequencies $f_{c1}, f_{c2}, \ldots, f_{cn}$, and outputs the generated RF signals $406_1, 406_2, \ldots, 406_n$ to the terminal 404. Here, n is an integer of 2 or greater. The RF signals $406_1, 406_2, \ldots, 406_n$ are input to the power amplifier 401 via the terminal 404. The power amplifier 401 amplifies the RF signals $406_1, 406_2, \ldots, 406_n$ being input, and outputs the signals as RF signals $407_1, 407_2, \ldots, 407_n$ to the load 403 via the terminal 405.

Here, the signal generator 402 has a function of suppressing the PAR (peak-to-average power ratio) of a waveform of combined RF signals $406_1, 406_2, \ldots, 406_n$, and thereafter sending out the RF signals $406_1, 406_2, \ldots, 406_n$. That is, the RF signals $406_1, 406_2, \ldots, 406_n$ input to the power amplifier 401 are input to the signal generator 402 via the coupler 413. Further, the RF signals $407_1, 407_2, \ldots, 407_n$ output from the power amplifier 401 are input to the signal generator 402 via the coupler 414. The signal generator 402 generates RF signals $406_1, 406_2, \ldots, 406_n$ with suppressed PAR, based on the RF signals $406_1, 406_2, \ldots, 406_n$ received via the coupler 413 and the RF signals $407_1, 407_2, \ldots, 407_n$ received via the coupler 414.

Note that, in the present embodiment, the power amplifier 401 is desirably a multiband power amplifier designed to support a plurality of carrier frequencies $f_{c1}, f_{c2}, \ldots, f_{cn}$. For example, the power amplifier 401 may be a power amplifier designed to match input and output with two or more frequencies, such as the one disclosed in Non Patent Literature 2 listed in the foregoing Non Patent Literature, i.e., P. Colantonio et al. "A Design Technique for Concurrent Dual-Band Harmonic Tuned Power Amplifier" (IEEE Transactions on Microwave Theory and Techniques). Alternatively, the power amplifier 401 may be a broadband power amplifier that covers the frequency range of carrier frequencies $f_{c1}$ to $f_{cn}$.

The broadband power amplifier may be structured, for example, like the structure disclosed in Non Patent Literature 3 listed in the foregoing Non Patent Literature, i.e., S. Kousai et al. "An Octave-Range, Watt-Level, Fully-Integrated CMOS Switching Power Mixer Array for Linearization and Back-Off-Efficiency" (IEEE Journal of Solid-State Circuits) or that disclosed in Non Patent Literature 4, i.e., P. Saad et al. "Design of a Highly Efficient 2-4 GHz Octave Bandwidth GaN-HEMT Power Amplifier" (IEEE Transactions on Microwave Theory and Techniques).

Further, in the present embodiment, the load 403 is desirably a multiband antenna designed to support a plurality of carrier frequencies $f_{c1}, f_{c2}, \ldots, f_{cn}$. For example, the load 403 may be a multiband antenna designed to support two or more frequencies, such as the one disclosed in Non Patent Literature 5 listed in the foregoing Non Patent Literature, i.e., K. L. Wong et al. "On-Board Printed Coupled-Fed Loop Antenna in Close Proximity to the Surrounding Ground Plane for Penta-Band WWAN Mobile Phone" (IEEE Transactions on Antennas and Propagation). Alternatively, the load 403 may be a wideband antenna that covers the frequency range of carrier frequencies $f_{c1}$ to $f_{cn}$. The wideband antenna may be structured, for example, like the structure disclosed in Non Patent Literature 6 listed in the foregoing Non Patent Literature, i.e., G. Cortes-Medellin et al. "Non-Planer Quasi-Self-Complementary Ultra-Wideband Feed Antenna" (IEEE Transactions on Antennas and Propagation).

The transmission apparatus according to the present embodiment shown in FIG. 1 is advantageous in the following points, as compared to the transmitter of the conventional technique shown in FIGS. 42 and 43 and disclosed in Patent Literature 6.

In connection with the transmitter of the conventional technique disclosed in Patent Literature 6, one power amplifier (PA) amplifies one RF signal on one carrier frequency. Accordingly, in order to amplify RF signals on n-carrier frequencies, n-power amplifiers (PA) are required. On the other hand, in connection with the transmission apparatus according to the present embodiment shown in FIG. 1, RF signals on n-carrier frequencies are simultaneously amplified by one power amplifier (PA). Accordingly, as compared to the transmitter of the conventional technique disclosed in Patent Literature 6, in the present embodiment, a transmission apparatus can be structured with a smaller number of power amplifiers (PA). Thus, a reduction in size and costs of circuitry can be achieved as compared to the conventional technique.

Figure 42:
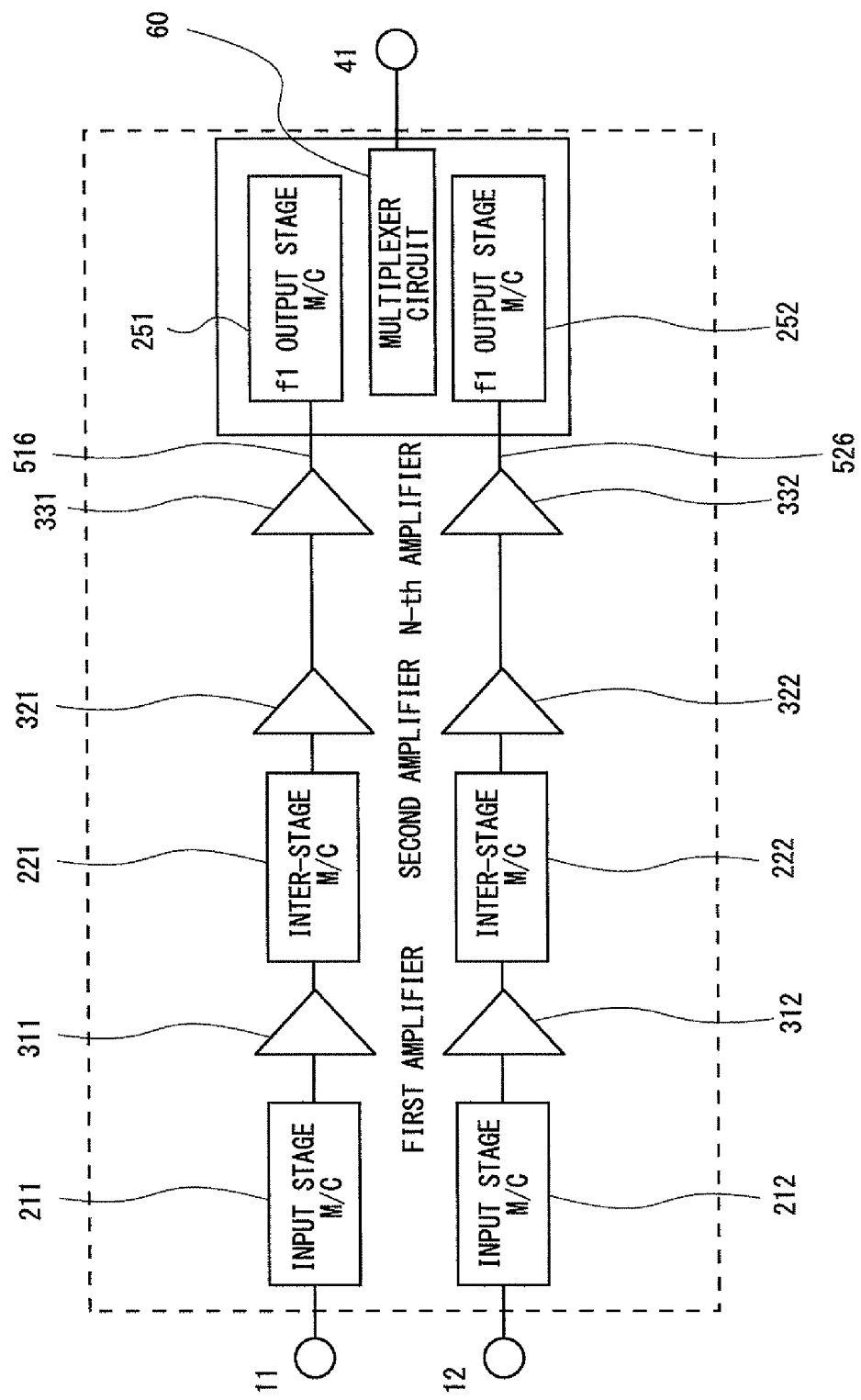
FIG. 42 is a block configuration diagram showing the block configuration of a transmitter disclosed in Patent Literature 6.
Figure 43:
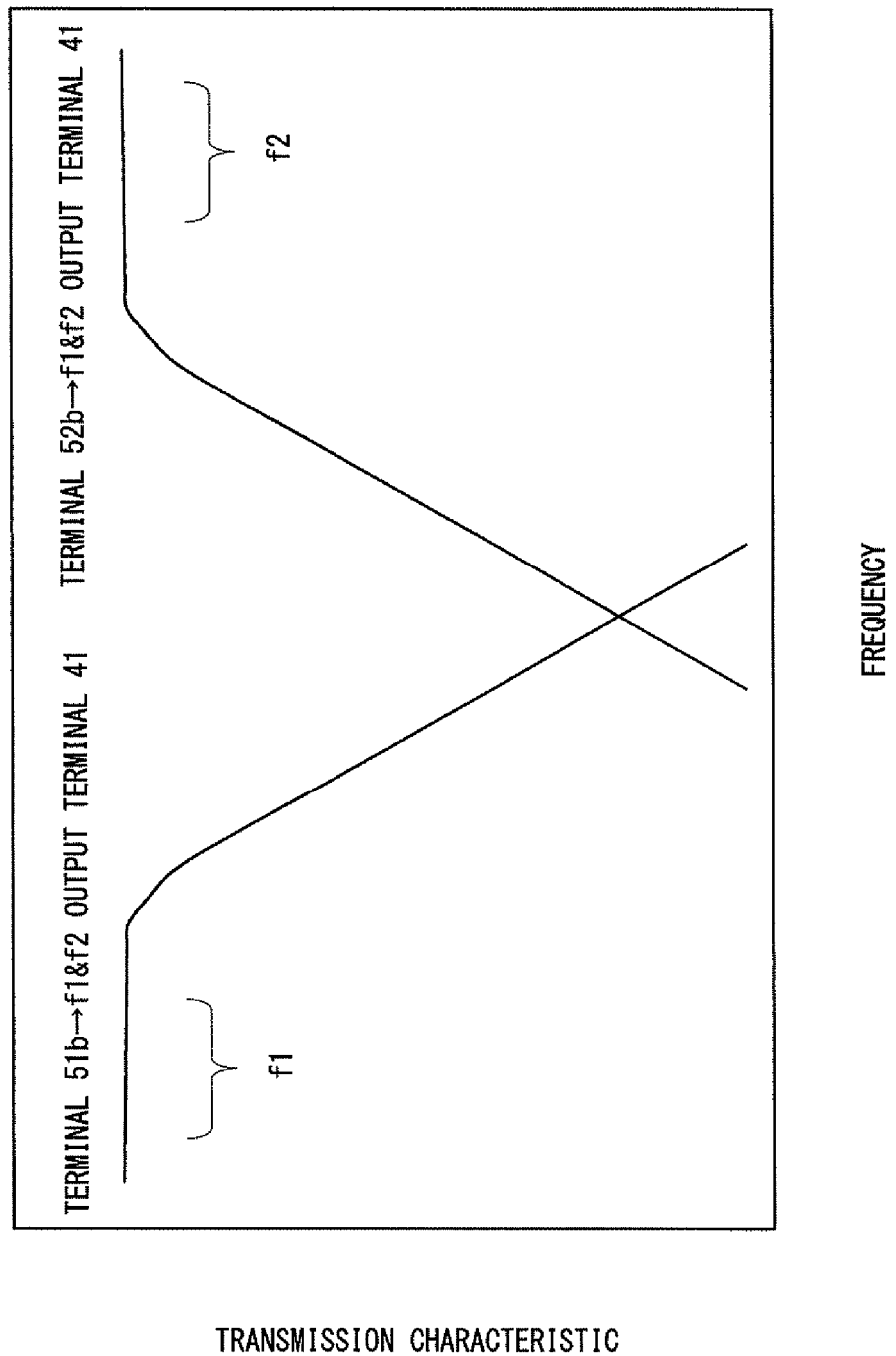
FIG. 43 shows an explanatory diagram that describes the transfer function from an output terminal of the power amplifier in the transmitter shown in FIG. 42.

Further, with the transmitter of the conventional technique disclosed in Patent Literature 6, in order to prevent RF signals from establishing sneak paths among the power amplifiers (PA), as shown in the transmission characteristic of FIG. 43, the frequency band that does not pass RF signals must be provided between different carrier frequencies in the multiplexer circuit 60 shown in FIG. 42. Thus, with the transmitter disclosed in Patent Literature 6, the frequency bands that can be used for transmission are limited. On the other hand, with the transmission apparatus according to the present embodiment shown in FIG. 1, as described above, a broadband power amplifier that covers all the carrier frequencies can be used as the power amplifier 401.

Accordingly, in the transmitter of the present embodiment, which is different from the transmitter disclosed in Patent Literature 6, it is not necessary to provide any frequency band that does not transmit RF signals between different carrier frequencies. That is, as compared to the transmitter of the conventional technique disclosed in Patent Literature 6, the transmission apparatus according to the present embodiment is advantageous in that the frequency range of RF signals that can be set is not limited.

Further, with the transmitter of the conventional technique disclosed in Patent Literature 6, the multiplexer circuit 60 combines output power of a plurality of power amplifiers (PA). In this case, combining loss of power occurs at the multiplexer circuit 60. However, with the transmission apparatus of the present embodiment, since no multiplexer circuit is used, such combined loss of power does not occur. Accordingly, as compared to the transmitter of the conventional technique disclosed in Patent Literature 6, the present embodiment can suppress power loss and enhance the power efficiency.

Next, in the following discussion, a scheme for reducing the PAR (peak-to-average power ratio) of a communication signal supporting the CA (Carrier Aggregation) technique is disclosed. Note that, in order to simplify the discussion, the case where the number of the carrier frequencies is two, namely $f_{c1}$ and $f_{c2}$, is firstly disclosed.

Firstly, the characteristic of a combined RF signal that is obtained by a combination of two RF signals differing in carrier frequency is discussed, as a factor required for the scheme for reducing the PAR of a communication signal supporting the CA technique. A combined RF signal waveform V(t) will be discussed, which is a combination of the two RF signals 407$_1$ and 407$_2$ on the carrier frequencies $f_{c1}$ and $f_{c2}$, and which is derived from the following Equation (1):

[Mathematical Expression 1]

$$V(t)=a_1(t)\cos[2\pi f_{c1}t+\theta_1(t)]+a_2(t)\cos[2\pi f_{c2}t+\theta_2(t)] \quad (1)$$

where the combined RF signal waveform V(t) has dimensions of voltage.

That is, a baseband signal $a_1(t)\exp[j\theta_1(t)]$ on a channel 1 (the carrier frequency $f_{c1}$) has the modulation bandwidth of a frequency $f_{BB1}$, and a baseband signal $a_2(t)\exp[j\theta_2(t)]$ on a channel 2 (the carrier frequency $f_{c2}$) has the modulation bandwidth of a frequency $f_{BB2}$. Further, the frequency $f_{BB1}$ and the frequency $f_{BB2}$ have substantially equivalent magnitudes.

Power P(t) in the case where the combined RF signal waveform V(t) is applied to resistance R is derived from the following Equation (2):

[Mathematical Expression 2]

$$P(t) = \frac{1}{RT}\int_0^T [V(t)]^2 \, dt \quad (2)$$

where T is an average time for obtaining power. Which power is defined depends on how the average time T is set. Substituting V(t) of Equation (1) into Equation (2), the following Equation (3) is obtained.

[Mathematical Expression 3]

$$P(t) = \frac{1}{2RT}\int_0^T \{[a_1(t)]^2 + [a_2(t)]^2\} \, dt + \quad (3)$$

$$\frac{1}{RT}\int_0^T a_1(t)a_2(t)\cos[2\pi\Delta ft + \theta_2(t) - \theta_1(t)] \, dt +$$

$$\frac{1}{RT}\int_0^T a_1(t)a_2(t)\cos[2\pi(f_{c1}+f_{c2})t + \theta_2(t) + \theta_1(t)] \, dt +$$

$$\frac{1}{2RT}\int_0^T [a_1(t)]^2\cos[4\pi f_{c1}t + 2\theta_1(t)] \, dt +$$

$$\frac{1}{2RT}\int_0^T [a_2(t)]^2\cos[4\pi f_{c2}t + 2\theta_2(t)] \, dt$$

In calculating average power $P_{ave}$, the average time T for power calculation is set to infinite. Integrating Equation (3) with T being infinite, every term containing cos is smoothed to become '0', leaving only the first term on the right side of Equation (3). As a result, the average power $P_{ave}$ is given by the following Equation (4):

[Mathematical Expression 4]

$$P_{ave} = \frac{1}{2R}\{\langle a_1^2 \rangle + \langle a_2^2 \rangle\} \quad (4)$$

where $\langle a_1^2 \rangle$ is a time-averaged value of $[a_1(t)]^2$, and $\langle a_2^2 \rangle$ is a time-averaged value of $[a_2(t)]^2$. Further, $f_{BB} \cong f_{BB1} \cong f_{BB2}$ and $\Delta f = f_{c2} - f_{c1} > 0$ are satisfied.

For each of the multi-carrier communication system ($\Delta f \cong f_{BB}$) on which the conventional techniques are based and the Inter-band Non-contiguous CA mode ($\Delta f \gg f_{BB}$), average power is given by the foregoing Equation (4).

Next, instantaneous power is derived. As will be discussed in the following, the instantaneous power has a value and characteristic in the multi-carrier communication system ($\Delta f \cong f_{BB}$) different from those in the Inter-band Non-contiguous CA mode ($\Delta f \gg f_{BB}$). As described in Background Art, the peak value of the instantaneous power must be set equal to or smaller than the saturation output of the power amplifier (PA).

In deriving the instantaneous power with the multi-carrier communication system ($\Delta f \cong f_{BB}$), the average time T is set to satisfy the following condition.

$$1/f_{c2} \cong 1/f_{c1} \ll T \ll 1/\Delta f \cong 1/f_{BB}$$

For such an average time T, since the phase in cos varies at high speeds in an integration time T in each of the third to fifth terms on the right side of Equation (3), each of the third to fifth terms on the right side of Equation (3) is smoothed by integration and becomes '0'. As a result, the first and second terms of Equation (3) are left, and the instantaneous power is given by the following Equation (5).

[Mathematical Expression 5]

$$P(t) = \frac{1}{2R}\{[a_1(t)]^2 + [a_2(t)]^2\} + \frac{1}{R}a_1(t)a_2(t)\cos[2\pi\Delta ft + \theta_2(t) - \theta_1(t)] \quad (5)$$

As shown in Equation (5), in the case where $\Delta f \cong f_{BB}$, the instantaneous power P(t) depends on the phase $\theta_1(t)$ and the phase $\theta_2(t)$, as well as on the amplitude $a_1(t)$ and the amplitude $a_2(t)$. Accordingly, when it is desired to properly control the peak value of the instantaneous power, as described in Patent Literature 1, both the amplitudes $a_1(t)$ and $a_2(t)$ and the phases $\theta_1(t)$ and $\theta_2(t)$ must be detected and controlled.

On the other hand, in deriving the instantaneous power with the Inter-band Non-contiguous CA mode ($\Delta f \gg f_{BB}$), the average time T is set to satisfy the following condition.

$$1/f_{c2} \cong 1/f_{c1} \cong 1/\Delta f \ll T \ll 1/f_{BB}$$

For such an average time T, since the phase in cos varies at high speeds in integration time T in each of the second to fifth terms on the right side of Equation (3), each of the second to fifth terms on the right side of Equation (3) is smoothed by integration and becomes '0'. As a result, only the first term of Equation (3) is left, and the instantaneous power is given by the following Equation (6).

[Mathematical Expression 6]

$$P(t) = \frac{1}{2R}\{[a_1(t)]^2 + [a_2(t)]^2\} \quad (6)$$

As shown in Equation (6), in the case where $\Delta f \gg f_{BB}$, the instantaneous power P(t) depends only on the amplitudes $a_1(t)$ and $a_2(t)$, and is independent of the phases $\theta_1(t)$ and $\theta_2(t)$. Accordingly, when it is desired to properly control the peak value of the instantaneous power with the Inter-band Non-contiguous CA mode, only the amplitudes must be detected and controlled, and omission of detection and control of the phases is justified.

The contents of the foregoing discussion can be easily applied to the case where the carrier frequencies are in general numbers (n: an integer of 2 or greater). It is assumed that the amplitudes of the RF signals $407_1, 407_2, \ldots, 407_n$ are $a_{out1}(t), a_{out2}(1), \ldots, a_{outn}(t)$, respectively. In the case where the carrier frequencies $f_{c1}, f_{c2}, f_{cn}$ of the RF signals $407_1, 407_2, \ldots, 407_n$ are separated from one another at a frequency interval which is ?fully? greater than the modulation bandwidth $f_{BB}$, the instantaneous power of a combination signal of the RF signals $407_1, 407_2, \ldots, 407_n$ given as the sum of squares of the amplitudes of the respective RF signals, as shown by the following Equation (7).

[Mathematical Expression 7]

$$P(t) = \frac{1}{2R}\{[a_{out1}(t)]^2 + [a_{out2}(t)]^2 + \ldots + [a_{outn}]^2\} \quad (7)$$

Next, the characteristics of a power amplifier (PA) when two RF signals differing in carrier frequency are simultaneously input to the power amplifier (PA) are discussed.

Figure 2:
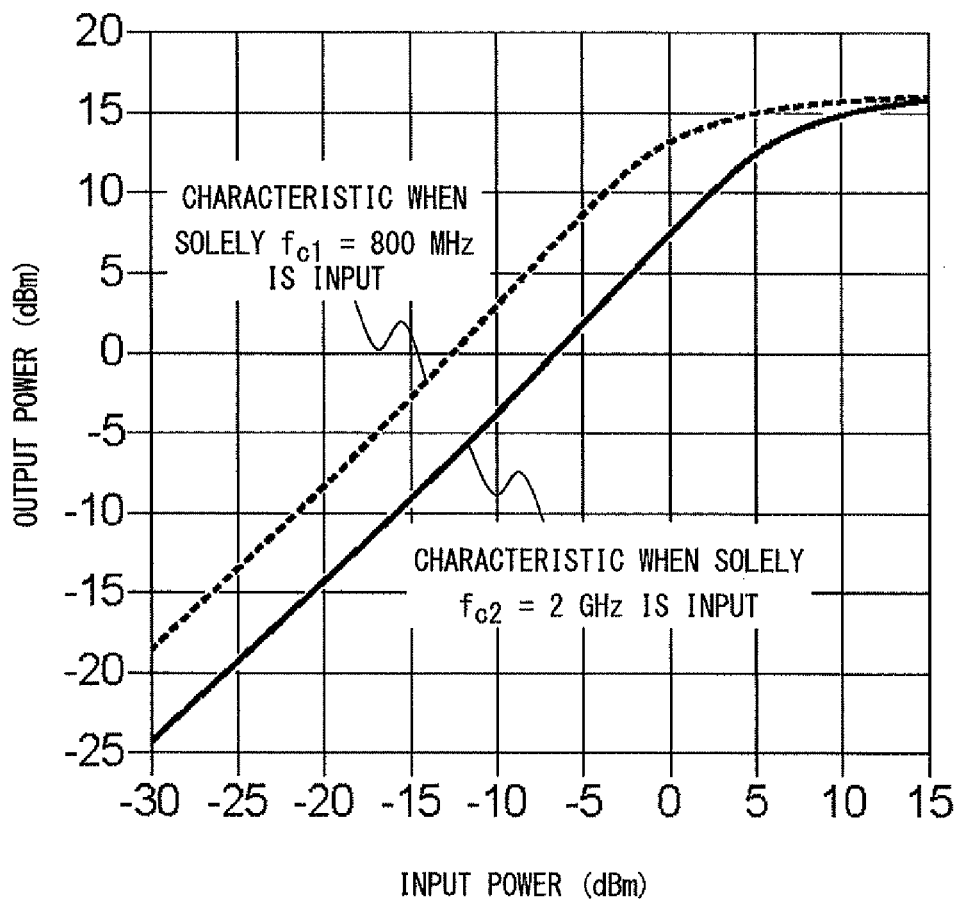
FIG. 2 is a characteristic diagram showing the input/output power characteristic of a dual-band power amplifier (PA), which is an example of the power amplifier shown in FIG. 1.

A description will be given of an exemplary case where a dual-band power amplifier (PA) supporting both the frequencies of 800 MHz and 2 GHz is used as the power amplifier 401. FIG. 2 is a characteristic diagram showing the input/output power characteristic of a dual-band power amplifier (PA), which is an example of the power amplifier 401 shown in FIG. 1. Note that, herein, the carrier frequency $f_{c1}$ is 800 MHz and the carrier frequency $f_{c2}$ is 2 GHz.

The characteristic diagram of FIG. 2 shows the input/output power characteristic of the power amplifier 401 when only the RF signal $406_1$ on the carrier frequency $f_{c1}$=800 MHz is input and the input/output power characteristic of the power amplifier 401 when only the RF signal $406_2$ on the carrier frequency $f_{c2}$=2 GHz is input. As shown in the characteristic diagram of FIG. 2, the power amplifier 401 discussed herein is designed such that substantially the same saturation output power is obtained in the case where the RF signal $406_1$ on the carrier frequency $f_{c1}$ is input and in the case where the RF signal $406_2$ on the carrier frequency $f_{c2}$ is input.

Figure 3:
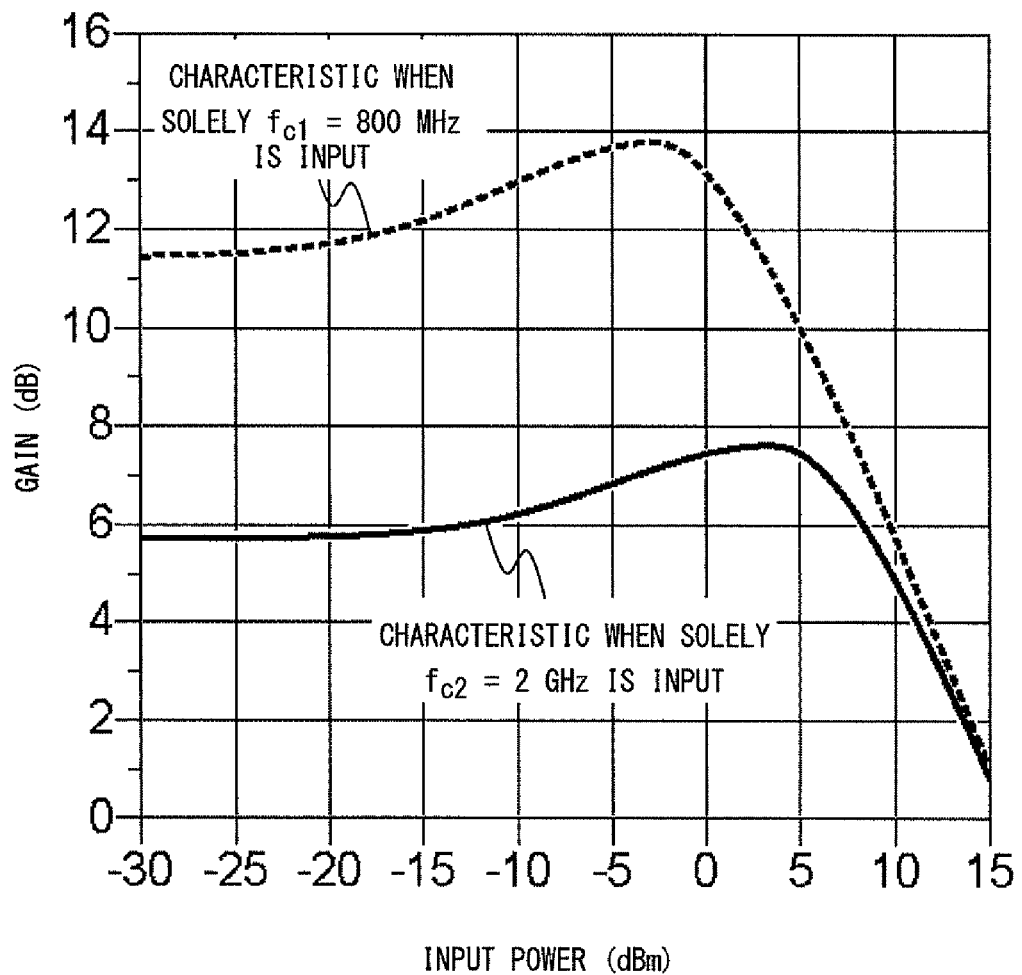
FIG. 3 is a gain characteristic diagram showing the input power dependence of the gain of the dual-band power amplifier (PA) which is an example of the power amplifier shown in FIG. 1.
Figure 4:
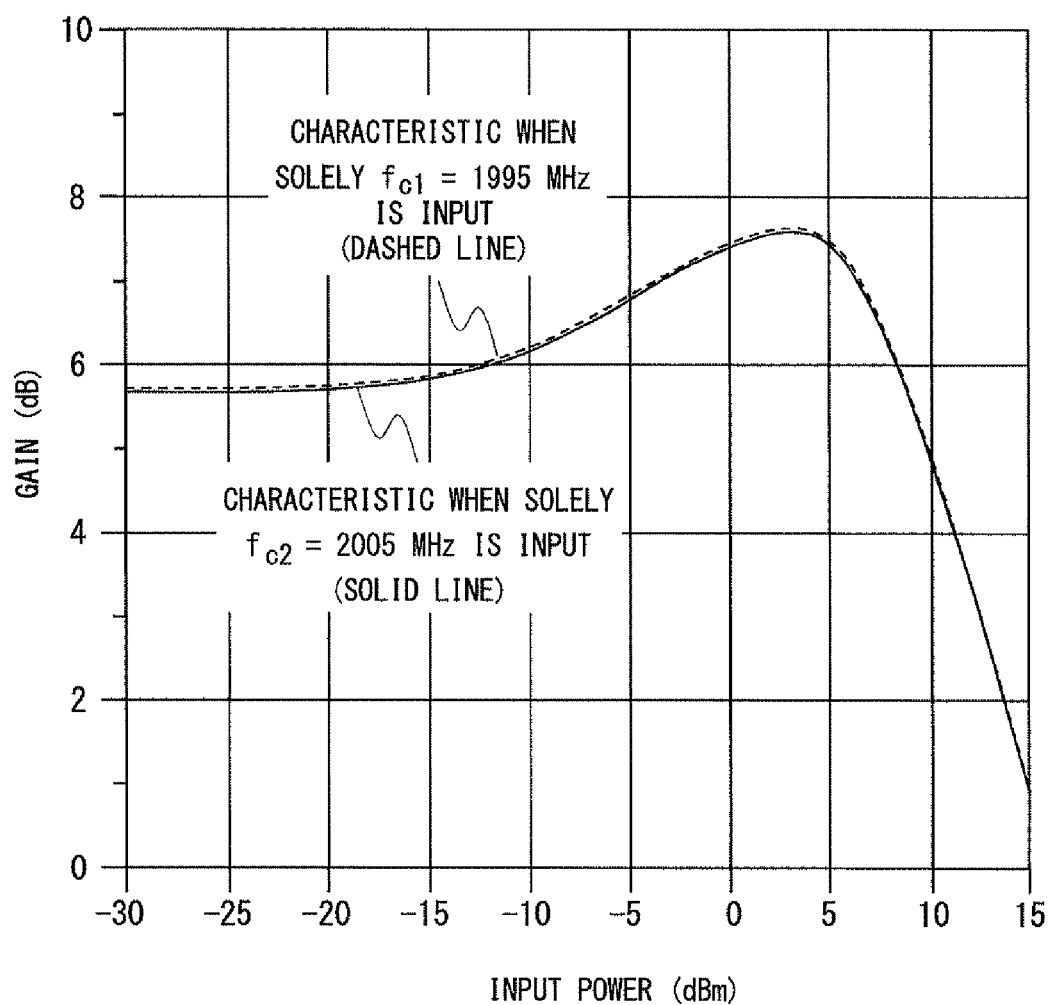
FIG. 4 is a gain characteristic diagram showing the input power dependence of the gain of the dual-band power amplifier (PA) which is an example of the power amplifier shown in FIG. 1.

FIGS. 3 and 4 are each a gain characteristic diagram showing the input power dependence of the gain of the dual-band power amplifier (PA) which is an example of the power amplifier 401 shown in FIG. 1. FIG. 3 shows the case where the frequency difference between the carrier frequency $f_{c1}$ and the carrier frequency $f_{c2}$ is great. FIG. 4 shows the case where the frequency difference between the carrier frequency $f_{c1}$ and the carrier frequency $f_{c2}$ is small.

That is, the gain characteristic diagram of FIG. 3 shows the gain characteristic of the power amplifier 401 when only the RF signal $406_1$ on the carrier frequency $f_{c1}$=800 MHz is input, and the gain characteristic of the power amplifier 401 when only the RF signal $406_2$ on the carrier frequency $f_{c2}$=2 GHz is input. On the other hand, the gain characteristic diagram of FIG. 4 shows the gain characteristic of the power amplifier 401 when only an RF signal on the carrier frequency $f_{c1}$=1995 MHz is input, and the gain characteristic of the power amplifier 401 when only an RF signal on the carrier frequency $f_{c2}$=2005 MHz is input.

As shown in the gain characteristic diagram of FIG. 4, when the two carrier frequencies $f_{c1}$ and $f_{c2}$ are very close to each other (the fractional bandwidth in the foregoing example is $5 \times 10^{-3}$), the gain characteristic when the RF signal of carrier frequency $f_{c1}$ is input and the gain characteristic when the RF signal of carrier frequency $f_{c2}$ is input substantially agree with each other. On the other hand, as shown in the gain characteristic diagram of FIG. 3, when the two carrier frequencies $f_{c1}$ and $f_{c2}$ are greatly separated from each other (the fractional bandwidth in the foregoing example is 0.6, which corresponds to the Inter-band Non-contiguous CA mode), the gain characteristics of respective carrier frequencies greatly differ from each other. In this manner, since there is frequency dependence in the characteristic of the power amplifier 401, the following is the general property of the power amplifier:

the greater the carrier frequencies are separated from each other, the greater the characteristic difference.

Figure 5:
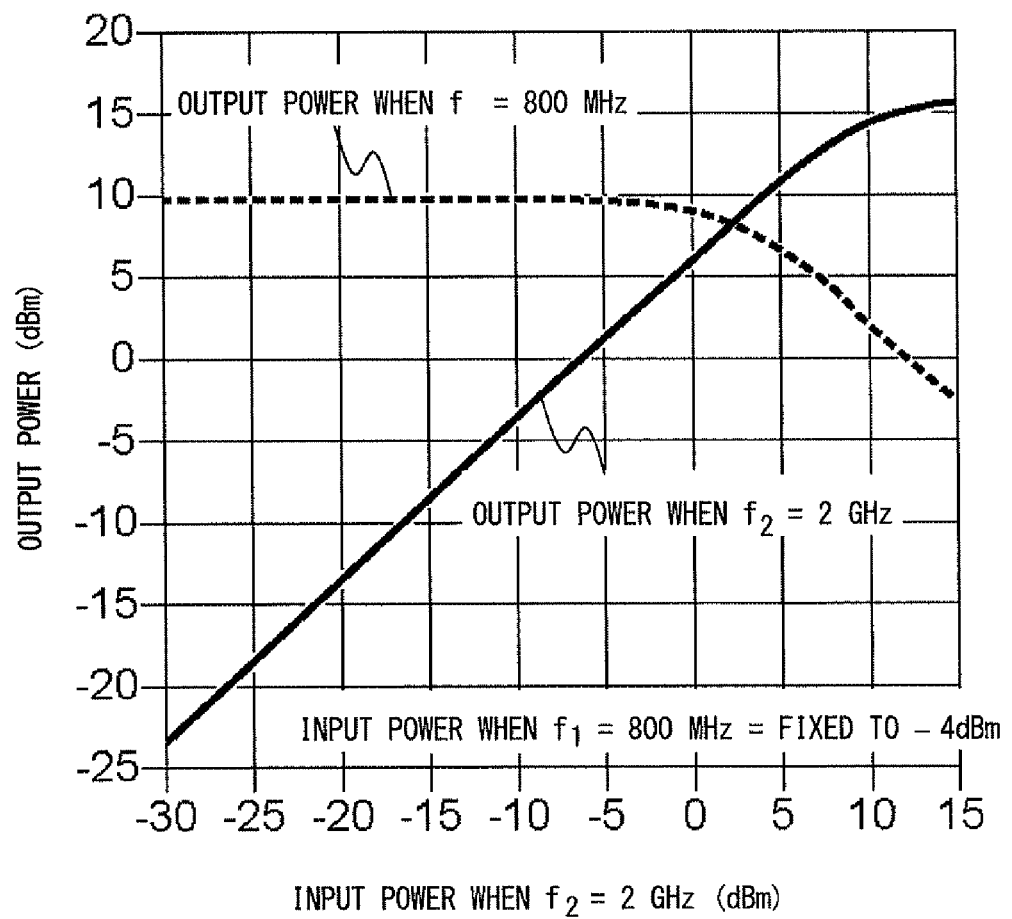
FIG. 5 is a characteristic diagram showing the input/output power dependence of respective output signals when two RF signals differing in carrier frequency are input to the dual-band power amplifier (PA) which is an example of the power amplifier shown in FIG. 1.

FIG. 5 is a characteristic diagram showing the input power dependence of respective output signals when two RF signals differing in carrier frequency are input to the dual-band power amplifier (PA) which is an example of the power amplifier 401 shown in FIG. 1. That is, FIG. 5 is a graph of output power obtained when the RF signal $406_1$ on the carrier frequency $f_1$=800 MHz is input with power of −4 dBm to the dual-band power amplifier (PA) which is an example of the power amplifier 401 shown in FIG. 1 and, at the same time, when the RF signal $406_2$ on the carrier frequency $f_2$=2 GHz is input thereto with power being swept. Further, FIG. 6 is a gain characteristic diagram showing the input power dependence of the gain obtained under conditions similar to those of the case of FIG. 5.

Figure 6:
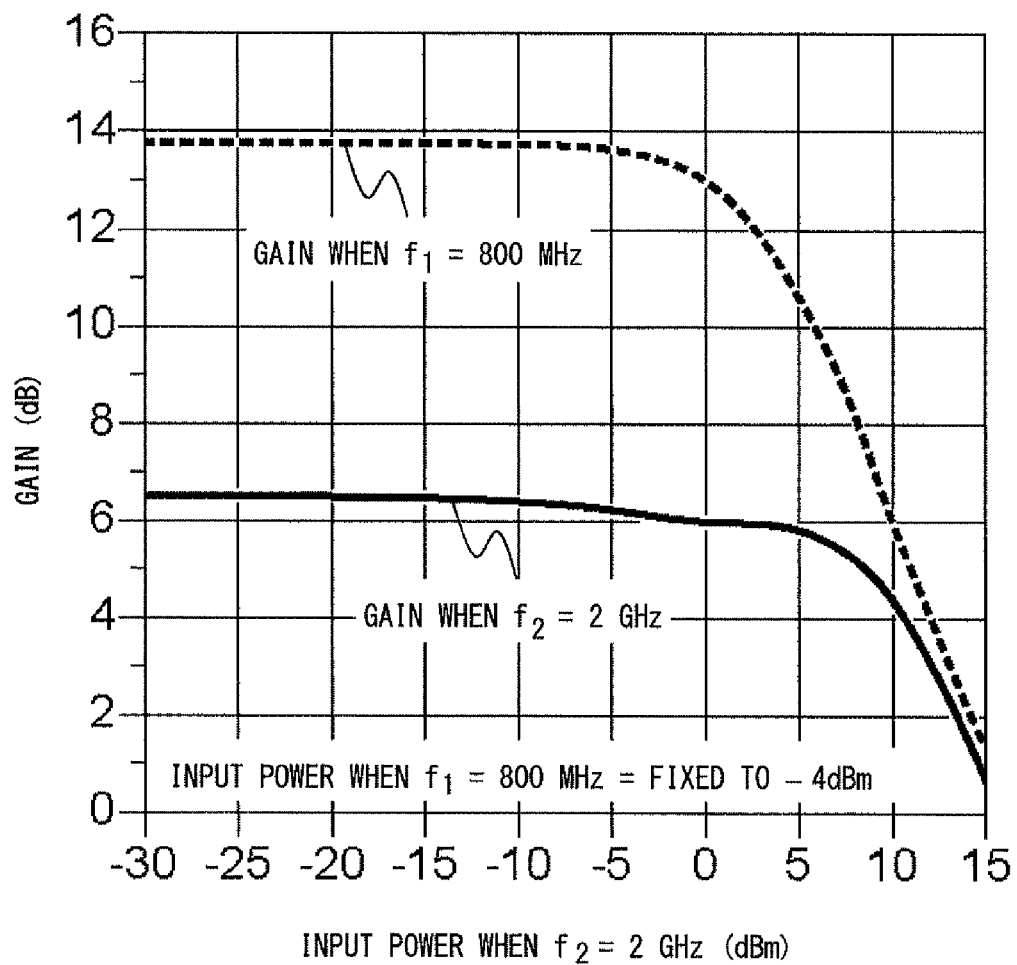
FIG. 6 is a characteristic diagram showing the input power dependence of the gain when two RF signals differing in carrier frequency are input to the dual-band power amplifier (PA) which is an example of the power amplifier shown in FIG. 1.

As shown in the input/output power characteristic diagram of FIG. 5 and the gain characteristic diagram of FIG. 6, in the range where the input power of the RF signal $406_2$ on the carrier frequency $f_2$ is small, even when the input power of the RF signal $406_2$ changes, the gain of the carrier frequency $f_1$ and the output power of the RF signal $407_1$ show little variation. However, when the input power of the RF signal $406_2$ on the carrier frequency $f_2$ becomes greater and the output power of the RF signal $407_2$ on the carrier frequency $f_2$ is gradually saturated, the gain of the carrier frequency $f_1$ and the output power of the RF signal $407_1$ show a great change (particularly a reduction). That is, when the power amplifier 401 operates with a small signal and the output power is not saturated, the characteristic of the output power and gain of one carrier frequency is independent of that of another carrier frequency. On the other hand, when the power amplifier 401 operates with a great signal and saturation is approximated, the output power and gain of one carrier frequency influence those of another carrier frequency.

Figure 7:
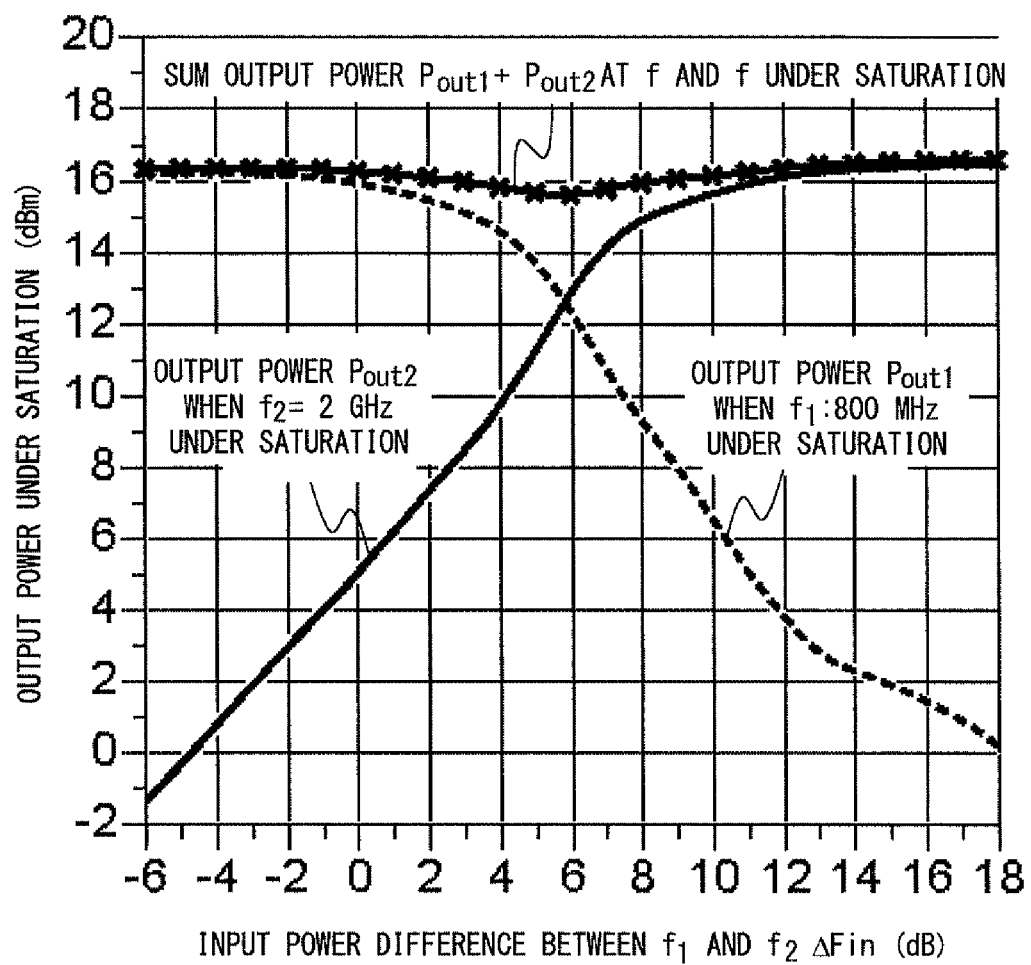
FIG. 7 is a characteristic diagram showing the input/output power characteristic of an output signal under saturation, when two RF signals differing in carrier frequency are simultaneously input to the dual-band power amplifier (PA) which is an example of the power amplifier shown in FIG. 1.

FIG. 7 is a characteristic diagram showing the input/output power characteristic of an output signal under saturation, when two RF signals differing in carrier frequency are simultaneously input to the dual-band power amplifier (PA) which is an example of the power amplifier 401 shown in FIG. 1. That is, FIG. 7 is a plot of output power $P_{out1}$ of the RF signal $407_1$ on the carrier frequency $f_1$ and output power $P_{out2}$ of the RF signal $407_2$ on the carrier frequency $f_2$ under saturation, when the RF signal $406_1$ on the carrier frequency $f_1$=800 MHz and the RF signal $406_2$ on the carrier frequency $f_2$=2 GHz are simultaneously input to the dual-band power amplifier (PA) which is an example of the power amplifier 401 shown in FIG. 1. Note that, in the characteristic diagram of FIG. 7, the output power of the power amplifier 401 under saturation is plotted, while varying a power difference $\Delta P_{in}=P_{in1}-P_{in2}$ (dB), i.e., the power difference between input power $P_{in1}$ of the RF signal $406_1$ on the carrier frequency $f_1$=800 MHz and input power $P_{in2}$ of the RF signal $406_2$ on the carrier frequency $f_2$=2 GHz.

When the input power ratio between the RF signal $406_1$ on the carrier frequency $f_1$ and the RF signal $406_2$ on the carrier frequency $f_2$ is varied by varying the input power difference $\Delta P_{in}$, in accordance with variations in the ratio, the output power of the RF signal $407_1$ on the carrier frequency $f_1$ and that of the RF signal $407_2$ on the carrier frequency $f_2$ under saturation are also varied. Here, the power amplifier 401 in this example is designed such that the output power of the power amplifier 401 operating under saturation assumes saturation output power $P_{sat}$, which is substantially identical in the case where only the RF signal $406_1$ on the carrier frequency $f_1$ is input and in the case where only the RF signal $406_2$ on the carrier frequency $f_2$ is input.

As has been described, with the power amplifier whose saturation output power in response to an input of a single RF signal assumes $P_{sat}$ of an identical value irrespective of the carrier frequency, the following result is obtained. As shown in FIG. 7, even when both the RF signal $406_1$ on the carrier frequency $f_1$ and the RF signal $406_2$ on the carrier frequency $f_2$ are input while having their input power ratio $\Delta P_{in}$ varied, the output power sum value ($P_{out1}+P_{out2}$) of the RF signals under saturation assumes the saturation output power $P_{sat}$, i.e., the output power sum value is not changed from the value that is obtained by an input of a single RF signal.

This result shows that, in the case where RF signals on a plurality of carrier frequencies which are greatly separated from one another are simultaneously input to a power amplifier (the Inter-band Non-contiguous CA mode), irrespective of the ratio among the input power of the RF signals on their respective carrier frequencies, the sum value of the output power of the RF signals determines the saturation condition of the power amplifier (PA). That is, at the time point where the output power sum value ($P_{out1}+P_{out2}$) of the RF signals reaches the saturation output power $P_{sat}$, the power amplifier enters the saturated state.

Figure 8:
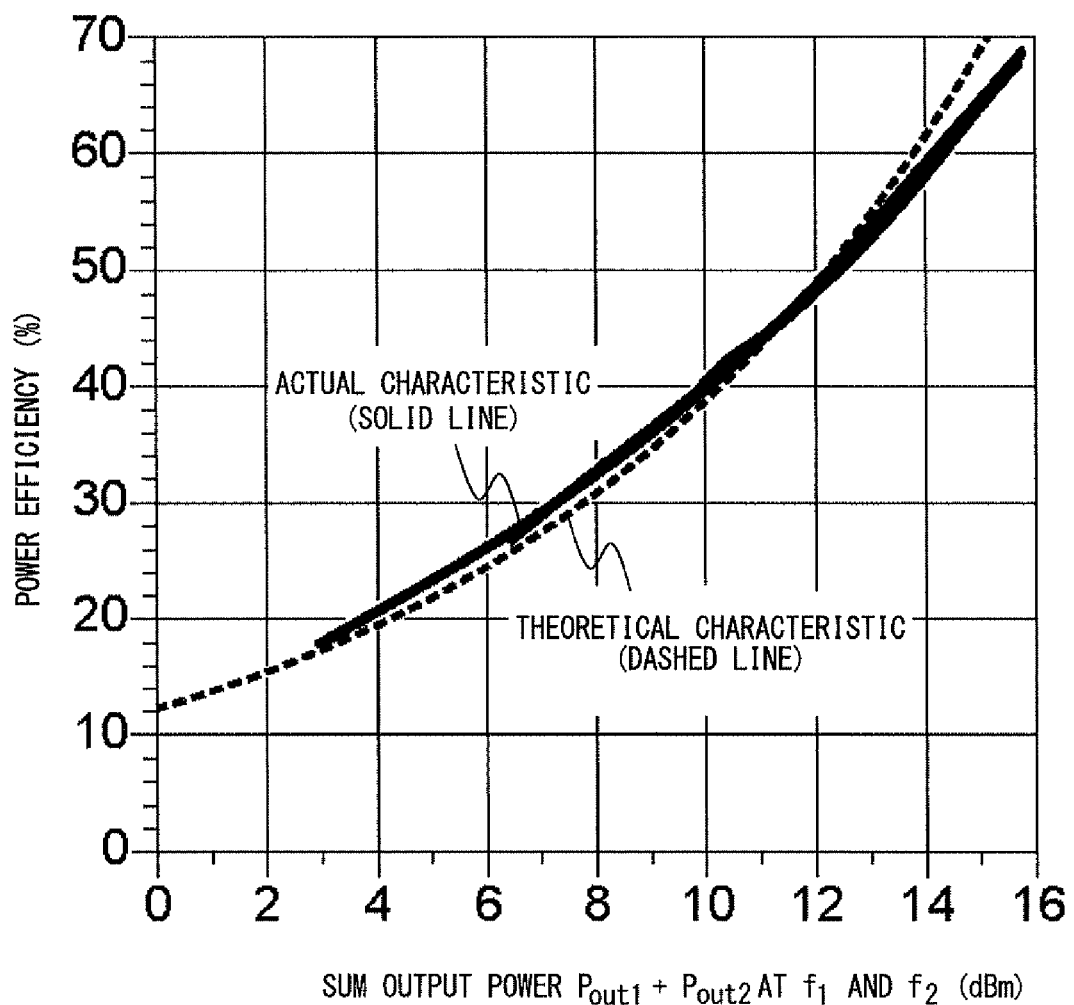
FIG. 8 is a characteristic diagram showing the power efficiency in the case where two RF signals differing in carrier frequency are simultaneously input to the dual-band power amplifier (PA) which is an example of the power amplifier shown in FIG. 1.

FIG. 8 is a characteristic diagram showing the power efficiency in the case where two RF signals differing in carrier frequency are simultaneously input to the dual-band power amplifier (PA) which is an example of the power amplifier 401 shown in FIG. 1. That is, FIG. 8 is a plot of power efficiency when the RF signal $406_1$ on the carrier frequency $f_1$=800 MHz and the RF signal $406_2$ on the carrier frequency $f_2$=2 GHz are simultaneously input to the dual-band power amplifier (PA) which is an example of the power amplifier 401 shown in FIG. 1. The power efficiency in this case is defined by the ratio between the sum output power ($P_{out1}+P_{out2}$) of the RF signal $407_1$ and the RF signal $407_2$ on their respective carrier frequencies and supply power from a DC power supply consumed by the power amplifier 401. Note that the power efficiency shown in FIG. 8 is plotted by varying both the output power $P_{out1}$ at the carrier frequency $f_1$ and the output power $P_{out2}$ at the carrier frequency $f_2$.

From the characteristic diagram of FIG. 8, it can be seen that the power efficiency becomes the single-valued function of the sum output power ($P_{out1}+P_{out2}$) of the RF signal $407_1$ and the RF signal $407_2$ on their respective carrier frequencies, irrespective of how the output power $P_{out1}$ and the output power $P_{out2}$ are set. It is known that the power efficiency of a power amplifier of class-B operation when an RF signal of one carrier frequency is input is proportional to the one-half power of the output power. In FIG. 8, a curve proportional to one-half power of the sum output power ($P_{out1}+P_{out2}$) is represented by a dashed line as the theoretical characteristic. It can be seen that the theoretical characteristic closely matches the actual characteristic (represented by a solid line) relating to the actual power efficiency of the dual-band power amplifier (PA) which is an example of the power amplifier 401 shown in FIG. 1. Such a result shows that, even in the case where RF signals on a plurality of carrier frequencies greatly separated from one another are simultaneously input to a power amplifier (the Inter-band Non-contiguous CA mode), the power efficiency of the power amplifier is determined by the sum value of output power of the RF signals, irrespective of the ratio of the input power of the RF signals on their respective carrier frequencies.

Summarizing the foregoing discussion, in the case where RF signals on a plurality of carrier frequencies greatly separated from one another are simultaneously input to a power amplifier (the Inter-band Non-contiguous CA mode), it can be seen that the instantaneous power of the combined RF signal, the saturation condition of the power amplifier, and the power efficiency of the power amplifier are all determined by the sum of output power of the RF signals on their respective carrier frequencies. That is, as the index for determination of the instantaneous power of the combined RF signal, the saturation condition of the power amplifier, and the power efficiency of the power amplifier, the sum of the output power of the RF signals on their respective carrier frequencies in the Inter-band Non-contiguous CA mode (the sum output power) is regarded to be equivalent to the output power of an RF signal in the normal mode in which only the RF signal on a single carrier frequency is input to a power amplifier.

In the conventional techniques, in the normal mode where only an RF signal on a single carrier frequency is input to a power amplifier, in order to improve average power efficiency while maintaining linearity, the peak value of the output power of the RF signal is set to a value that is close to the saturation output power $P_{sat}$ of the power amplifier and that is equal to or smaller than the saturation output power $P_{sat}$. Further, the RF signal is subjected to signal processing for reducing the PAR (peak-to-average power ratio) to raise the average value of output power of the RF signal to thereby improve the average power efficiency, and thereafter the RF signal is input to the power amplifier.

In the Inter-band Non-contiguous CA mode with which the present embodiment deals with, in order to improve average power efficiency while maintaining linearity, the peak value of the sum of output power of RF signals on the respective carrier frequencies (the sum output power) is set to a value that is close to the saturation output power $P_{sat}$ of the power amplifier and that is equal to or smaller than the saturation output power $P_{sat}$. Further, the RF signals on the respective carrier frequencies are subjected to signal processing for reducing the PAR (peak-to-average power ratio) of the sum output power to raise the average value of the output power of the RF signals to thereby improve the average power efficiency, and thereafter the RF signals are input to the power amplifier.

In the following, a method for subjecting RF signals on the respective carrier frequencies to signal processing for reducing the PAR (peak-to-average power ratio) of the sum output power will be disclosed.

The PAR (peak-to-average power ratio) of the sum output power is equal to the PAR (peak-to-average power ratio) of the sum of squares of the amplitudes of the output signals. Accordingly, when the RF signals $407_1, 407_2, \ldots, 407_n$ in the output of the power amplifier 401 respectively have amplitudes of $a_{out1}(t), a_{out2}(t), \ldots, a_{outn}(t)$, by reducing the PAR (peak-to-average power ratio) of the sum of squares of the amplitudes of the output signals $[a_{out1}(t)]^2 + [a_{out2}(t)]^2 + \ldots + [a_{outn}(t)]^2$, the PAR (peak-to-average power ratio) of the sum output power can be reduced, and hence the power efficiency of the power amplifier 401 can be improved.

One method for reducing the PAR (peak-to-average power ratio) of the sum of squares of the amplitudes of the output signals $[a_{out1}(t)]^2 + [a_{out2}(t)]^2 + \ldots + [a_{outn}(t)]^2$ is to cause the signal generator 402 to control the send-out timing of the RF signals $406_1, 406_2, \ldots, 406_n$ input to the power amplifier 401, such that the amplitudes $a_{out1}(t), a_{out2}(t), \ldots, a_{outn}(t)$ will not simultaneously attain the peak value.

Even when the send-out timing of the RF signals $406_1, 406_2, \ldots, 406_n$ is changed, the average power of the combined waveform of the RF signals $407_1, 407_2, \ldots, 407_n$ which are the output signals will not change. This is because the average power of the combined waveform of the RF signals $407_1, 407_2, \ldots, 407_n$ is the sum of the average power of the RF signals, and the average power of the RF signals is not changed by the send-out timing.

As described above, when the send-out timing of the RF signals $406_1, 406_2, \ldots, 406_n$ is changed, though the average power of the combined waveform of the RF signals $407_1, 407_2, \ldots, 407_n$ does not change, the peak power of the RF signals $407_1, 407_2, \ldots, 407_n$ changes. Accordingly, by changing the send-out timing of the RF signals $406_1, 406_2, \ldots, 406_n$, the PAR (peak-to-average power ratio) of the combined waveform of the RF signals $407_1, 407_2, \ldots, 407_n$ which are the output signals can be changed.

The foregoing method for reducing the PAR (peak-to-average power ratio) according to the present embodiment is advantageous in that signal distortion does not occur in the RF signals $406_1, 406_2, \ldots, 406_n$ input to the power amplifier 401, in contrast to the conventional PAR (peak-to-average power ratio) reduction scheme represented by the scheme disclosed in Patent Literature 1. In the present embodiment, since only the send-out timing of the RF signals $406_1, 406_2, \ldots, 406_n$ changed, no signal distortion will occur in the RF signals $406_1, 406_2, \ldots, 406_n$. On the other hand, with the conventional PAR (peak-to-average power ratio) reduction scheme represented by the scheme disclosed in Patent Literature 1, since the PAR is reduced by nonlinear processing in which peak power is limited by means of a limiter, occurrence of signal distortion is inevitable in principle.

In the following, as a specific example of the PAR (peak-to-average power ratio) reduction, the case where two RF signals, namely the RF signal $407_1$ on the carrier frequency $f_{c1}$ with the amplitude $a_{out1}(t)$ and the RF signal $407_2$ on the carrier frequency $f_{c2}$ with the amplitude $a_{out2}(t)$ are sent out from the power amplifier 401 is considered.

Figure 9:
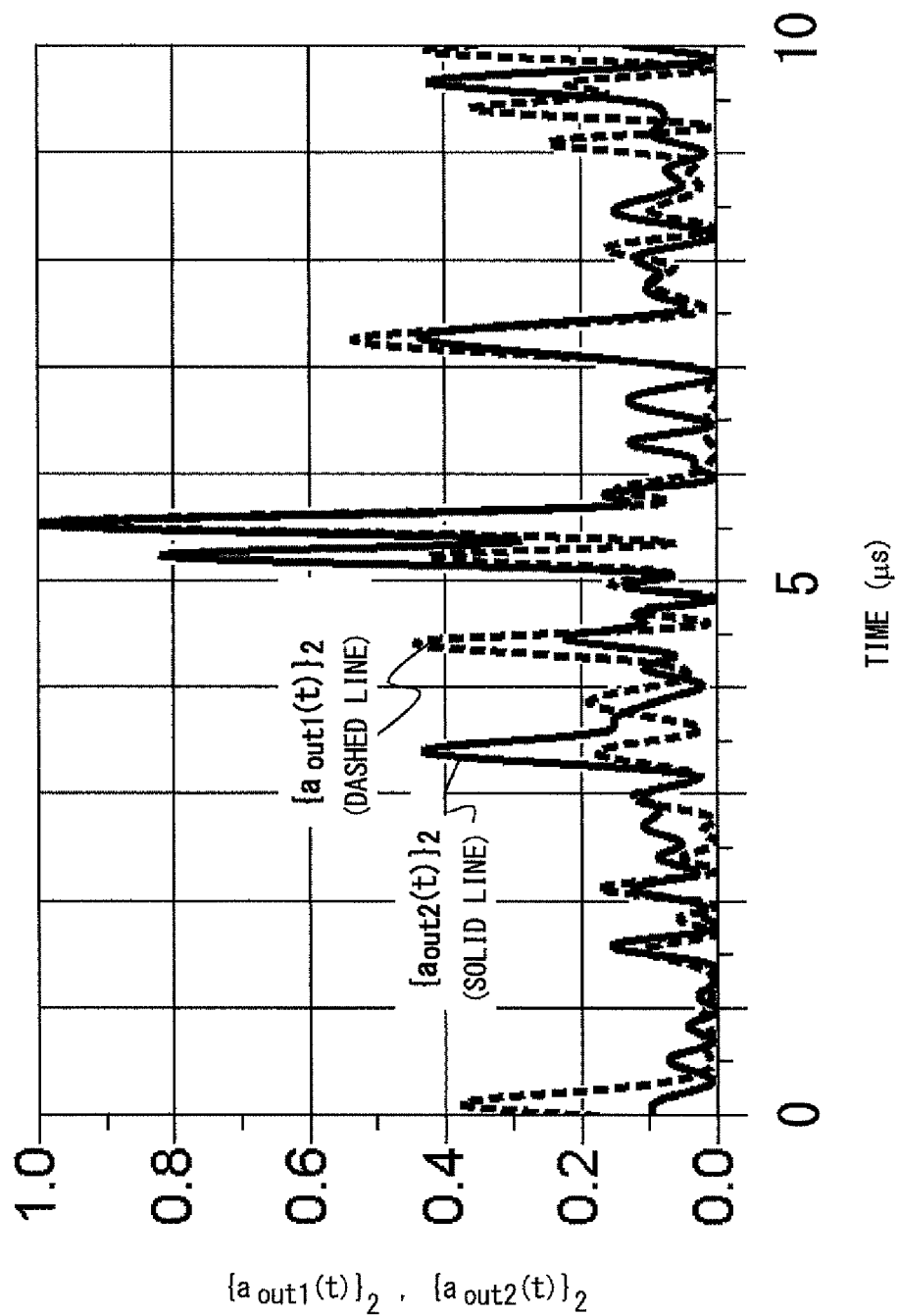
FIG. 9 is a waveform diagram showing the time waveform of the square value of the amplitude of the two RF signals output from the dual-band power amplifier (PA) which is an example of the power amplifier shown in FIG. 1.

Here, a description will be given of one example of the PAR reduction with reference to FIG. 9. FIG. 9 is a waveform diagram showing the time waveform of the square value of the amplitude of each of the two RF signals $407_1$ and $407_2$ output from the dual-band power amplifier (PA) which is an example of the power amplifier 401 shown in FIG. 1. In the drawing, the time waveforms of the square values of the amplitudes $\{a_{out1}(t)\}^2$ and $\{a_{out2}(t)\}^2$ of the two RF signals $407_1$ and $407_2$ are respectively represented by a dashed line and a solid line in the case where WCDMA (Wideband Code Division Multiple Access) signals are sent out. In each of the drawings referred to in the following, the peak values of the square values of the amplitudes $\{a_{out1}(t)\}^2$ and $\{a_{out2}(t)\}^2$ are all normalized to '1' and shown in the drawing.

Figure 10:
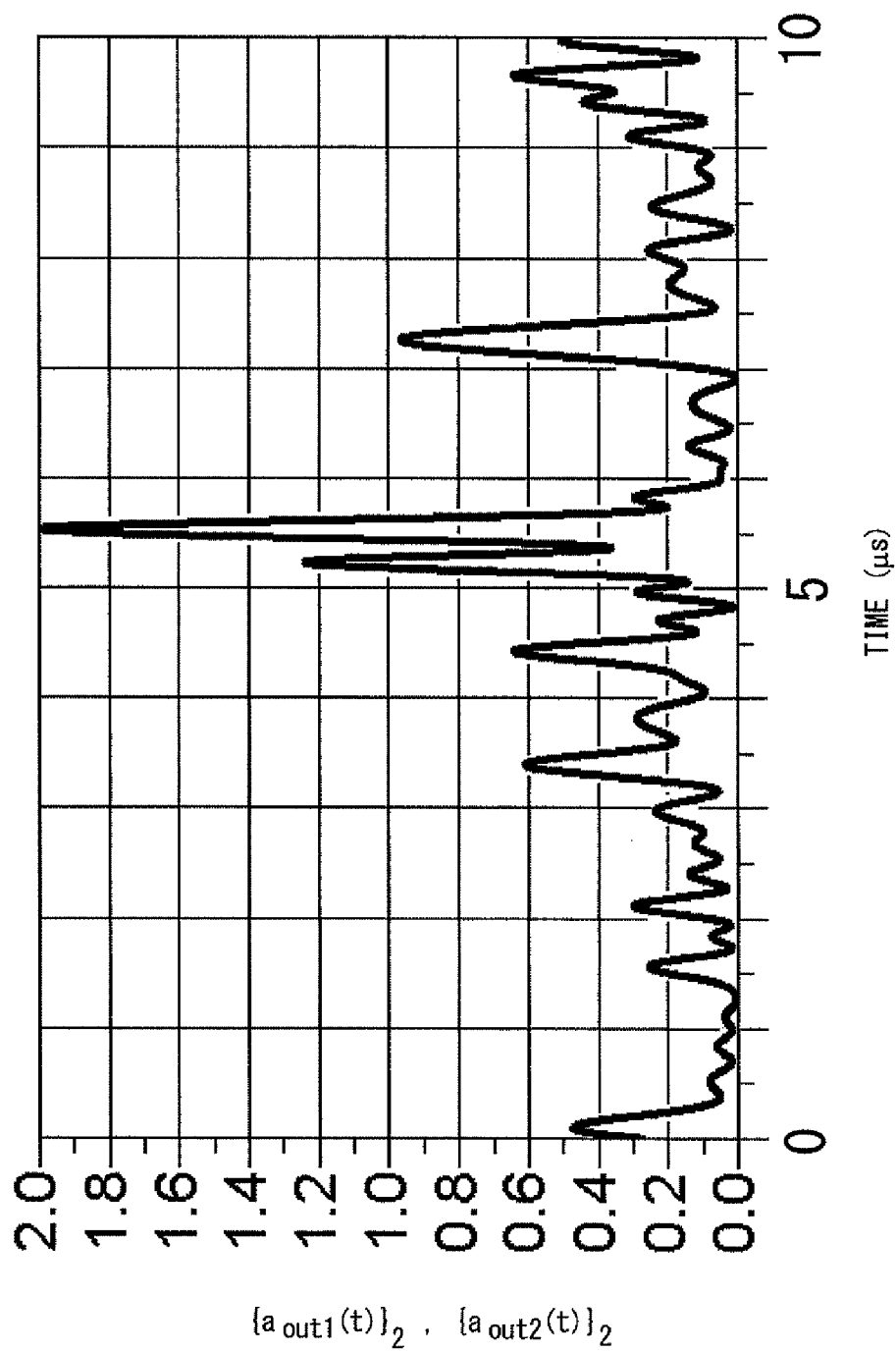
FIG. 10 is a waveform diagram showing the time waveform of the combined amplitude of the square values of the amplitudes of the two RF signals output from the dual-band power amplifier (PA) which is an example of the power amplifier shown in FIG. 1.

In connection with the waveform diagram of FIG. 9, the square values of the amplitudes $\{a_{out1}(t)\}^2$ and $\{a_{out2}(t)\}^2$ simultaneously attain the peak values at timing 5.5 μs. FIG. 10 shows the result of deriving a combined amplitude $\{a_{out1}(t)\}^2 + \{a_{out2}(t)\}^2$ from $\{a_{out1}(t)\}^2$ and $\{a_{out2}(t)\}^2$ shown in FIG. 9. FIG. 10 is a waveform diagram showing the time waveform of the combined amplitude of the square values of the amplitudes of the two RF signals output from the dual-band power amplifier (PA) which is an example of the power amplifier 401 shown in FIG. 1. FIG. 10 shows the time waveform of the combined amplitude obtained by a combination of the square values of the amplitudes $\{a_{out1}(t)\}^2$ and $\{a_{out2}(t)\}^2$ of the two RF signals $407_1$ and $407_2$, respectively, shown in FIG. 9. Note that, though FIG. 10 shows the case where the combined amplitude is obtained as the simple sum of the square values of the amplitudes of the two RF signals $407_1$ and $407_2$, i.e., $\{a_{out1}(t)\}^2 + \{a_{out2}(t)\}^2$, the actual combined amplitude is derived as the sum obtained by calculation in which an amplitude square value of the transmitted RF signal at each carrier frequency band is weighted with a specified gain and added with each other, the specified gain being specified as appropriate for each carrier frequency band. Here, as the value of the specified gain, the gain value in each of the carrier frequency bands of the power amplifier 401 may be used.

As shown in the waveform diagram of FIG. 10, at the timing (5.5 µs) where the square values of the amplitudes $\{a_{out1}(t)\}^2$ and $\{a_{out2}(t)\}^2$ of the two RF signals 407$_1$ and 407$_2$, respectively, simultaneously attain the peak value, the combined amplitude also attains the great peak value. Note that the PAR (peak-to-average power ratio) of the square values of the amplitudes $\{a_{out1}(t)\}^2$ and $\{a_{out2}(t)\}^2$ of the two RF signals 407$_1$ and 407$_2$, respectively, and that of the combined amplitude $\{a_{out1}(t)\}^2 + \{a_{out2}(t)\}^2$ are both 9.1 dB and thus are identical to one another.

Figure 11:
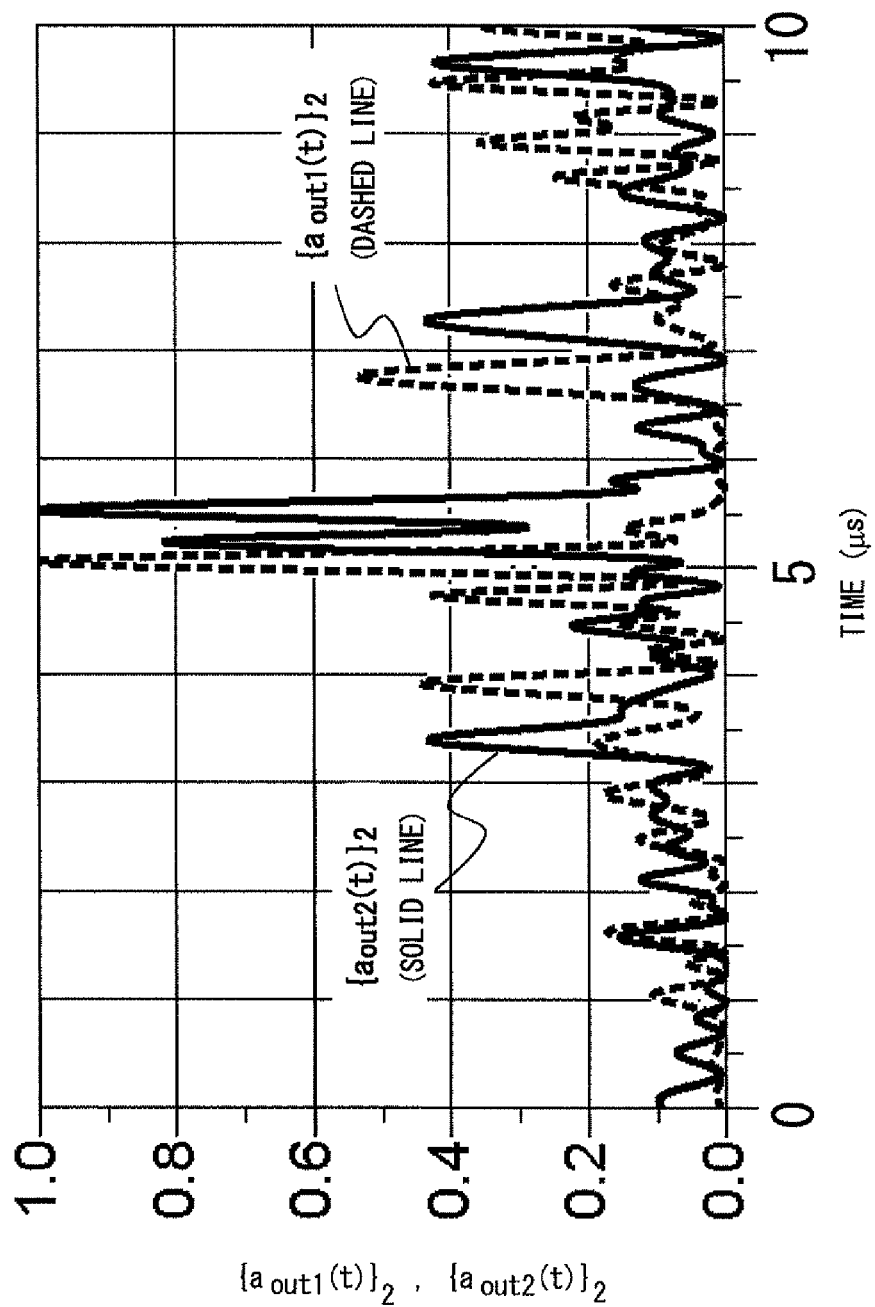
FIG. 11 is a waveform diagram showing time waveforms of square values of amplitudes in the case where send-out timing of one of the two RF signals, which are output from the dual-band power amplifier (PA) which is an example of the power amplifier shown in FIG. 1 is controlled.

Next, with reference to FIG. 11, a description will be given of square values of amplitudes in the case where the send-out timing of one RF signal 407$_1$ is controlled. FIG. 11 is a waveform diagram showing time waveforms of square values of amplitudes in the case where send-out timing of one of the two RF signals, which are output from the dual-band power amplifier (PA) which is an example of the power amplifier shown in FIG. 1, is controlled. FIG. 11 shows the case where the send-out timing of the RF signal 407$_1$ represented by a dashed line is controlled. That is, the waveform diagram of FIG. 11 shows the state where the send-out timing of the RF signal 407$_1$ (amplitude $a_{out1}(t)$) is set earlier by 0.5 µs than the send-out timing in the state shown in FIG. 9, such that the square values of the amplitudes $\{a_{out1}(t)\}^2$ and $\{a_{out2}(t)\}^2$ of the two RF signals 407$_1$ and 407$_2$, respectively, do not simultaneously attain the peak value. Note that the send-out timing of each of the RF signals 407$_1$ and 407$_2$ can be set by delay adjusters 502$_1$ and 502$_2$ to the timing specified for each carrier frequency band. The delay time for each of the delay adjusters 502$_1$ and 502$_2$ is set based on the control signal from the peak detector 506.

Figure 12:
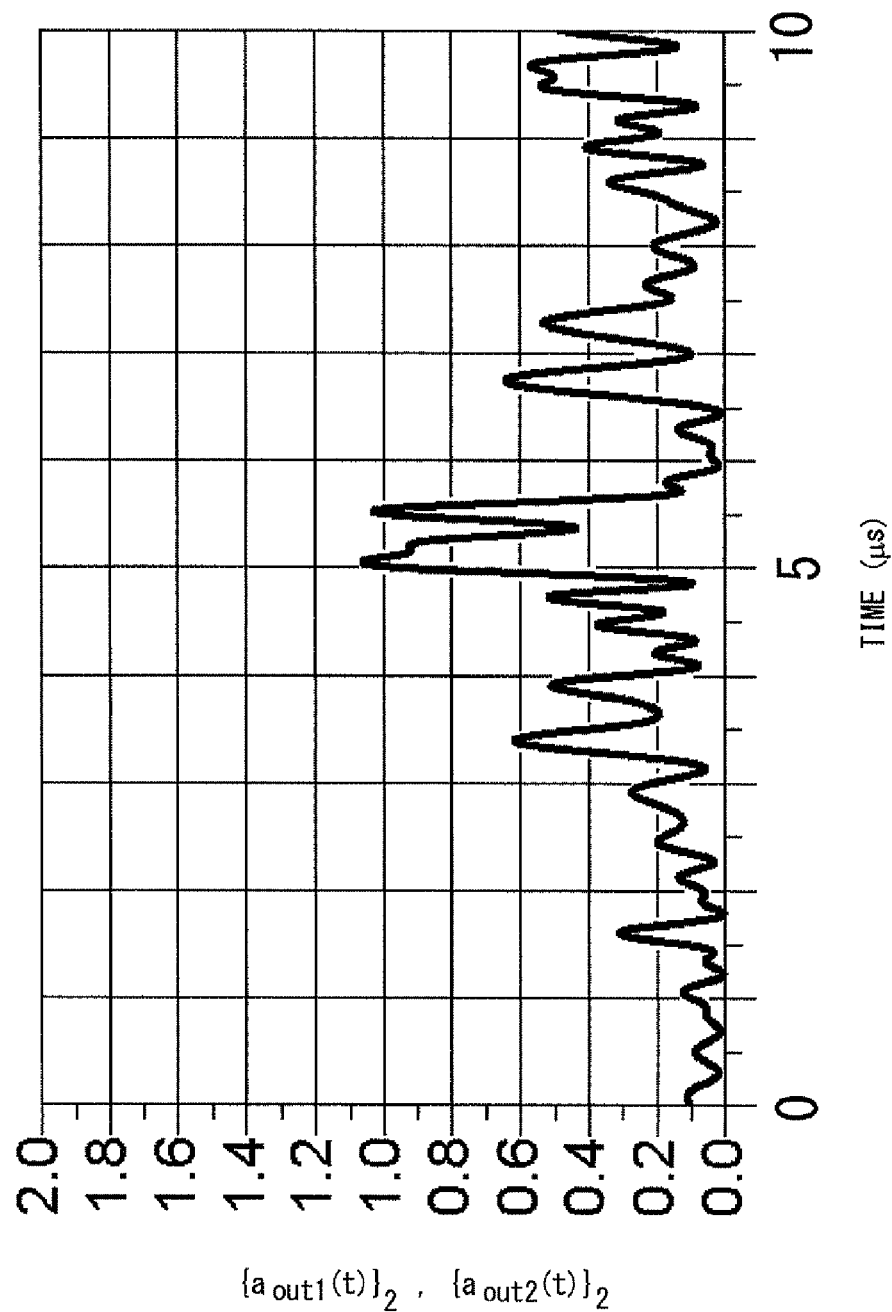
FIG. 12 is a waveform diagram showing the time waveform of the combined amplitude of the square values of the amplitudes of the two RF signals output from the dual-band power amplifier (PA) which is an example of the power amplifier shown in FIG. 1.

FIG. 12 shows the result of deriving the combined amplitude $\{a_{out1}(t)\}^2 + \{a_{out2}(t)\}^2$ from the square values of the amplitudes $\{a_{out1}(t)\}^2$ and $\{a_{out2}(t)\}^2$ of the two RF signals 407$_1$ and 407$_2$, respectively, in the case where the send-out timing of the RF signal 407$_1$ is controlled as shown in the waveform diagram of FIG. 11. FIG. 12 is a waveform diagram showing the time waveform of the combined amplitude of the square values of the amplitudes of the two RF signals output from the dual-band power amplifier (PA) which is an example of the power amplifier 401 shown in FIG. 1. FIG. 12 shows the time waveform of the combined amplitude obtained by a combination of the square values of the amplitudes $\{a_{out1}(t)\}^2$ and $\{a_{out2}(t)\}^2$ of the two RF signals 407$_1$ and 407$_2$, respectively, shown in FIG. 11.

As shown in FIG. 11, by the control exerted on the send-out timing of one RF signal 407$_1$ out of the two RF signals, the peak value of the combined amplitude $\{a_{out1}(t)\}^2 + \{a_{out2}(t)\}^2$ shown in FIG. 12 is reduced by half as compared to the peak value of the combined amplitude shown in FIG. 10, which is the case where no control is exerted on the send-out timing of the RF signal 407$_1$. Accordingly, in the cases shown in FIGS. 11 and 12, the PAR (peak-to-average power ratio) of the square values of the amplitudes $\{a_{out1}(t)\}^2$ and $\{a_{out2}(t)\}^2$ of the two RF signals 407$_1$ and 407$_2$, respectively, is 9.1 dB, and the PAR (peak-to-average power ratio) of the combined amplitude $\{a_{out1}(t)\}^2 + \{a_{out2}(t)\}^2$ is 6.4 dB. As compared to the PAR (9.1 dB) of the combined amplitude $\{a_{out1}(t)\}^2 + \{a_{out2}(t)\}^2$ of the case where no control is exerted on the send-out timing of the RF signal 407$_1$, the PAR (peak-to-average power ratio) of the combined amplitude $\{a_{out1}(t)\}^2 + \{a_{out2}(t)\}^2$ is reduced by 2.7 dB because of the control exerted on the send-out timing of the RF signal 407$_1$. Thanks to the PAR (peak-to-average power ratio) reduction effect of 2.7 dB, the average power efficiency can be improved by 1.35 times in the case of the class-B power amplifier (PA).

The PAR (peak-to-average power ratio) reduction effect of the combined amplitude of the RF signals 407$_1$, 407$_2$, . . . , 407$_n$ and the average power improvement effect of the power amplifier 401 generally depend on the shift amount of the send-out timing of the RF signal waveform.

Figure 13:
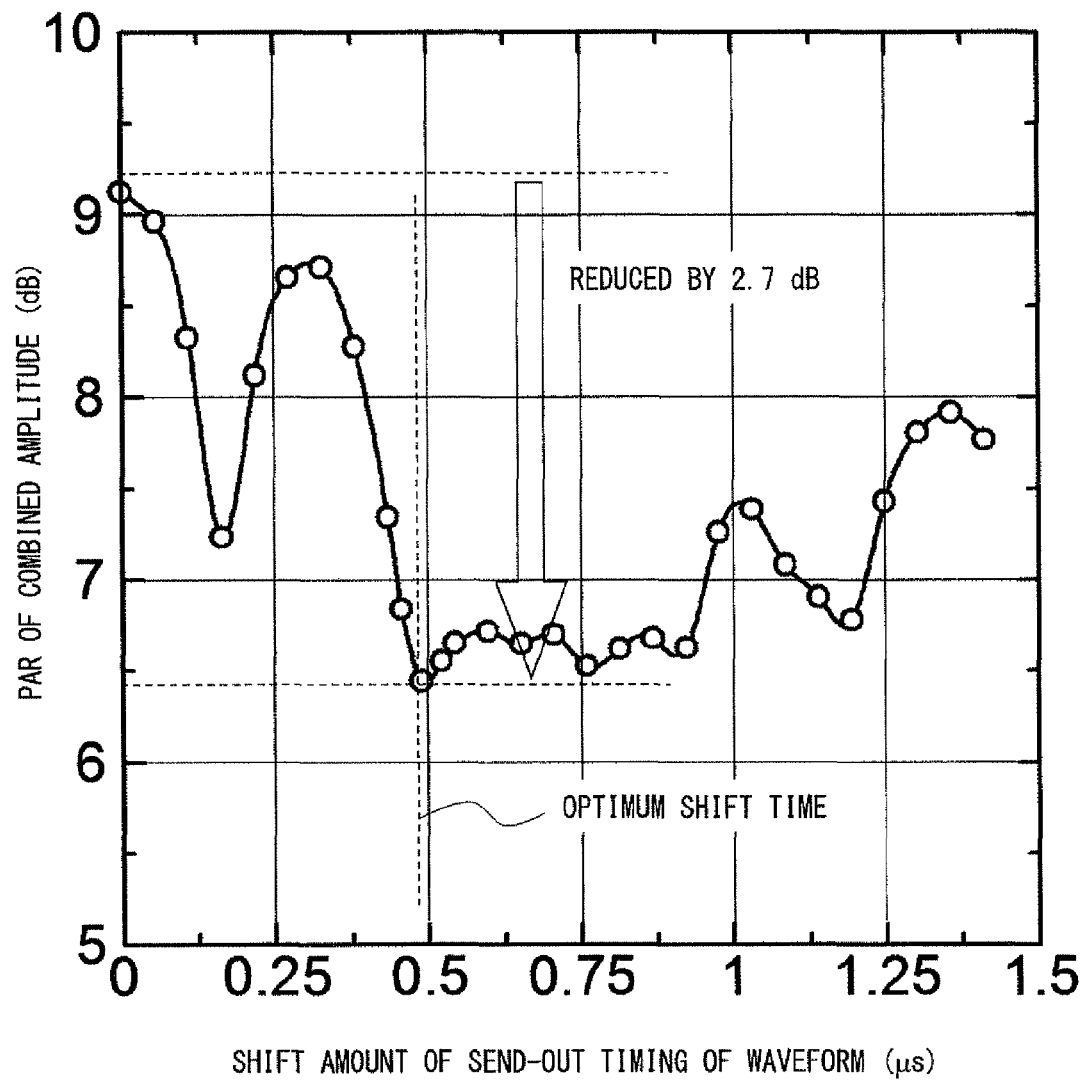
FIG. 13 is a characteristic diagram showing the relationship between the PAR of the combined amplitude of the square values of the amplitudes of the two RF signals output from the dual-band power amplifier (PA) which is an example of the power amplifier shown in FIG. 1 and the shift amount of the send-out timing.

FIG. 13 is a characteristic diagram showing the relationship between the PAR of the combined amplitude of the square values of the amplitudes of the two RF signals output from the dual-band power amplifier (PA) which is an example of the power amplifier shown in FIG. 1 and the shift amount of the send-out timing. FIG. 13 shows the relationship between the combined amplitude $\{a_{out1}(t)\}^2 + \{a_{out2}(t)\}^2$ derived from the square values of the amplitudes $\{a_{out1}(t)\}^2$ and $\{a_{out2}(t)\}^2$ and the shift amount of the send-out timing of the waveform, in the case where a WCDMA signal is sent out with each of the two RF signals 407$_1$ and 407$_2$.

As shown in the characteristic diagram of FIG. 13, the PAR (peak-to-average power ratio) of the combined amplitude $\{a_{out1}(t)\}^2 + \{a_{out2}(t)\}^2$ depends on the shift amount of the send-out timing of the RF signal waveform. In the characteristic diagram of FIG. 13, the optimum shift time with which the reduction amount of the PAR (peak-to-average power ratio) is maximized is 0.5 µs. At this time, the PAR (peak-to-average power ratio) reduction effect of 2.7 dB is obtained.

Figure 14:
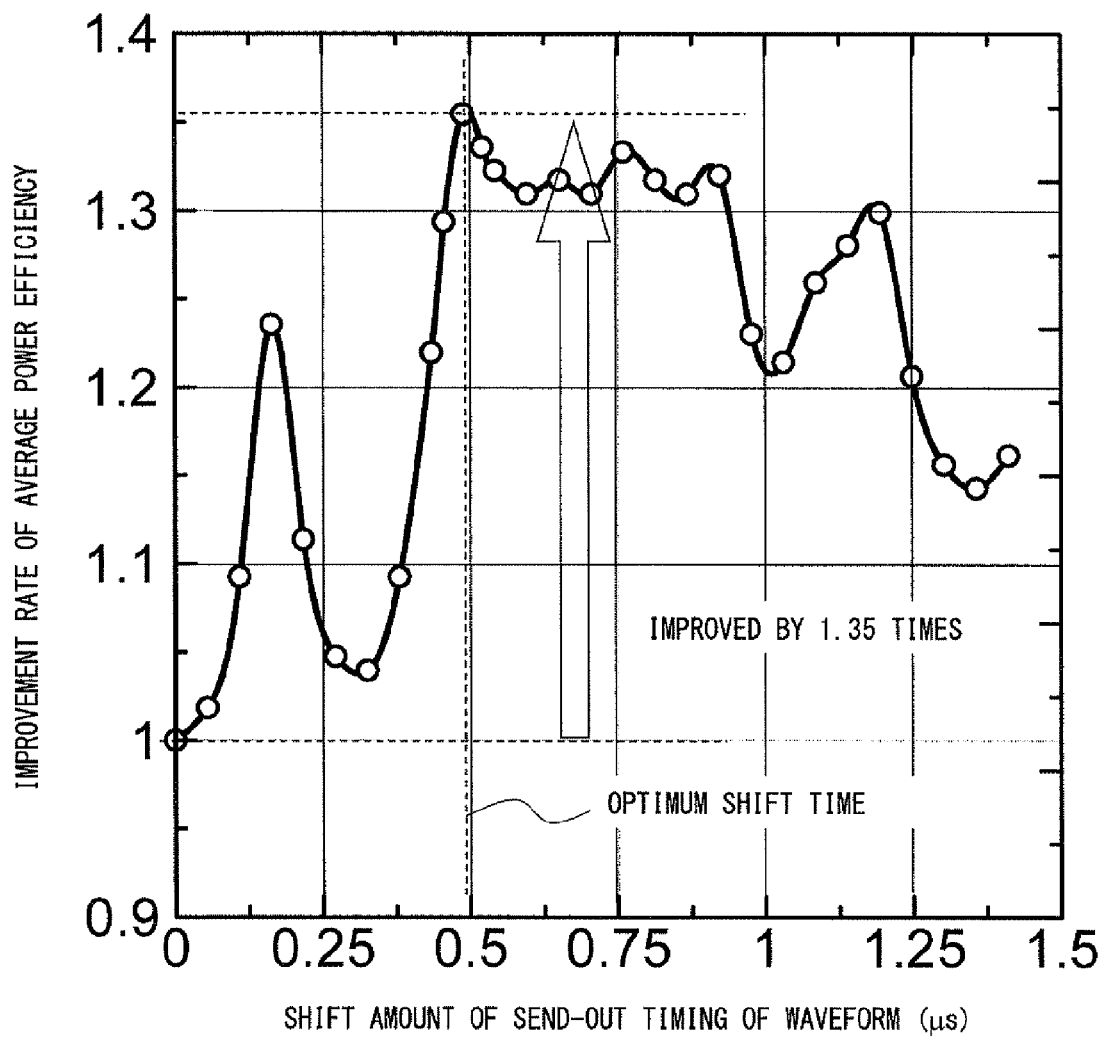
FIG. 14 is a characteristic diagram showing the relationship between the improvement rate of the average power efficiency of the dual-band power amplifier (PA) which is an example of the power amplifier shown in FIG. 1 and the shift amount of the send-out timing of the two RF signals output from the dual-band power amplifier (PA)

FIG. 14 is a characteristic diagram showing the relationship between the improvement rate of the average power efficiency of the dual-band power amplifier (PA) which is an example of the power amplifier 401 shown in FIG. 1 and the shift amount of the send-out timing of the two RF signals output from the dual-band power amplifier (PA). FIG. 14 shows the relationship between the improvement rate of the average power efficiency of the class-B PA which is an example of the power amplifier 401 and the shift amount of the send-out timing, in the case where a WCDMA signal is sent out with each of the two RF signals 407$_1$ and 407$_2$. Here, in FIG. 14, the average power efficiency in the case where the shift amount of the send-out timing is '0' is expressed as '1' as the reference value.

As shown in the characteristic diagram of FIG. 14, the average power efficiency of the power amplifier 401 depends on the shift amount of the send-out timing of the RF signal waveform. In the case of the characteristic diagram of FIG. 14, by the optimum shift time (0.5 µs) for maximizing the PAR reduction amount explained with reference to FIG. 13, the improvement in the average power efficiency is also maximized. The average power is improved by 1.35 times as compared to the case where the shift amount of the send-out timing is '0'.

Figure 15:
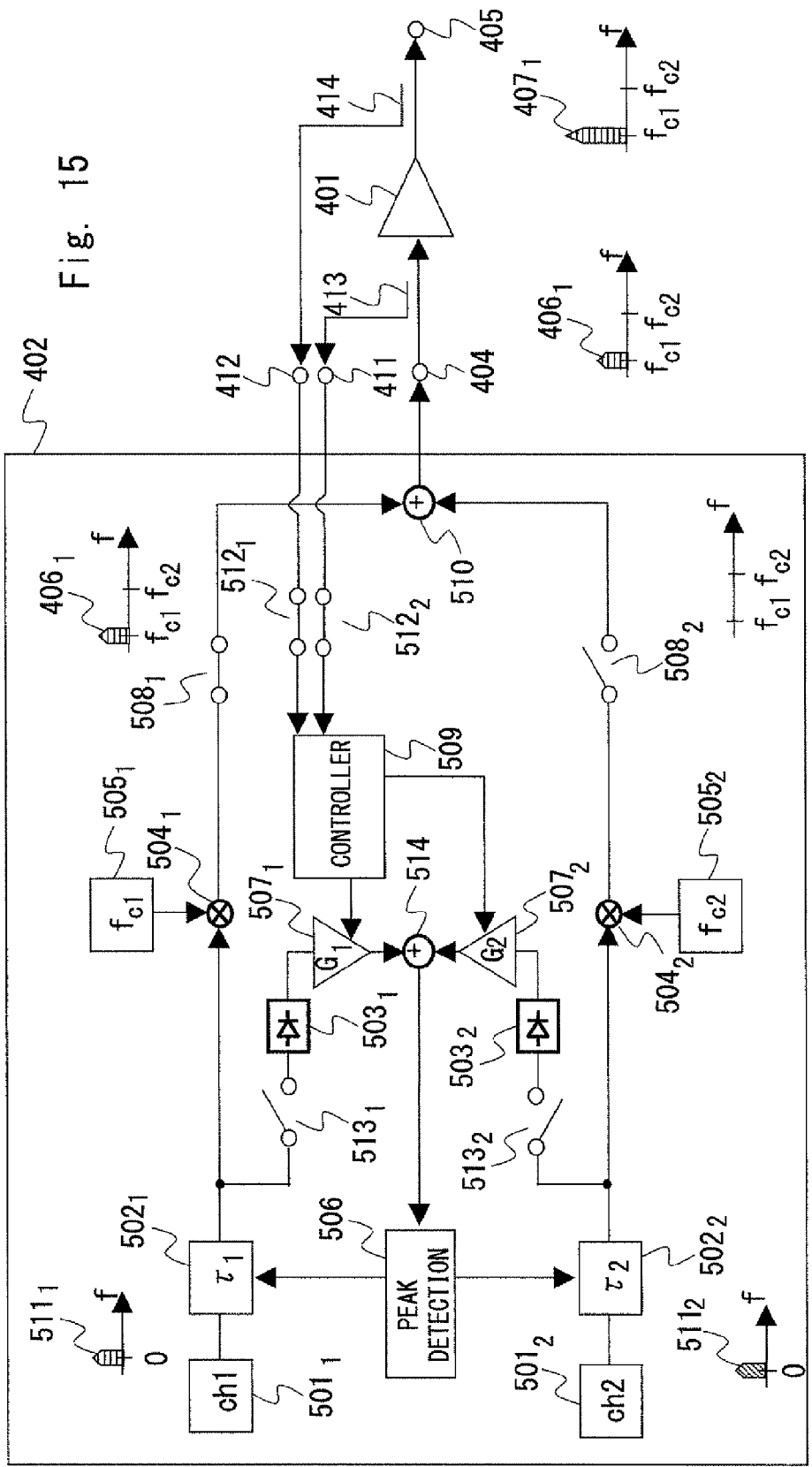
FIG. 15 is a block configuration diagram showing one example of the block configuration of the signal generator of the transmission apparatus shown in FIG. 1.
Figure 16:
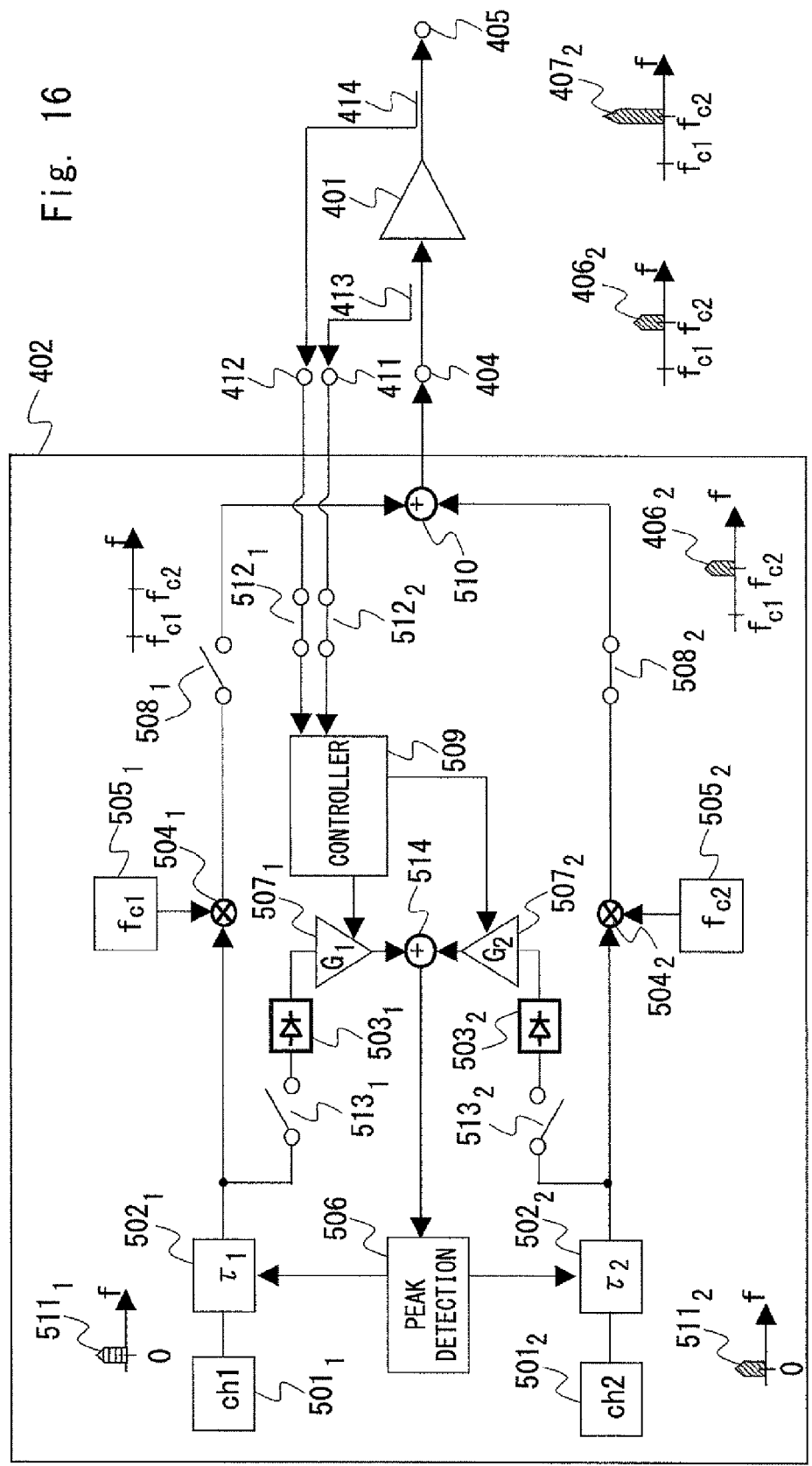
FIG. 16 is a block configuration diagram showing one example of the block configuration of the signal generator of the transmission apparatus shown in FIG. 1.
Figure 17:
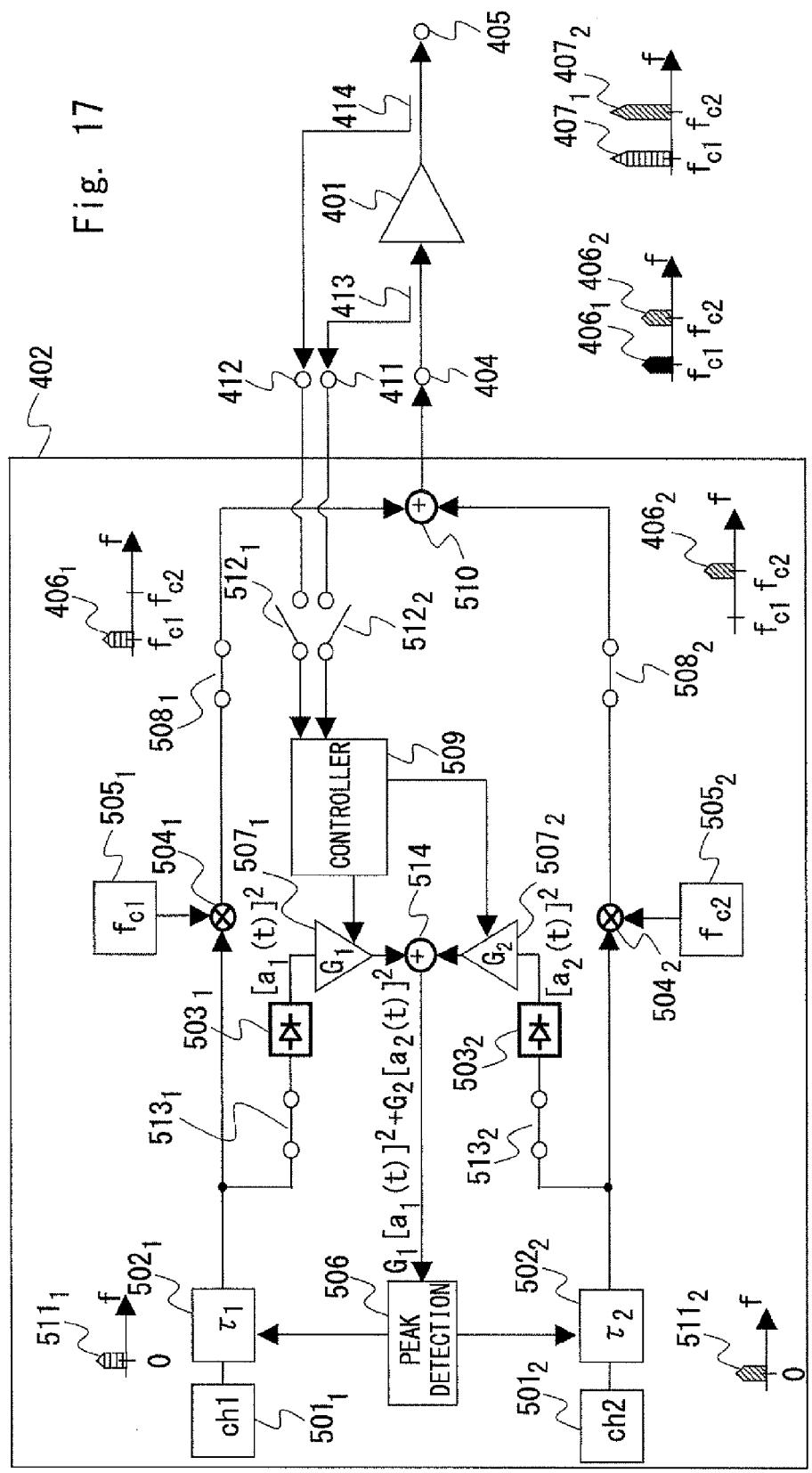
FIG. 17 is a block configuration diagram showing one example of the block configuration of the signal generator of the transmission apparatus shown in FIG. 1.

In consideration of the foregoing discussion, desired embodiments of the signal generator 402 shown in FIG. 1 will be disclosed below with reference to FIGS. 15 to 17. FIGS. 15 to 17 are each a block configuration diagram showing one example of the block configuration of the signal generator 402 of the transmission apparatus shown in FIG. 1. In each of FIGS. 15 to 17, the operation of the signal generator 402 is also shown. That is, the signal generator 402 shown in FIG. 15 shows the operation mode in which the gain of the power amplifier 401 when the RF signal 406$_1$ on the carrier frequency $f_{c1}$ is input is measured. The signal generator 402 shown in FIG. 16 shows the operation mode in which the gain of the power amplifier 401 when the RF signal 406$_2$ on the carrier frequency $f_{c2}$ is input is measured. FIG. 17 shows the actual operation mode in which the RF signal 406$_1$ on the carrier frequency $f_{c1}$ and the RF signal 406$_2$ on the carrier frequency $f_{c2}$ are simultaneously input to the power amplifier 401, and the two RF signals $407_1$ and $407_2$ are sent out from the power amplifier 401.

As disclosed in the block configuration diagrams of FIGS. 15 to 17, the signal generator 402 includes a baseband signal generator $501_1$ and a baseband signal generator $501_2$, the delay adjuster $502_1$ and the delay adjuster $502_2$, the number provided being equal to the number of the baseband signal generators, an amplitude detecting unit $503_1$ and an amplitude detecting unit $503_2$, the number provided being equal to the number of the baseband signal generators, a mixer $504_1$ and a mixer $504_2$, the number provided being equal to the number of the baseband signal generators, a local oscillation (LO) signal generator $505_1$ and a local oscillation (LO) signal generator $505_2$, the number provided being equal to the number of the baseband signal generators, a variable gain amplifier $507_1$ and a variable gain amplifier $507_2$, the number provided being equal to the number of the baseband signal generators, a switch $508_1$ and a switch $508_2$, the number provided being equal to the number of the baseband signal generators, a switch $512_1$ and a switch $512_2$, the number provided being equal to the number of the baseband signal generators, and a switch $513_1$ and a switch $513_2$, the number provided being equal to the number of the baseband signal generators. Further, the signal generator 402 includes at least one peak detector 506 (i.e., an amplitude detector), at least one controller 509 (i.e., a gain control apparatus), at least one adder 510 (i.e., an RF signal adder) and at least one adder 514 (i.e., an amplitude adder).

In the block configuration diagrams of FIGS. 15 to 17, the baseband signal generator $501_1$ sends out a baseband signal $511_1$, and the baseband signal generator $501_2$ sends out a baseband signal $511_2$. The mixer $504_1$ mixes a local oscillation (LO) signal on a frequency $f_{c1}$ output from the local oscillation (LO) signal generator $505_1$ and the baseband signal $511_1$ with each other. As a result, the mixer $504_1$ sends out an RF signal $406_1$ which is the baseband signal $511_1$ upconverted to the carrier frequency $f_{c1}$. Similarly, the mixer $504_2$ mixes a local oscillation (LO) signal on a frequency $f_{c2}$ output from the local oscillation (LO) signal generator $505_2$ and the baseband signal $511_2$ with each other. As a result, the mixer $504_2$ sends out a signal $406_2$ which is the baseband signal $511_2$ upconverted to the carrier frequency $f_{c2}$.

Here, the block configuration diagram of FIG. 15 shows the operation mode in which the gain of the power amplifier 401 when the RF signal $406_1$ on the carrier frequency $f_{c1}$ is input is measured, as described above. That is, in FIG. 15, the signal generator 402 outputs only the RF signal $406_1$ on the carrier frequency $f_{c1}$ to the terminal 404. In this case, the switch $508_1$ is closed and the switch $508_2$ is opened, such that only the RF signal $406_1$ on the carrier frequency $f_{c1}$ is output to the terminal 404, and the RF signal $406_2$ on the carrier frequency $f_{c2}$ is not output to the terminal 404.

In the operation mode shown in FIG. 15, the RF signal $406_1$ input to the power amplifier 401 is output to the terminal 411 via the coupler 413. Further, the RF signal $407_1$ output from the power amplifier 401 is output to the terminal 412 via the coupler 414. The RF signal $406_1$ and the RF signal $407_1$ output to the terminal 411 and the terminal 412, respectively, are output to the controller 509 via the switch $512_1$ and the switch $512_2$, respectively, which are closed. The controller 509 detects the power of the RF signal $406_1$ and that of the RF signal $407_1$, and calculates a gain $G_{PA1}$ of the power amplifier 401 at the carrier frequency $f_{c1}$, based on the power ratio between the RF signal $406_1$ and the RF signal $407_1$.

Further, the block configuration diagram of FIG. 16 shows the operation mode in which the gain of the power amplifier 401 when the RF signal $406_2$ on the carrier frequency $f_{c2}$ is input is measured, as described above. That is, in FIG. 16, the signal generator 402 outputs only the RF signal $406_2$ on the carrier frequency $f_{c2}$ to the terminal 404. In this case, the switch $508_2$ is closed and the switch $508_1$ is opened, such that only the RF signal $406_2$ on the carrier frequency $f_{c2}$ is output to the terminal 404, and the RF signal $406_1$ on the carrier frequency $f_{c1}$ is not output to the terminal 404.

In the operation mode shown in FIG. 16, the RF signal $406_2$ input to the power amplifier 401 is output to the terminal 411 via the coupler 413. Further, the RF signal $407_2$ output from the power amplifier 401 is output to the terminal 412 via the coupler 414. The RF signal $406_2$ and the RF signal $407_2$ output to the terminal 411 and the terminal 412, respectively, are output to the controller 509 via the switch $512_1$ and the switch $512_2$, respectively, which are closed. The controller 509 detects the power of the RF signal $406_2$ and that of the RF signal $407_2$, and calculates a gain $G_{PA2}$ of the power amplifier 401 at the carrier frequency $f_{c2}$, based on the power ratio between the RF signal $406_2$ and the RF signal $407_2$.

In the operation mode in which the gain of the power amplifier 401 is calculated as shown in the block configuration diagrams of FIGS. 15 and 16, the switch $513_1$ and the switch $513_2$ are opened, and no signals are input to the amplitude detecting unit $503_1$ and the amplitude detecting unit $503_2$. In the operation modes shown in the block configuration diagrams of FIGS. 15 and 16, none of the amplitude detecting unit $503_1$ and the amplitude detecting unit $503_2$, the variable gain amplifier $507_1$ and the variable gain amplifier $507_2$, the adder 514, and the peak detector 506 operate.

Further, as described above, the block configuration diagram of FIG. 17 shows the actual operation mode in which the RF signal $406_1$ on the carrier frequency $f_{c1}$ and the RF signal $406_2$ on the carrier frequency $f_{c2}$ are simultaneously input to the power amplifier 401, and the two RF signals $407_1$ and $407_2$ are sent out from the power amplifier 401.

In the operation mode shown in FIG. 17, the switch $508_1$ and the switch $508_2$ are both closed, and the RF signal $406_1$ and the RF signal $406_2$ are input to the adder 510 together. The RF signal $406_1$ and the RF signal $406_2$ are combined at the adder 510, and the RF signal $406_1$ and the RF signal $406_2$ are output to the terminal 404 together.

Further, in the operation mode shown in FIG. 17, the switch $513_1$ and the switch $513_2$ are both closed, and an amplitude square value $\{a_1(t)\}^2$ of the baseband signal $511_1$ is detected by the amplitude detecting unit $503_1$. Further, an amplitude square value $\{a_2(t)\}^2$ of the baseband signal $511_2$ is detected by the amplitude detecting unit $503_2$. The amplitude square value $\{a_1(t)\}^2$ detected by the amplitude detecting unit $503_1$ is amplified by the variable gain amplifier $507_1$ with the gain $G_1$, and output to the adder 514 as an amplified signal $G_1\{a_1(t)\}^2$. Further, the amplitude square value $\{a_2(t)\}^2$ detected by the amplitude detecting unit $503_2$ is amplified by the variable gain amplifier $507_2$ with the gain $G_2$, and output to the adder 514 as an amplified signal $G_2\{a_2(t)\}^2$. The adder 514 outputs the sum of the input signals, i.e., $G_1\{a_1(t)\}^2 + G_2\{a_2(t)\}^2$, to the peak detector 506. The peak detector 506 detects the peak value of the signal $G_1\{a_1(t)\}^2 + G_2\{a_2(t)\}^2$ which has been input for a predetermined certain period.

Here, the variable gain amplifier $507_1$ and the variable gain amplifier $507_2$ may be replaced by variable attenuators.

As the Inter-band Non-contiguous CA mode ($\Delta f \gg f_{BB}$), when the carrier frequency $f_{c1}$ of the RF signal $406_1$ and the carrier frequency $f_{c2}$ of the RF signal $406_2$ input to the power amplifier 401 are greatly separated from each other, as shown in FIG. 3 referred to in the foregoing, the gain of the power amplifier 401 assumes a different value for each frequency.

Accordingly, the gains $G_1$ and $G_2$ of the variable gain amplifiers $507_1$ and $507_2$, respectively, must be set such that the influence of the difference in the gain between the frequencies of the power amplifier 401 is corrected when peak detection is performed by the peak detector 506.

That is, the gain $G_1$ of the variable gain amplifier $507_1$ and the gain $G_2$ of the variable gain amplifier $507_2$ are set such that the ratio between the gain $G_{PA1}$ and the gain $G_{PA2}$ of the power amplifier 401 at the carrier frequency $f_{c1}$ and at the carrier frequency $f_{c2}$ agrees with the ratio between the gain $G_1$ of the variable gain amplifier $507_1$ and the gain $G_2$ of the variable gain amplifier $507_2$. In other words, the gain $G_1$ and the gain $G_2$ are set such that the following relationship is established.

$$G_{PA1}:G_{PA2}=G_1:G_2$$

Setting of the gain $G_1$ of the variable gain amplifier $507_1$ and the gain $G_2$ of the variable gain amplifier $507_2$ is executed by the controller 509 outputting gain control signals to the variable gain amplifier $507_1$ and the variable gain amplifier $507_2$, based respectively on the gain $G_{PA1}$ and the gain $G_{PA2}$ of the power amplifier 401 measured by the controller 509.

In the case where the relationship $G_{PA1}:G_{PA2}=G_1:G_2$ is set such that the ratio between the gain $G_{PA1}$ and the gain $G_{PA2}$ of the power amplifier 401 at respectively the carrier frequency $f_{c1}$ and at the carrier frequency $f_{c2}$ agrees with the ratio between the gain $G_1$ of the variable gain amplifier $507_1$ and the gain $G_2$ of the variable gain amplifier $507_2$, the signal $G_1\{a_1(t)\}^2+G_2\{a_2(t)\}^2$ input to the peak detector 506 becomes proportional to the combined amplitude $\{a_{out1}(t)\}^2+\{a_{out2}(t)\}^2$ of the RF signal $407_1$ and the RF signal $407_2$.

Accordingly, sensing of the peak value of the signal $G_1\{a_1(t)\}^2+G_2\{a_2(t)\}^2$ input to the peak detector 506 is equivalent to sensing of the peak value of the combined amplitude $\{a_{out1}(t)\}^2+\{a_{out2}(t)\}^2$ of the RF signal $407_1$ and the RF signal $407_2$ which are the output signals of the power amplifier 401. The setting of the gain in the above-described manner reflecting the frequency variations of the gain of the power amplifier 401 makes it possible to properly sense the peak value of the combined amplitude of the RF signal $407_1$ and the RF signal $407_2$ output from the power amplifier 401.

Further, in the operation mode shown in FIG. 17, the delay adjuster $502_1$ and the delay adjuster $502_2$ delay the baseband signal $511_1$ and the baseband signal $511_2$, respectively. By the delay control of the baseband signal $511_1$ and the baseband signal $511_2$, the send-out timing of each of the RF signal $406_1$ and the RF signal $406_2$ is also respectively controlled at the same time.

Still further, in the operation mode shown in FIG. 17, the delay amount of the delay adjuster $502_1$ and the delay adjuster $502_2$ is varied, to measure any change in the peak value of the combined amplitude $G_1\{a_1(t)\}^2+G_2\{a_2(t)\}^2$ ($\propto \{a_{out1}(t)\}^2+\{a_{out2}(t)\}^2$) obtained at the peak detector 506. By repetitively performing such measurement of changes in the peak value while varying the delay amount of the delay adjuster $502_1$ and the delay adjuster $502_2$, the optimum delay amount of the delay adjuster $502_1$ and the delay adjuster $502_2$ with which the peak value of the combined amplitude $\{a_{out1}(t)\}^2+\{a_{out2}(t)\}^2$ is minimized is searched for. The delay amount of the delay adjuster $502_1$ and the delay adjuster $502_2$ may be fixed to the optimum delay amount obtained by this search. Alternatively, the optimum delay amount may be continuously searched for over the entire period of the actual operation. From the foregoing procedure, the peak value of the combined amplitude $\{a_{out1}(t)\}^2+\{a_{out2}(t)\}^2$ of the RF signal $407_1$ and the RF signal $407_2$ can be minimized, and a reduction in the PAR (peak-to-average power ratio) of the combined amplitude can be realized.

In connection with the conventional techniques intended for the multi-carrier communication system ($\Delta f \cong f_{BB}$) disclosed in Patent Literatures 1 to 5, the frequency dependence of the gain of the power amplifier is not taken into consideration. Accordingly, in the case where the frequency dependence of the power amplifier is not negligible as in the Inter-band Non-contiguous CA mode ($\Delta f >> f_{BB}$), the peak value of the combined amplitude of the RF signals output from the power amplifier cannot be properly detected. However, in the present embodiment, as described above, even in the case where the frequency dependence of the power amplifier is not negligible, the peak value of the combined amplitude of the RF signals output from the power amplifier can be properly detected.

First Variation of First Embodiment

Figure 18:
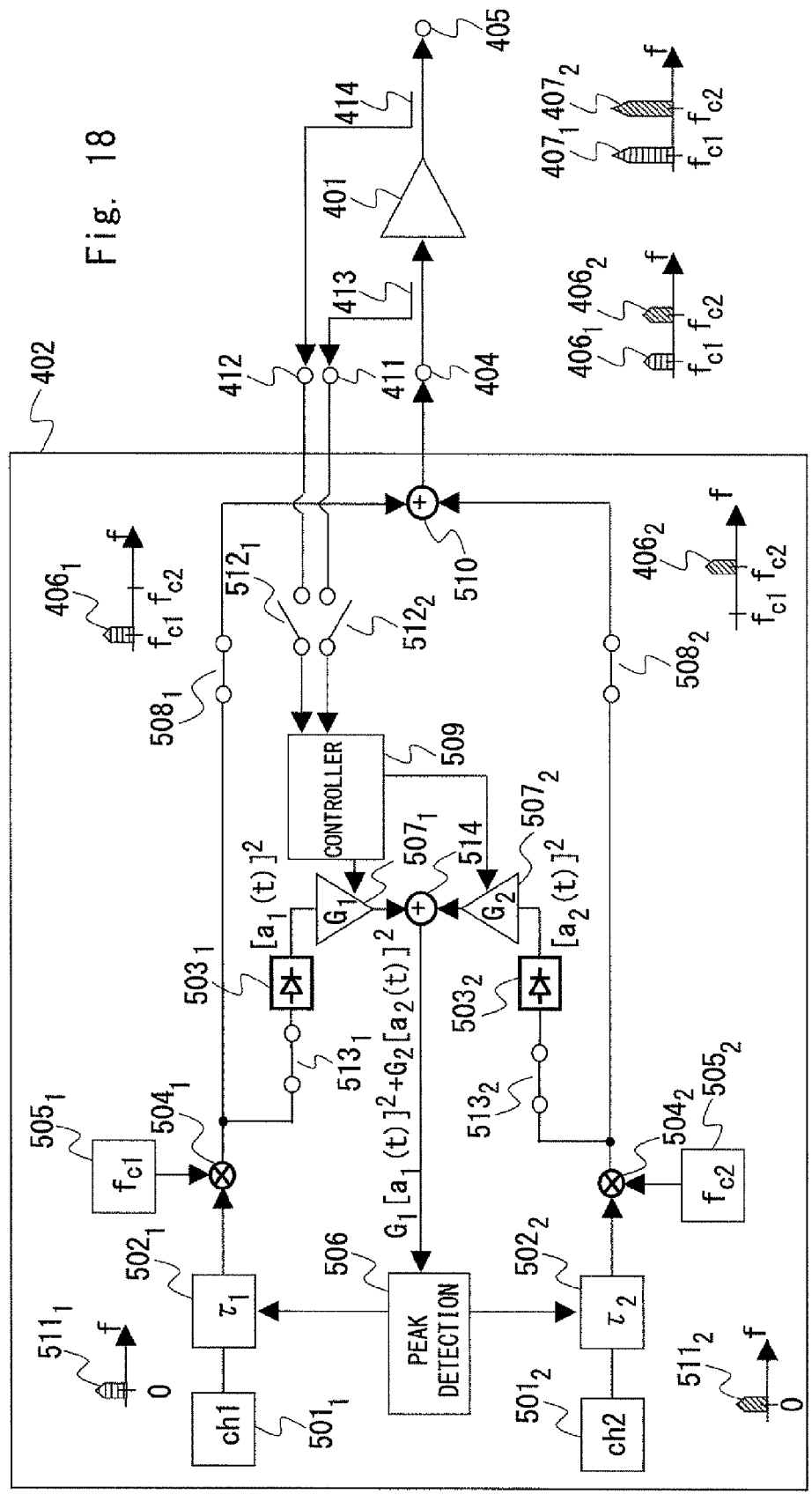
FIG. 18 is a block configuration diagram showing the block configuration of a signal generator according to a first variation of the first embodiment of the present invention.

FIG. 18 is a block configuration diagram showing the block configuration of a signal generator according to a first variation of the first embodiment of the present invention. FIG. 18 shows the first variation of the block configuration of the signal generator 402 shown in FIGS. 15 to 17 as the first embodiment.

In the signal generator 402 shown in FIG. 18, one end of the switch $513_1$ and that of the switch $513_2$ are connected to the output side of the mixer $504_1$ and mixer $504_2$. The amplitude detecting unit $503_1$ and the amplitude detecting unit $503_2$ detect the amplitudes of the RF signal $406_1$ and the RF signal $406_2$. Except for the connection position of the one end of the switch $513_1$ and that of the switch $513_2$, the block configuration in the signal generator 402 is identical between the first embodiment shown in FIGS. 15 to 17 and the first variation of the first embodiment shown in FIG. 18.

Accordingly, with the signal generator 402 according to the first variation of the first embodiment shown in FIG. 18 also, the operation which is identical to that of the first embodiment shown in FIGS. 15 to 17 can be achieved. As a result, in the first variation of the first embodiment shown in FIG. 18 also, the function and effect which are totally identical to those of the first embodiment shown in FIGS. 15 to 17 can be achieved.

Second Variation of First Embodiment

Figure 19:
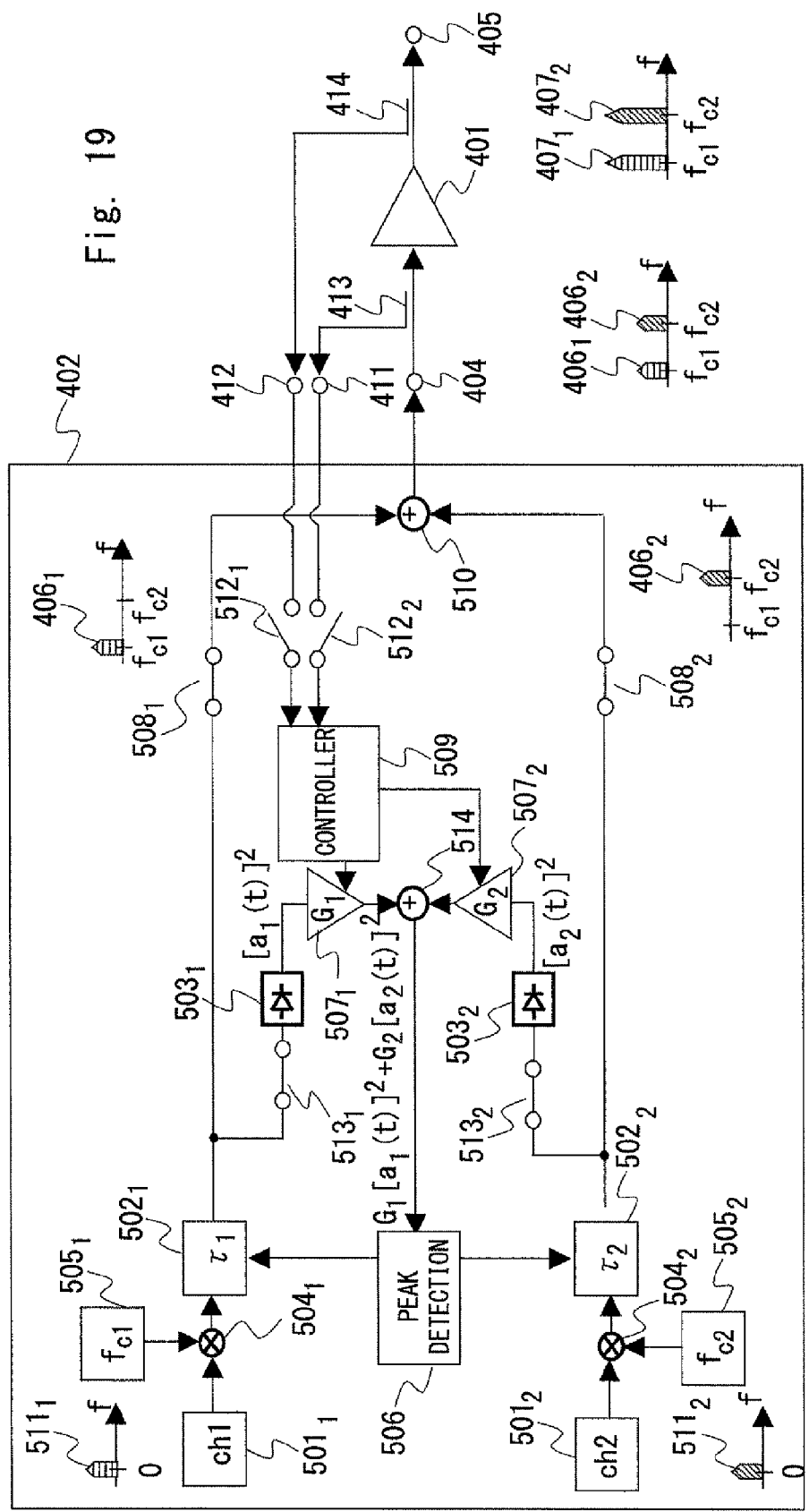
FIG. 19 is a block configuration diagram showing the block configuration of a signal generator according to a second variation of the first embodiment of the present invention.

FIG. 19 is a block configuration diagram showing the block configuration of a signal generator according to a second variation of the first embodiment of the present invention. In particular, FIG. 19 shows the second variation of the block configuration of the signal generator 402 shown in FIGS. 15 to 17 as the first embodiment.

In the signal generator 402 shown in FIG. 19, the delay adjuster $502_1$ and the delay adjuster $502_2$ are provided on the output side of the mixer $504_1$ and the mixer $504_2$. Except for the disposition position of the delay adjuster $502_1$ and delay adjuster $502_2$, the block configuration in the signal generator 402 is identical between the first embodiment shown in FIGS. 15 to 17 and the second variation of the first embodiment shown in FIG. 19.

Accordingly, with the signal generator 402 according to the second variation of the first embodiment shown in FIG. 19 also, the operation which is identical to that in the first embodiment shown in FIGS. 15 to 17 can be achieved. As a result, in the second variation of the first embodiment shown in FIG. 19 also, the function and effect which are totally identical to those of the first embodiment shown in FIGS. 15 to 17 can be achieved.

Third Variation of First Embodiment

Figure 20:
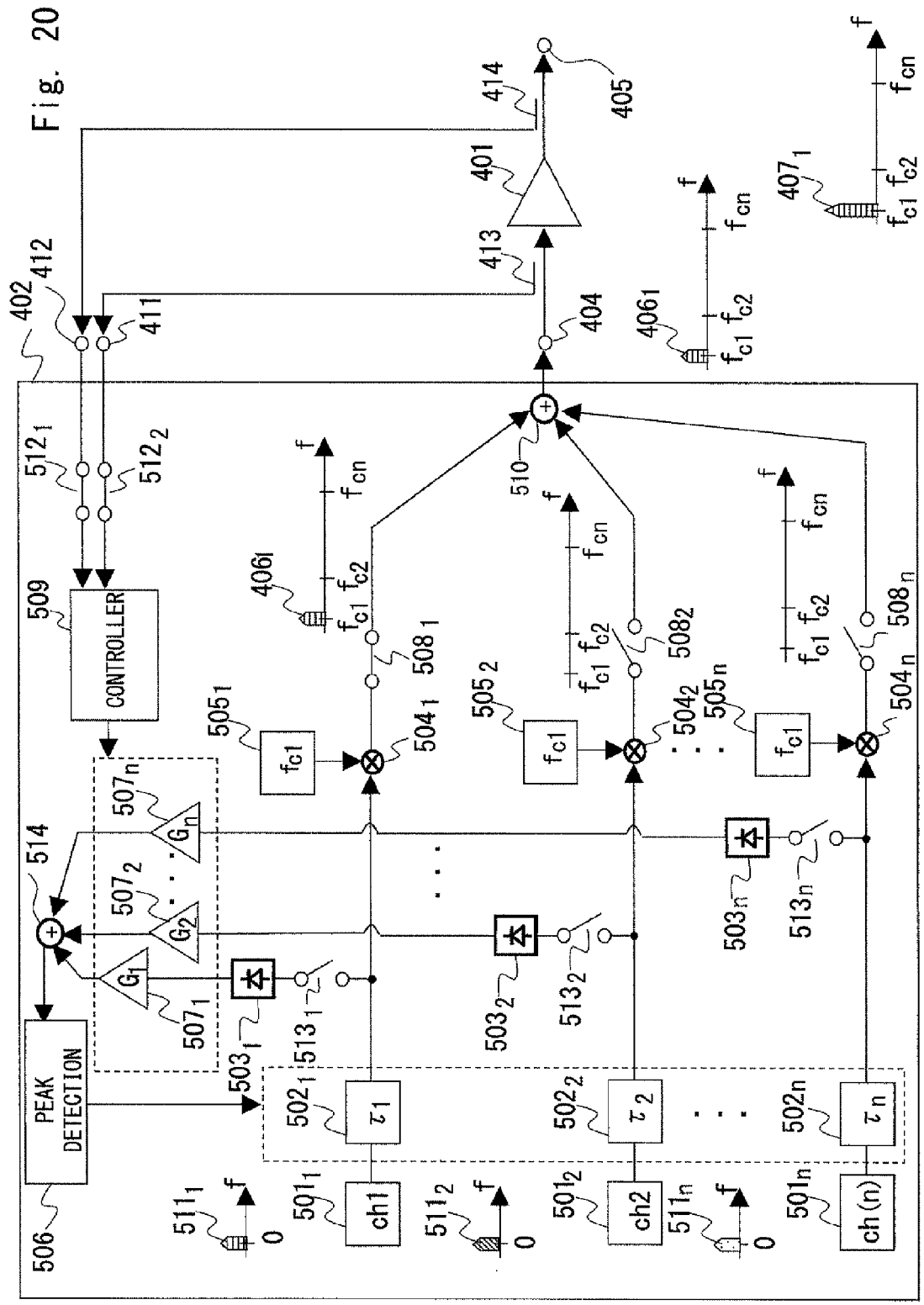
FIG. 20 is a block configuration diagram showing the block configuration of a signal generator according to a third variation of the first embodiment of the present invention.
Figure 21:
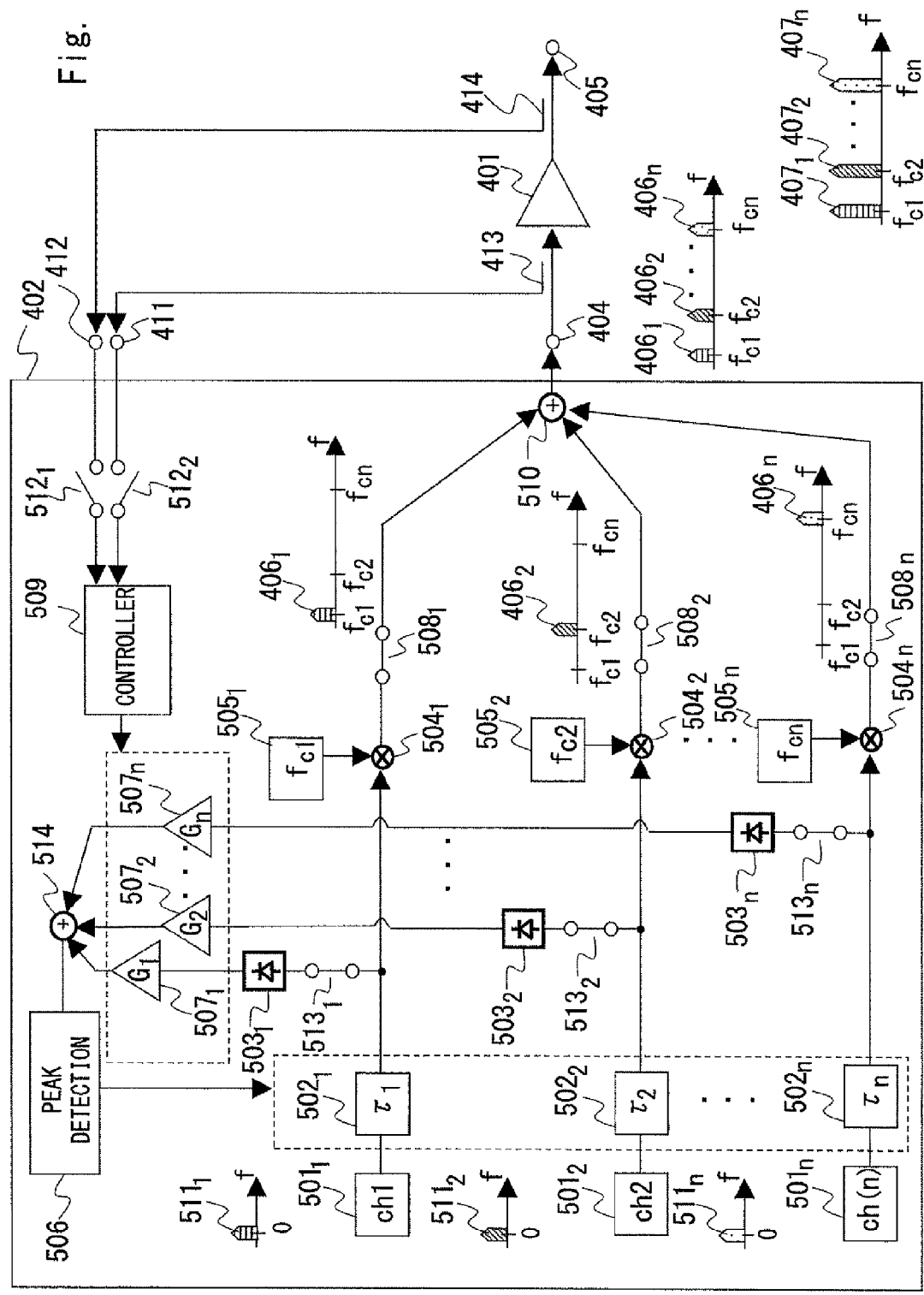
FIG. 21 is a block configuration diagram showing the block configuration of a signal generator according to a third variation of the first embodiment of the present invention.

FIGS. 20 and 21 are each a block configuration diagram showing the block configuration of a signal generator according to a third variation of the first embodiment of the present invention. Each of FIGS. 20 and 21 shows the third variation of the block configuration of the signal generator 402 shown in FIGS. 15 to 17 as the first embodiment. Further, FIGS. 20 and 21 each show the operation of the signal generator 402 also. That is, similarly to FIG. 15, FIG. 20 shows the mode in which the gain $G_{PA1}$ of the power amplifier 401 at the carrier frequency $f_{c1}$ is measured. Similarly to FIG. 17, FIG. 21 shows the actual operation mode in which the RF signal $406_1$ on the carrier frequency $f_{c1}$ to the RF signal $406_n$ on the carrier frequency $f_{cn}$ are simultaneously input to the power amplifier 401, and n-RF signals, namely the RF signals $407_1$ to the RF signal $407_n$, are output from the power amplifier 401.

In the first embodiment shown in FIGS. 15 to 17, the RF signal $406_1$ and the RF signal $406_2$ on two carrier frequencies are output from the signal generator 402. On the other hand, in the third variation of the first embodiment shown in FIGS. 20 and 21, the RF signals $406_1$ to $406_n$ on n-carrier frequencies (n: an integer of 2 or greater) are output from the signal generator 402. That is, in the third variation of the first embodiment, the number of channels (the number of carrier frequencies) of transmitted signals is expanded to the general channel numbers.

Firstly, as described above, similarly to FIG. 15, the signal generator 402 shown in FIG. 20 shows the mode in which the gain $G_{PA1}$ of the power amplifier 401 at the carrier frequency $f_{c1}$ is measured. That is, in FIG. 20, the signal generator 402 outputs solely the RF signal $406_1$ on the carrier frequency $f_{c1}$ to the terminal 404. In this case, the switch $508_1$ is closed and other switches $508_2$ to $508_n$ are opened, such that solely the RF signal $406_1$ on the carrier frequency $f_{c1}$ is output to the terminal 404, and other RF signals $406_2$ to $406_n$ on the carrier frequencies $f_{c2}$ to $f_{cn}$ are not output to the terminal 404.

In the block configuration diagram of FIG. 20, the RF signal $406_1$ input to the power amplifier 401 is output to the terminal 411 via the coupler 413. Further, the RF signal $407_1$ output from the power amplifier 401 is output to the terminal 412 via the coupler 414. The RF signal $406_1$ and the RF signal $407_1$ output to the terminal 411 and the terminal 412 are output to the controller 509 via the closed switches $512_1$ and $512_2$. The controller 509 detects the power of the RF signal $406_1$ and that of the RF signal $407_1$, and calculates the gain $G_{PA1}$ of the power amplifier 401 at the carrier frequency $f_{c1}$ based on the power ratio between the RF signal $406_1$ and the RF signal $407_1$.

Subsequently, after the switch $508_1$ is opened, solely one of the switches $508_2$ to $508_n$ is closed in turn in the similar procedure. Thus, solely the RF signal on one carrier frequency out of the RF signals $406_2$ to $406_n$ on the carrier frequencies $f_{c2}$ to $f_{cn}$ is input in turn from the signal generator 402 to the power amplifier 401 via the terminal 404, and the gain of the power amplifier 401 is measured. In this manner, the gain $G_{PA2}$ to the gain $G_{PAn}$ of the power amplifier 401 at the carrier frequency $f_{c2}$ to the carrier frequency $f_{cn}$ are calculated in turn.

In the gain measuring mode shown in the block configuration diagram of FIG. 20, the switch $513_1$ to the switch $513_n$ are opened, and no signals are input to the amplitude detecting unit $503_1$ to the amplitude detecting unit $503_n$. In the gain measuring mode shown in the block configuration diagram of FIG. 20, none of the amplitude detecting unit $503_1$ to the amplitude detecting unit $503_n$, the variable gain amplifier $507_1$ to the variable gain amplifier $507_n$, the adder 514, and the peak detector 506 operate.

Further, as described above, similarly to FIG. 17, the block configuration diagram in FIG. 21 shows the actual operation mode in which n-signals, namely the RF signal $406_1$ on the carrier frequency $f_{c1}$ to the RF signal $406_n$ on the carrier frequency $f_{cn}$, are simultaneously input to the power amplifier 401, and n-signals, namely the RF signal $407_1$ to the RF signal $407_n$, are sent out from the power amplifier 401.

In the operation mode shown in FIG. 21, similarly to FIG. 17, the switch $508_1$ to the switch $508_n$ are all closed, and the RF signal $406_1$ to the RF signal $406_n$ all input to the adder 510. The RF signal $406_1$ to the RF signal $406_n$ are combined at the adder 510, and the RF signal $406_1$ to the RF signal $406_n$ are all output to the terminal 404.

Further, in the operation mode shown in FIG. 21, the switch $513_1$ to the switch $513_n$ are all closed, and the amplitude square value $\{a_1(t)\}^2$ to the amplitude square value $\{a_n(t)\}^2$ of the baseband signal $511_1$ to the baseband signal $511_n$ are detected by the amplitude detecting unit $503_1$ to the amplitude detecting unit $503_n$, respectively. The amplitude square value $\{a_1(t)\}^2$ to the amplitude square value $\{a_n(t)\}^2$ detected by the amplitude detecting unit $503_1$ to the amplitude detecting unit $503_n$ are amplified by the variable gain amplifier $507_1$ to the variable gain amplifier $507_n$ with the gain $G_1$ to the gain $G_n$, respectively, and output to the adder 514 as the amplified signal $G_1\{a_1(t)\}^2$ to the amplified signal $G_n\{a_n(t)\}^2$. The adder 514 outputs $G_1\{a_1(t)\}^2 + G_2\{a_2(t)\}^2 + \ldots + G_n\{a_n(t)\}^2$ which is the sum of the input signals to the peak detector 506. The peak detector 506 detects the peak value of the signal $G_1\{a_1(t)\}^2 + G_2\{a_2(t)\}^2 \ldots + G_n\{a_n(t)\}^2$ having been input for a predetermined certain period.

Here, the gain $G_1$ to the gain $G_n$ of the variable gain amplifier $507_1$ to the variable gain amplifier $507_n$ are set such that the relationship $G_{PA1}:G_{PA2}:\ldots:G_{PAn} = G_1:G_2:\ldots:G_n$ is established, based on the gain $G_{PA1}$ to the gain $G_{PAn}$ of the power amplifier 401 measured by the controller 509.

The setting of the gain $G_1$ to the gain $G_n$ of the variable gain amplifier $507_1$ to the variable gain amplifier $507_n$ in this manner allows the signal $G_1\{a_1(t)\}^2 + G_2\{a_2(t)\}^2 + \ldots + G_n\{a_n(t)\}^2$ input to the peak detector 506 to become proportional to the combined amplitude $\{a_{out1}(t)\}^2 + \{a_{out2}(t)\}^2 + \ldots + \{a_{outn}(t)\}^2$ of the RF signal $407_1$ to the RF signal $407_n$.

Accordingly, sensing of the peak value of the combined amplitude $G_1\{a_1(t)\}^2 + G_2\{a_2(t)\}^2 + \ldots + G_n\{a_n(t)\}^2$ of the signals having been input to the peak detector 506 is equivalent to sensing of the peak value of the combined amplitude $\{a_{out1}(t)\}^2 + \{a_{out2}(t)\}^2 + \ldots + \{a_{outn}(t)\}^2$ of the RF signal $407_1$ to the RF signal $407_n$ which are the output signals of the power amplifier 401. The setting of the gain in the above-described manner reflecting the frequency variations of the gain of the power amplifier 401 makes it possible to properly sense the peak value of the combined amplitude of the RF signal $407_1$ to the RF signal $407_n$ output from the power amplifier 401.

Further, in the operation mode shown in FIG. 21, the delay adjuster $502_1$ to the delay adjuster $502_n$ delay the baseband signal $511_1$ to the baseband signal $511_n$. By the delay control of the baseband signal $511_1$ to the baseband signal $511_n$, the send-out timing of each of the RF signal $406_1$ to the RF signal $406_n$ is also controlled at the same time.

Still further, in the operation mode shown in FIG. 21, the delay amount of the delay adjuster $502_1$ to the delay adjuster $502_n$ is varied, to measure any change in the peak value of the combined amplitude $G_1\{a_1(t)\}^2 + G_2\{a_2(t)\}^2 + \ldots + G_n\{a_n(t)\}^2 (\propto \{a_{out1}(t)\}^2 + \{a_{out2}(t)\}^2 + \ldots + \{a_{outn}(t)\}^2)$ obtained at the peak detector 506. By repetitively performing such measurement of changes in the peak value while varying the delay amount of the delay adjuster $502_1$ to the delay adjuster $502_n$, the optimum delay amount of the delay adjuster $502_1$ to the delay adjuster $502_n$ with which the peak value of the combined amplitude $\{a_{out1}(t)\}^2 + \{a_{out2}(t)\}^2 + \ldots + \{a_{outn}(t)\}^2$ is minimized is searched for. The delay amount of the delay adjuster $502_1$ to the delay adjuster $502_n$ may be fixed to the optimum delay amount obtained by this search. Alternatively, the optimum delay amount may be continuously searched for over the entire period of the actual operation. From the foregoing procedure, the peak value of the combined amplitude $\{a_{out1}(t)\}^2 + \{a_{out2}(t)\}^2 + \ldots + \{a_{outn}(t)\}^2$ of the RF signal $407_1$ to the RF signal $407_n$ can be minimized, and a reduction in the PAR (peak-to-average power ratio) of the combined amplitude can be realized.

Second Embodiment

Figure 22:
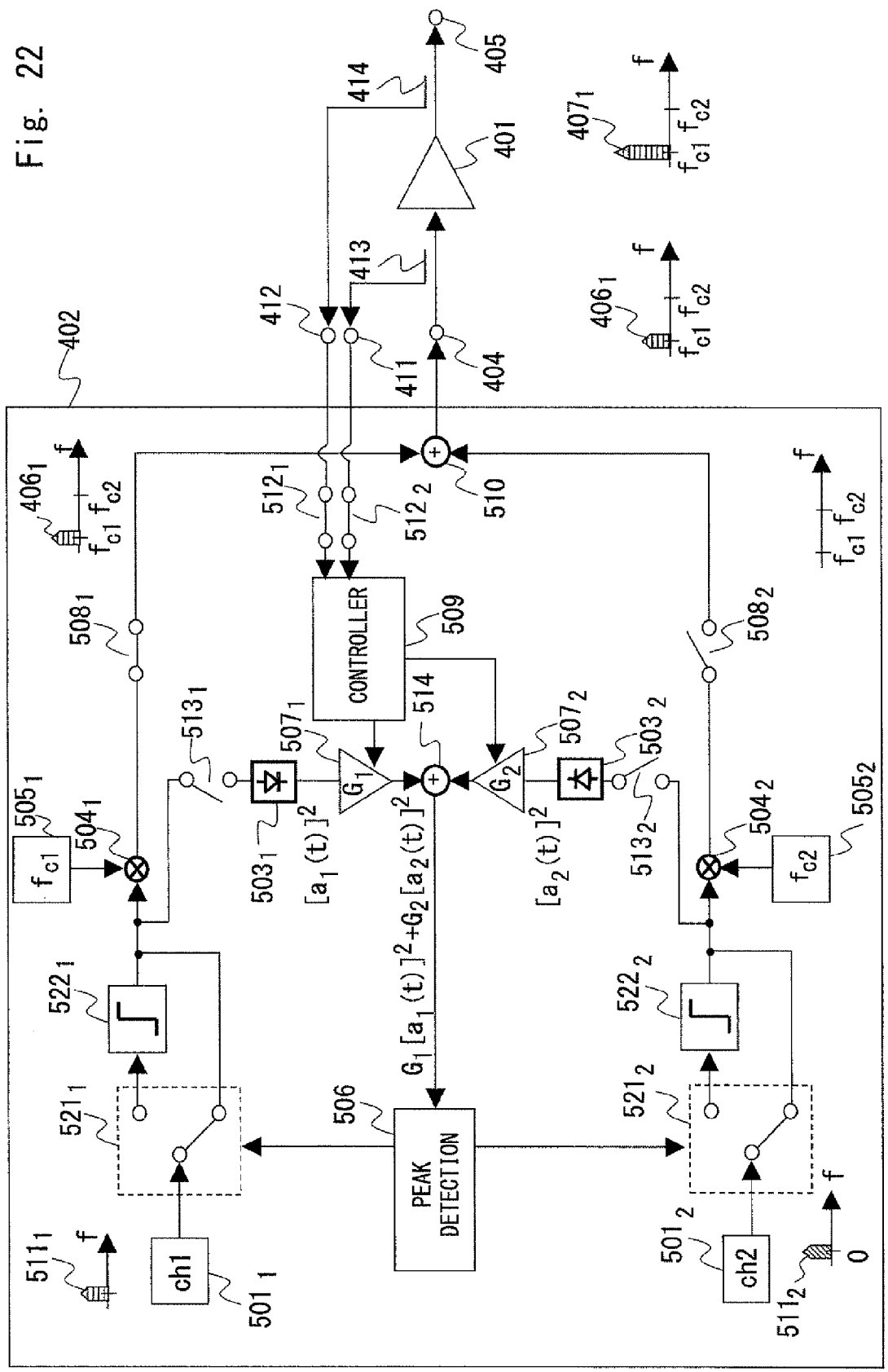
FIG. 22 is a block configuration diagram showing the block configuration of the signal generator in the transmission apparatus according to the second embodiment of the present invention.
Figure 23:
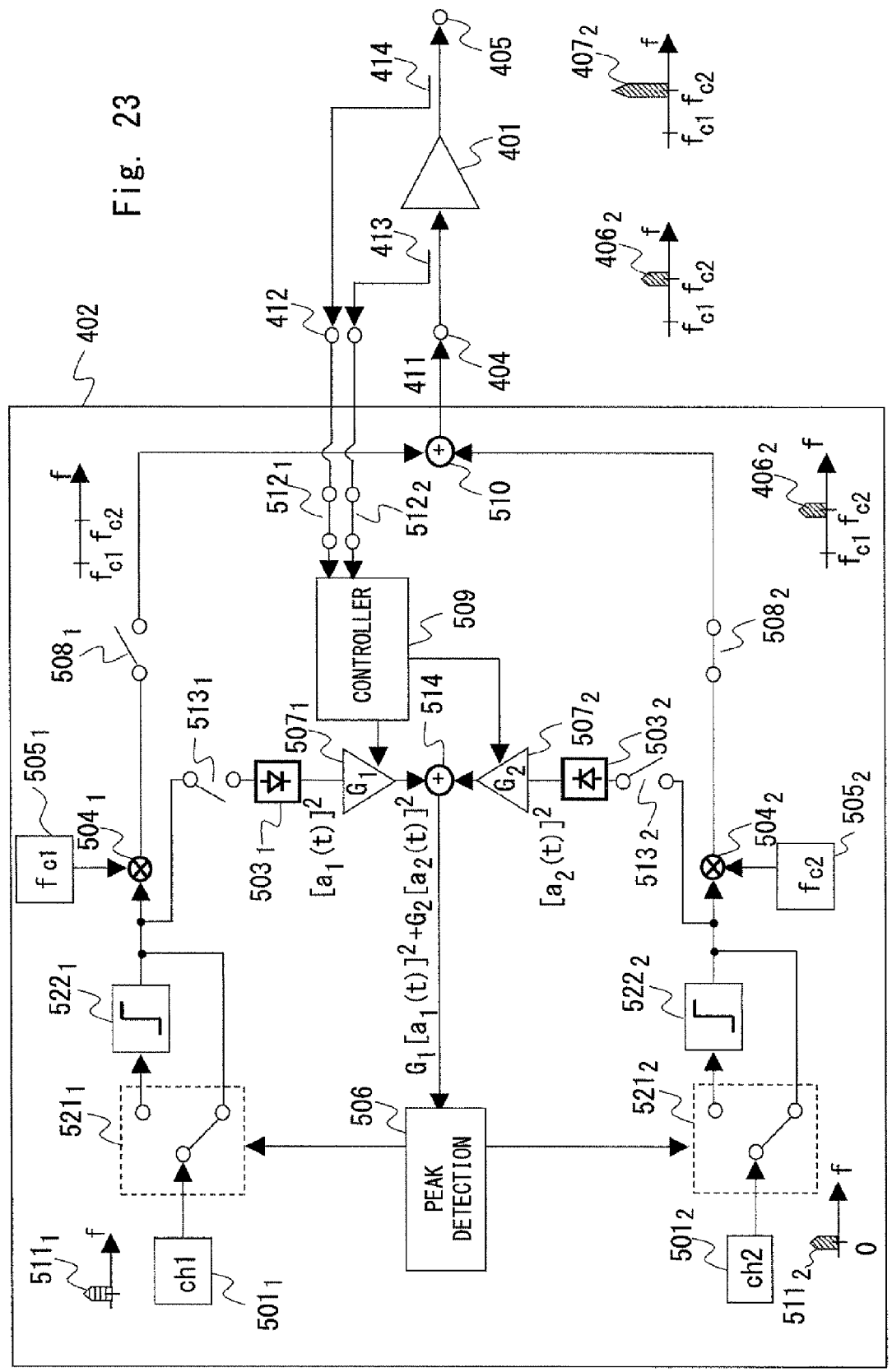
FIG. 23 is a block configuration diagram showing the block configuration of the signal generator in the transmission apparatus according to the second embodiment of the present invention.
Figure 24:
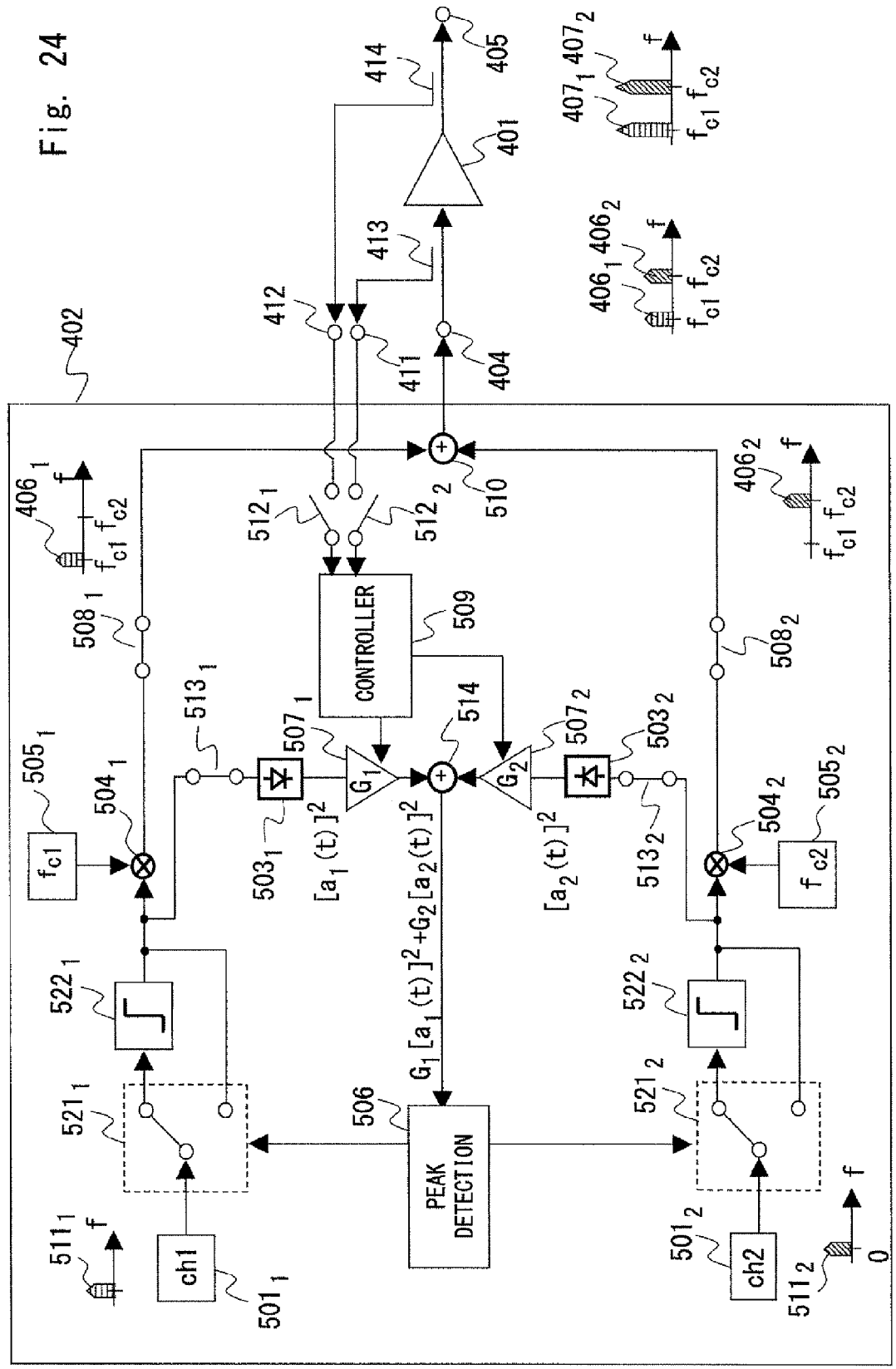
FIG. 24 is a block configuration diagram showing the block configuration of the signal generator in the transmission apparatus according to the second embodiment of the present invention.
Figure 25:
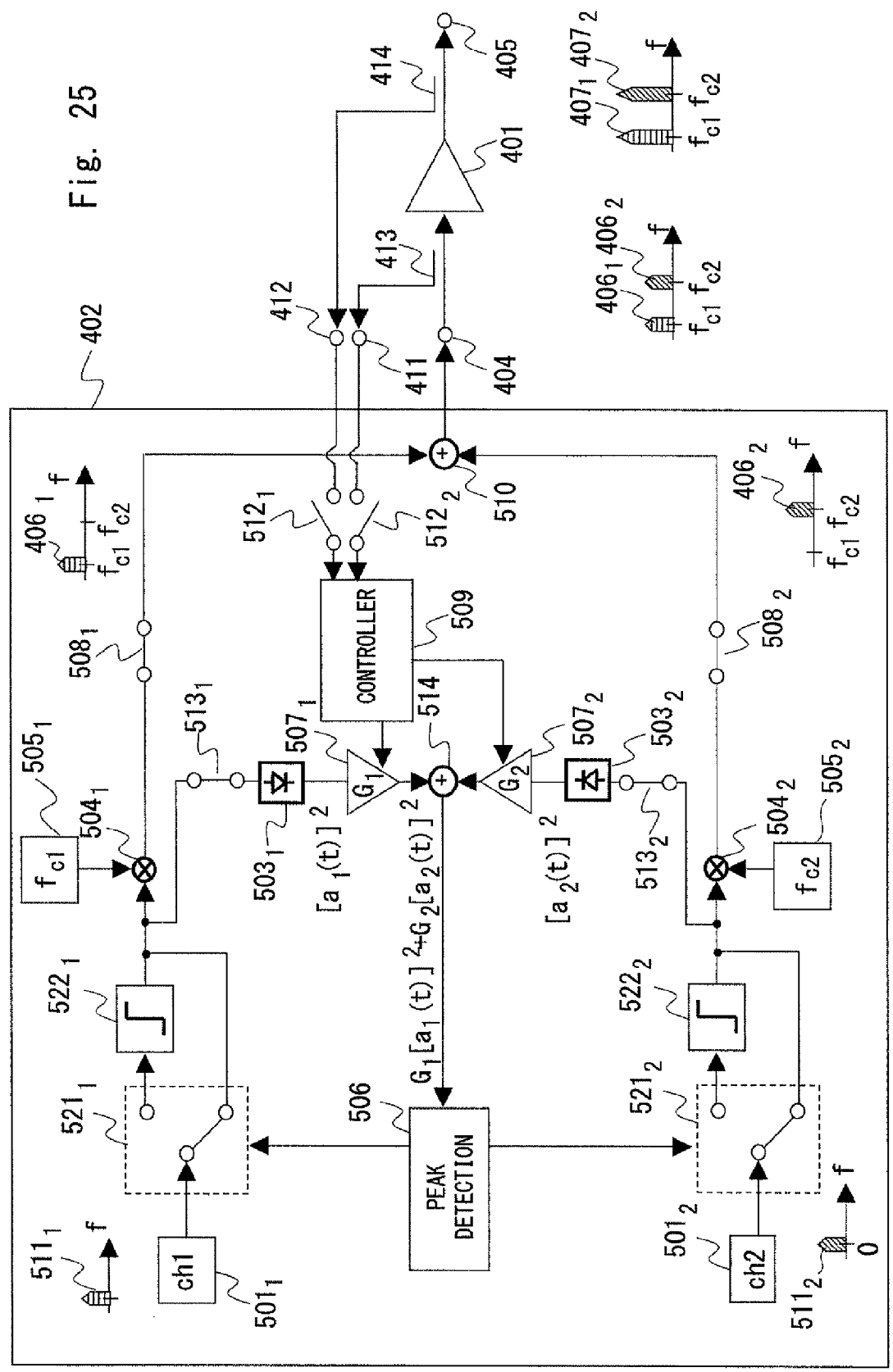
FIG. 25 is a block configuration diagram showing the block configuration of the signal generator in the transmission apparatus according to the second embodiment of the present invention.

Next, a transmission apparatus according to a second embodiment of the present invention is disclosed, particularly focusing on a signal generator in the transmission apparatus. FIGS. 22 to 25 are each a block configuration diagram showing the block configuration of the signal generator in the transmission apparatus according to the second embodiment of the present invention. Similarly to FIGS. 15 to 17 each showing the block configuration of the signal generator 402 according to the first embodiment, the operation of the signal generator is also shown. That is, the signal generator 402 shown in FIG. 22 shows the operation mode in which the gain of the power amplifier 401 when the RF signal $406_1$ on the carrier frequency $f_{c1}$ is input is measured. The signal generator 402 shown in FIG. 23 shows the operation mode in which the gain of the power amplifier 401 when the RF signal $406_2$ on the carrier frequency $f_{c2}$ is input is measured. FIGS. 24 and 25 each show the actual operation mode in which the RF signal $406_1$ on the carrier frequency $f_{c1}$ and the RF signal $406_2$ on the carrier frequency $f_{c2}$ are simultaneously input to the power amplifier 401, and the two RF signals $407_1$ and $407_2$ are sent out from the power amplifier 401.

Here, as shown in FIGS. 22 to 25, the block configuration of the signal generator 402 according to the second embodiment corresponds to the signal generator 402 according to the first embodiment shown in FIGS. 15 to 17 in which the delay adjuster $502_1$ is replaced by a switch $521_1$ and a limiter $522_1$ and in which the delay adjuster $502_2$ is replaced by a switch $521_2$ and a limiter $522_2$. Except for the delay adjuster $502_1$ being replaced by the switch $521_1$ and the limiter $522_1$ and for the delay adjuster $502_2$ being replaced by the switch $521_2$ and the limiter $522_2$, the block configuration in the signal generator 402 is identical between the first embodiment shown in FIGS. 15 to 17 and the second embodiment shown in FIGS. 22 to 25, and the same operations are performed. Note that, in the operation modes shown in FIGS. 22, 23 and 25, the switch $521_1$ and the switch $521_2$ are set so as not to allow the limiter $522_1$ and the limiter $522_2$ to operate. On the other hand, in the operation mode shown in FIG. 24, the switch $521_1$ and the switch $521_2$ are set so as to allow the limiter $522_1$ and the limiter $522_2$ to operate.

In the signal generator 402 according to the first embodiment shown in FIGS. 15 to 17, the PAR (peak-to-average power ratio) of the combined amplitude of the RF signal $407_1$ and the RF signal $407_2$ is reduced by control exerted on the send-out timing of the baseband signals $511_1$ and $511_2$ and the RF signals $406_1$ and $406_2$. On the other hand, in the signal generator 402 according to the second embodiment shown in FIGS. 22 to 25, the PAR (peak-to-average power ratio) of the combined amplitude of the RF signal $407_1$ and the RF signal $407_2$ is reduced by the limiter $522_1$ and the limiter $522_2$ limiting the amplitude peak value of the baseband signals $511_1$ and $511_2$ and the RF signals $406_1$ and $406_2$.

In the following, a detailed description will be given of the transmission apparatus according to the second embodiment of the present invention, particularly as to the signal generator in the transmission apparatus, with reference to the block configuration diagrams of the signal generator 402 shown in FIGS. 22 to 25.

As described above, the block configuration diagram of FIG. 22 shows the operation mode in which the gain of the power amplifier 401 when the RF signal $406_1$ on the carrier frequency $f_{c1}$ is input is measured. That is, in FIG. 22, the signal generator 402 outputs only the RF signal $406_1$ on the carrier frequency $f_{c1}$ to the terminal 404. In this case, the switch $508_1$ is closed and the switch $508_2$ is opened, such that solely the RF signal $406_1$ on the carrier frequency $f_{c1}$ is output to the terminal 404, and the RF signal $406_2$ on the carrier frequency $f_{c2}$ is not output to the terminal 404.

In the operation mode shown in FIG. 22, the switch $521_1$ is closed to establish the route through which the baseband signal $511_1$ is directly input to the mixer $504_1$, while the limiter $522_1$ is unused. The RF signal $406_1$ input to the power amplifier 401 is output to the terminal 411 via the coupler 413. Further, the RF signal $407_1$ output from the power amplifier 401 is output to the terminal 412 via the coupler 414. The RF signal $406_1$ and the RF signal $407_1$ output to the terminal 411 and the terminal 412 are output to the controller 509 via the closed switches $512_1$ and $512_2$. The controller 509 detects the power of the RF signal $406_1$ and that of the RF signal $407_1$, and calculates the gain $G_{PA1}$ of the power amplifier 401 at the carrier frequency $f_{c1}$ based on the power ratio between the RF signal $406_1$ and the RF signal $407_1$.

Further, as described above, the block configuration diagram of FIG. 23 shows the operation mode in which the gain of the power amplifier 401 when the RF signal $406_2$ on the carrier frequency $f_{c2}$ is input is measured. That is, in FIG. 23, the signal generator 402 outputs solely the RF signal $406_2$ on the carrier frequency $f_{c2}$ to the terminal 404. In this case, the switch $508_2$ is closed and the switch $508_1$ is opened, such that solely the RF signal $406_2$ on the carrier frequency $f_{c2}$ is output to the terminal 404, and the RF signal $406_1$ on the carrier frequency $f_{c1}$ is not output to the terminal 404.

In the operation mode shown in FIG. 23, the switch $521_2$ is closed to establish the route through which the baseband signal $511_2$ is directly input to the mixer $504_2$, while the limiter $522_2$ is unused. The RF signal $406_2$ input to the power amplifier 401 is output to the terminal 411 via the coupler 413. Further, the RF signal $407_2$ output from the power amplifier 401 is output to the terminal 412 via the coupler 414. The RF signal $406_2$ and RF signal $407_2$ output to the terminal 411 and the terminal 412 are output to the controller 509 via the closed switches $512_1$ and $512_2$. The controller 509 detects the power of the RF signal $406_2$ and that of the RF signal $407_2$, and calculates the gain $G_{PA2}$ of the power amplifier 401 on the carrier frequency $f_{c2}$ based on the power ratio between the RF signal $406_2$ and the RF signal $407_2$.

In the operation modes shown in the block configuration diagrams of FIGS. 22 and 23 in which the gain of the power amplifier 401 is measured, the switch $513_1$ and the switch $513_2$ are opened, and no signals are input to the amplitude detecting unit $503_1$ and the amplitude detecting unit $503_2$. In the operation modes shown in the block configuration diagrams of FIGS. 22 and 23, none of the amplitude detecting unit $503_1$, the amplitude detecting unit $503_2$, the variable gain amplifier $507_1$, the variable gain amplifier $507_2$, the adder 514, and the peak detector 506 operate.

Further, as described above, the block configuration diagrams of FIGS. 24 and 25 each show the actual operation mode in which the RF signal $406_1$ on the carrier frequency $f_{c1}$ and the RF signal $406_2$ on the carrier frequency $f_{c2}$ are simultaneously input to the power amplifier 401, and the two RF signals $407_1$ and $407_2$ are sent out from the power amplifier 401.

In the operation modes shown in FIGS. 24 and 25, both the switch $508_1$ and the switch $508_2$ are closed, and both the RF signal $406_1$ and the RF signal $406_2$ are input to the adder 510. The RF signal $406_1$ and the RF signal $406_2$ are combined at the adder 510, and the RF signal $406_1$ and the RF signal $406_2$ are both output to the terminal 404.

Further, in the operation modes shown in FIGS. 24 and 25, similarly to the operation mode according to the first embodiment shown in FIG. 17, the switch $513_1$ and the switch $513_2$ are both closed, and connection to the peak detector 506 is established via the amplitude detecting units $503_1$ and $503_2$, the variable gain amplifiers $507_1$ and $507_2$, and the adder 514. The peak detector 506 detects the peak value of the combined amplitude $G_1\{a_1(t)\}^2 + G_2\{a_2(t)\}^2$ of the signals having been input for a predetermined certain period.

Here, in the operation modes shown in FIGS. 24 and 25 also, similarly to the operation mode according to the first embodiment shown in FIG. 17, the gain $G_1$ of the variable gain amplifier $507_1$ and the gain $G_2$ of the variable gain amplifier $507_2$ are set such that the ratio between the gain $G_{PA1}$ and the gain $G_{PA2}$ of the power amplifier 401 at the carrier frequency $f_{c1}$ and at the carrier frequency $f_{c2}$ agrees with the ratio between the gain $G_1$ of the variable gain amplifier $507_1$ and the gain $G_2$ of the variable gain amplifier $507_2$. In other words, the gain $G_1$ and the gain $G_2$ are set such that the following relationship is established.

$$G_{PA1}:G_{PA2}=G_1:G_2$$

In this manner, the setting of the gain $G_1$ of the variable gain amplifier $507_1$ and the gain $G_2$ of the variable gain amplifier $507_2$ reflecting the frequency variations of the gain $G_{PA1}$ and the gain $G_{PA2}$ of the power amplifier 401 at the carrier frequency $f_{c1}$ and the carrier frequency $f_{c2}$ makes it possible to properly sense the peak value of the combined amplitude $\{a_{out1}(t)\}^2 + \{a_{out2}(t)\}^2$ of the RF signal $407_1$ and the RF signal $407_2$ output from the power amplifier 401.

As has been described, in the operation modes shown in FIGS. 24 and 25, the frequency variations of the power amplifier 401 can be properly taken into consideration in sensing the peak value of the combined amplitude $\{a_{out1}(t)\}^2 + \{a_{out2}(t)\}^2$ of the RF signal $407_1$ and the RF signal $407_2$. Accordingly, as described in the first embodiment also, the advantage that cannot be realized by the conventional techniques intended for the multi-carrier communication system ($\Delta f \Delta f \cong f_{BB}$) disclosed in Patent Literatures 1 to 5 is achieved.

Here, in the operation modes shown in FIGS. 24 and 25, the switches $521_1$ and $521_2$ and the limiters $522_1$ and $522_2$ perform the operation of reducing the PAR (peak-to-average power ratio) of the combined amplitude $\{a_{out1}(t)\}^2 + \{a_{out2}(t)\}^2$ according to the following procedure.

The block configuration diagram of FIG. 24 shows the operation mode in a period during which the combined amplitude $G_1\{a_1(t)\}^2 + G_2\{a_2(t)\}^2$ obtained at the peak detector 506 exceeds a preset threshold value. In the operation mode shown in FIG. 24, the switch $521_1$ and the switch $521_2$ are closed to establish the routes through which the baseband signal $511_1$ and the baseband signal $511_2$ are input to the mixer $504_1$ and the mixer $504_2$ via the limiter $522_1$ and the limiter $522_2$. The limiter $522_1$ and the limiter $522_2$ have the function of suppressing the amplitudes of the baseband signal $511_1$ and the baseband signal $511_2$ to be equal to or lower than the threshold value, when the amplitudes of the input baseband signals $511_1$ and $511_2$ exceed the threshold value.

By the routing by the switch $521_1$ and the switch $521_2$, in the period during which the combined amplitude $G_1\{a_1(t)\}^2 + G_2\{a_2(t)\}^2$ exceeds the preset threshold value, the amplitudes of the baseband signal $511_1$ and the baseband signal $511_2$ are suppressed to be equal to or lower than the threshold value by the limiter $522_1$ and the limiter $522_2$, and the baseband signal $511_1$ and the baseband signal $511_2$ are input to the mixer $504_1$ and the mixer $504_2$. Such an operation suppresses the amplitude peak value of the RF signal $406_1$ and the RF signal $406_2$ to be equal to or lower than the threshold value, whereby a reduction in the PAR (peak-to-average power ratio) can be realized. Note that, the limiter $522_1$ and the limiter $522_2$ can set the amplitude values of the RF signals to be equal to or lower than specified threshold values that are previously specified for the respective carrier frequency bands.

On the other hand, the block configuration diagram shown in FIG. 25 shows the operation mode in a period during which the combined amplitude $G_1\{a_1(t)\}^2 + G_2\{a_2(t)\}^2$ obtained at the peak detector 506 is lower than the preset threshold value. In the operation mode shown in FIG. 25, the switch $521_1$ and the switch $521_2$ are closed to establish routes through which the baseband signal $511_1$ and the baseband signal $511_2$ are directly input to the mixer $504_1$ and the mixer $504_2$ without being passed through the limiter $522_1$ and the limiter $522_2$.

By such routing by the switch $521_1$ and the switch $521_2$, in the period during which the combined amplitude $G_1\{a_1(t)\}^2 + G_2\{a_2(t)\}^2$ is lower than the preset threshold value, amplitude limitation by the limiter $522_1$ and the limiter $522_2$ on the baseband signals $511_1$ and $511_2$ and the RF signals $406_1$ and $406_2$ is not performed.

As has been described above, in the second embodiment, whether or not amplitude limitation is performed for the RF signal $406_1$ and the RF signal $406_2$ by means of the limiter $522_1$ and the limiter $522_2$ is determined based on the relationship of the magnitude between the combined amplitude $G_1\{a_1(t)\}^2 + G_2\{a_2(t)\}^2$ and the preset threshold value. Through the amplitude limitation of the RF signal $406_1$ and the RF signal $406_2$ input to the power amplifier 401, limitation of the combined amplitude $\{a_{out1}(t)\}^2 + \{a_{out2}(t)\}^2$ of the RF signal $407_1$ and the RF signal $407_2$ at the output of the power amplifier 401, that is, a reduction in the PAR (peak-to-average power ratio), is performed.

The advantage of the present invention over the conventional techniques disclosed in Patent Literatures 1 to 5 lies in that, as has been discussed above, the peak of the combined amplitude of the RF signal $407_1$ and the RF signal $407_2$ can be properly sensed by taking into consideration of the frequency dependence of the characteristic (gain) of the power amplifier 401 and, therefore, the RF signal $406_1$ and the RF signal $406_2$ input to the power amplifier 401 can be properly set.

As in the conventional techniques disclosed in Patent Literatures 1 to 5, in the case where the frequency dependence of the characteristic (gain) of the power amplifier 401 is not taken into consideration, for example, an RF signal on a certain carrier frequency may be input to the power amplifier in a disadvantageous state where an excessively great or small amplitude level is set to that RF signal as compared to other RF signal on other carrier frequency. When an RF signal with an excessively great amplitude level is input to the power amplifier, there arises a problem of signal distortion. Further, when an RF signal of an excessively small amplitude level is input to the power amplifier, there arises a problem of a power efficiency reduction. With the transmission apparatus according to the second embodiment of the present invention, such problems associated with the conventional techniques will not occur.

Next, the advantages of the second embodiment of the present invention over the conventional technique disclosed in Patent Literature 6 are disclosed in the following.

Figure 26:
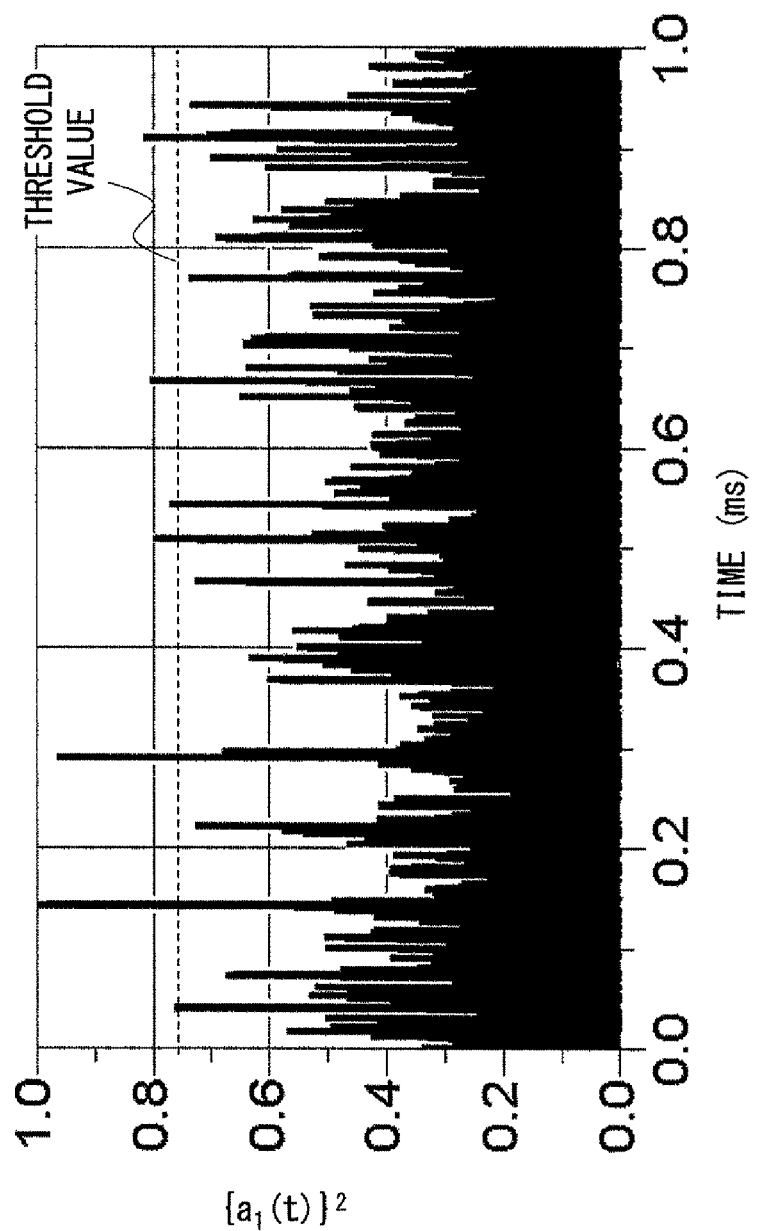
FIG. 26 is a waveform diagram showing the time waveform of the amplitude square value of an RF signal of a certain amplitude input to the transmission apparatus disclosed in Patent Literature 6.
Figure 27:
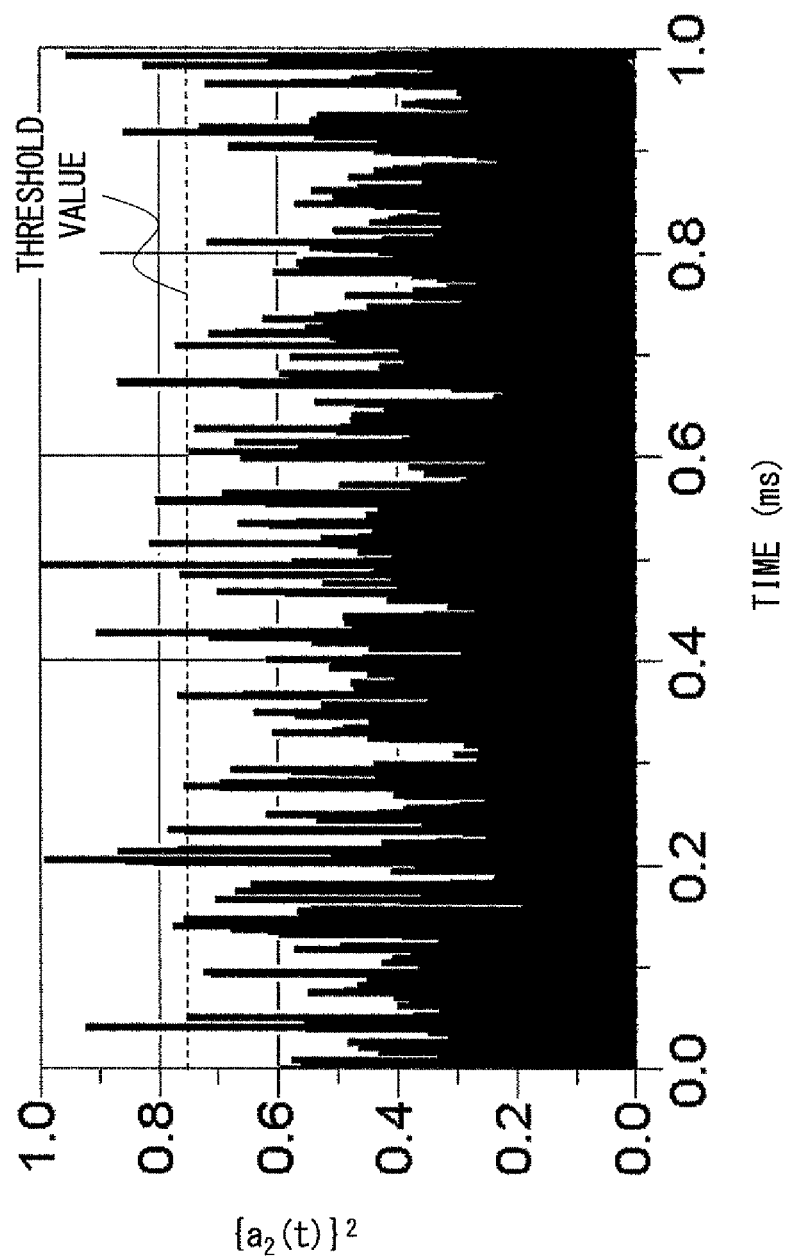
FIG. 27 is a waveform diagram showing the time waveform of the amplitude square value of an RF signal of other amplitude input to the transmission apparatus disclosed in Patent Literature 6.

Firstly, the case where the RF signal's PAR (peak-to-average power ratio) reduction technique is applied to the conventional technique relating to the transmitter disclosed in Patent Literature 6 and shown in the block configuration diagram of FIG. 42 is discussed. Here, as to the amplitude of the RF input signal of the dual-band power amplifier (PA), it is assumed that the amplitude peak value of an RF signal with an amplitude $a_1(t)$ is suppressed and the RF signal is input to the input terminal 11 shown in FIG. 42, and the amplitude peak value of an RF signal with an amplitude $a_2(t)$ is suppressed and the RF signal is input to the input terminal 12 shown in FIG. 42. Further, as one example, it is assumed that the RF signal with the amplitude $a_1(t)$ and the RF signal with the amplitude $a_2(t)$ are WCDMA signals. Still further, it is assumed that the time waveform of the amplitude square value of the RF signal with the amplitude $a_1(t)$ and that of the RF signal with the amplitude $a_2(t)$ are as shown in FIGS. 26 and 27, respectively. FIG. 26 is a waveform diagram showing the time waveform of the amplitude square value of an RF signal of a certain amplitude input to the transmission apparatus disclosed in Patent Literature 6, showing the case where the RF signal with the amplitude $a_1(t)$ is input. Further, FIG. 27 is a waveform diagram showing the time waveform of the amplitude square value of an RF signal of other amplitude input to the transmission apparatus disclosed in Patent Literature 6, showing the case where the RF signal with the amplitude $a_2(t)$ is input.

In the conventional technique disclosed in Patent Literature 6, in the case where the RF signal's PAR (peak-to-average power ratio) reduction technique is applied, as shown in FIGS. 26 and 27, the amplitude $\{a_1(t)\}^2 (\propto \{a_{out1}(t)\}^2)$ and the amplitude $\{a_2(t)\}^2 (\propto \{a_{out2}(t)\}^2)$ are individually suppressed by the limiter, in each of the case where the amplitude $\{a_1(t)\}^2 (\propto \{a_{out1}(t)\}^2)$ exceeds the threshold value and the case where the amplitude $\{a_2(t)\}^2 (\propto \{a_{out2}(t)\}^2)$ exceeds the threshold value.

Figure 28:
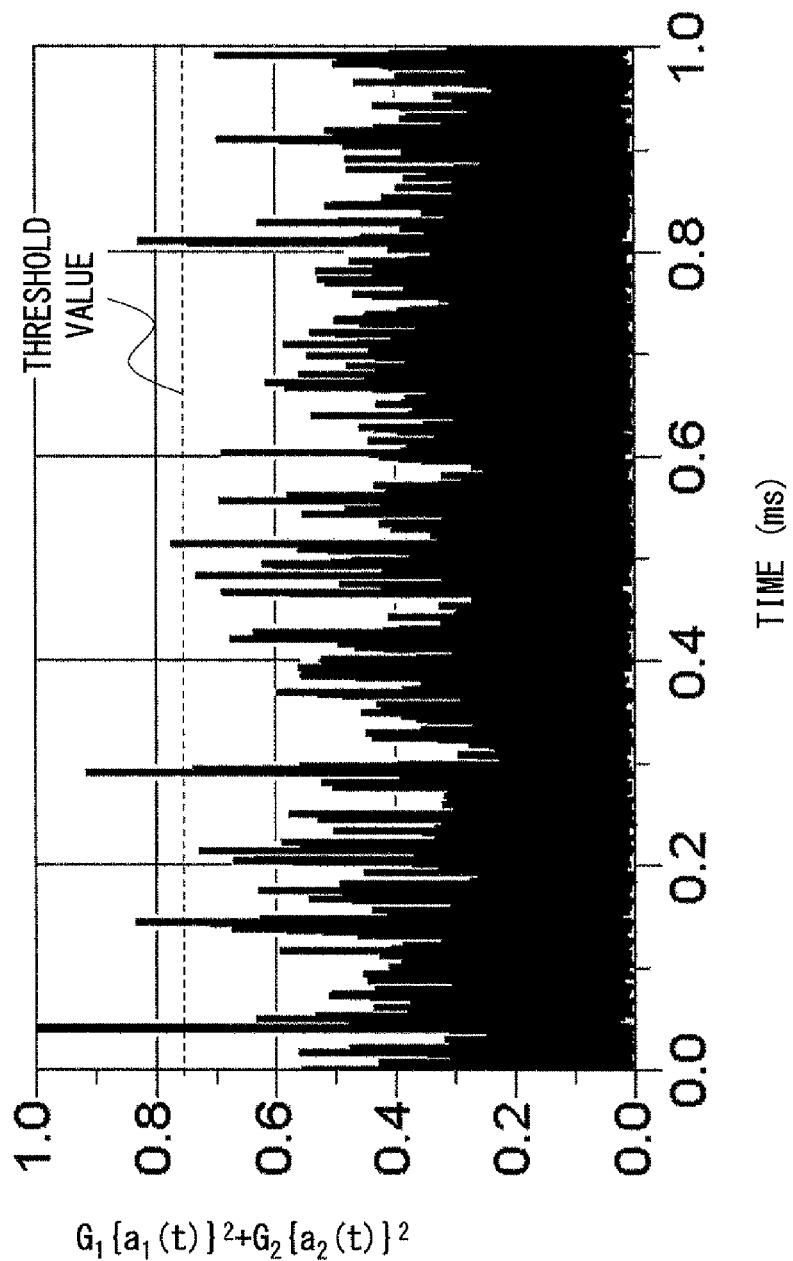
FIG. 28 is a waveform diagram showing the time waveform of the combined amplitude of the square values of the amplitudes of two RF signals input to the dual-band power amplifier (PA), which is an example of a power amplifier in the second embodiment of the present invention.

In contrast to the conventional technique disclosed in Patent Literature 6, with the transmission apparatus according to the second embodiment of the present invention, as described above, the limiters suppress the amplitude values only in the case where the combined amplitude $G_1\{a_1(t)\}^2 + G_2\{a_2(t)\}^2 (\propto \{a_{out1}(t)\}^2 + \{a_{out2}(t)\}^2)$ exceeds a preset threshold value. Here, FIG. 28 shows the combined amplitude generated from the RF signal with the amplitude $a_1(t)$ and the RF signal with the amplitude $a_2(t)$ shown in FIGS. 26 and 27. FIG. 28 is a waveform diagram showing the time waveform of the combined amplitude of the square values of the amplitudes of two RF signals input to the dual-band power amplifier (PA), which is an example of a power amplifier in the second embodiment of the present invention. FIG. 28 shows the time waveform of the combined amplitude of the square values of the amplitudes of the two RF signals, namely the RF signal with the amplitude $a_1(t)$ shown in FIG. 26 and the RF signal with the amplitude $a_2(t)$ shown in FIG. 27.

As a result of comparison among FIGS. 26 to 28, it can be seen that the combined amplitude of the two RF signals disclosed in FIG. 28 exceeds the threshold value less frequently than the amplitude $a_1(t)$ and the amplitude $a_2(t)$ shown in FIGS. 26 and 27 do.

Figure 29:
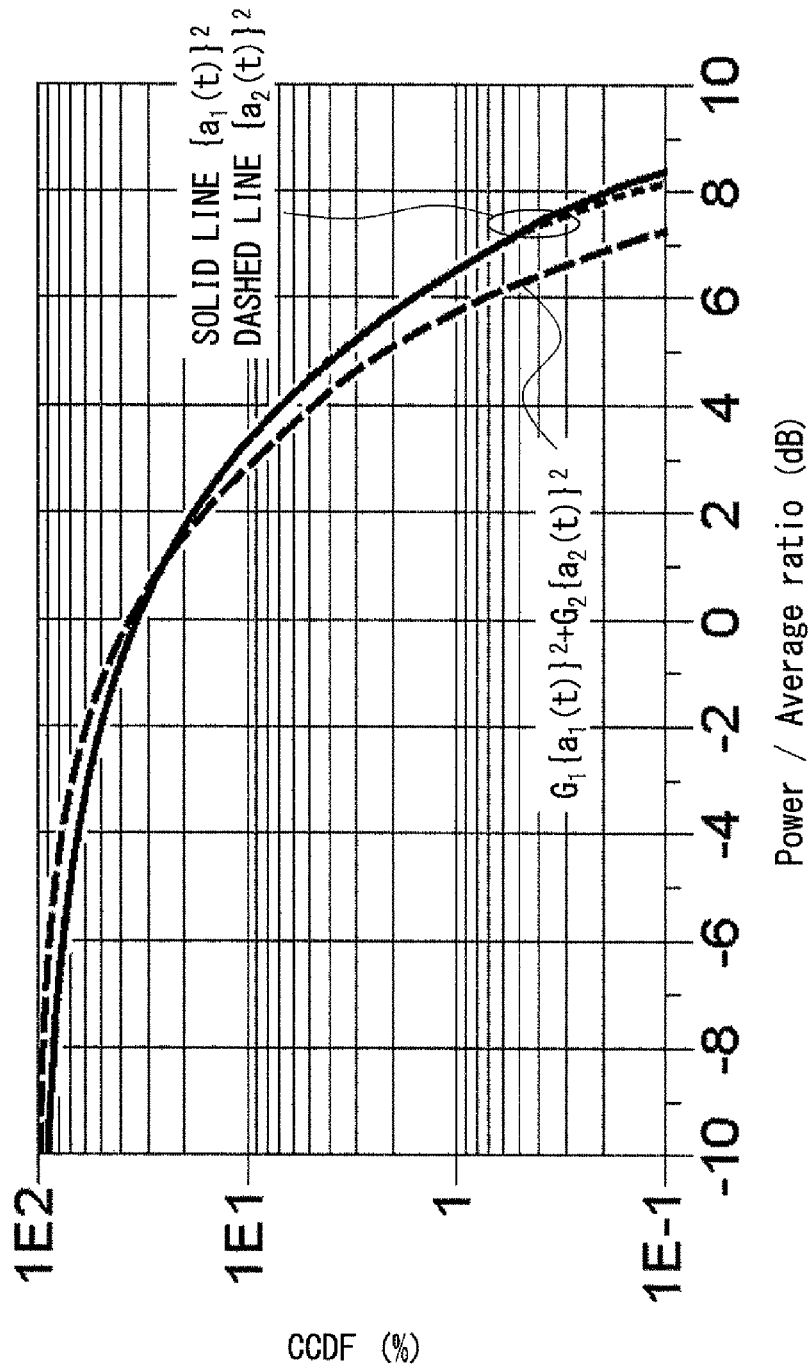
FIG. 29 is a characteristic diagram showing the CCDF (Complementary Cumulative Distribution Function) of the amplitudes of the two RF signals input to the dual-band power amplifier (PA) which is an example of the power amplifier according to the second embodiment of the present invention and the combined amplitude.

FIG. 29 discloses the comparison of CCDF (Complementary Cumulative Distribution Function) between the original amplitudes $\{a_1(t)\}^2$ and $\{a_2(t)\}^2$ shown in FIGS. 26 and 27 and the combined amplitude $G_1\{a_1(t)\}^2 + G_2\{a_2(t)\}^2$ shown in FIG. 28. FIG. 29 is a characteristic diagram showing the CCDF (Complementary Cumulative Distribution Function) of the amplitudes of the two RF signals, namely the amplitude $\{a_1(t)\}^2$ and the amplitude $\{a_2(t)\}^2$, input to the dual-band power amplifier (PA) which is an example of the power amplifier according to the second embodiment of the present invention and the combined amplitude $G_1\{a_1(t)\}^2 + G_2\{a_2(t)\}^2$. As shown in FIG. 29, at high output time, the CCDF of the RF signal of the combined amplitude $G_1\{a_1(t)\}^2 + G_2\{a_2(t)\}^2$ is reduced than the CCDF of the RF signals of the original amplitudes $\{a_1(t)\}^2$ and $\{a_2(t)\}^2$. This shows that the probability of the RF signal of the combined amplitude $G_1\{a_1(t)\}^2 + G_2\{a_2(t)\}^2$ attaining the high output is lower than the probability of the RF signals of the original amplitudes $\{a_1(t)\}^2$ and $\{a_2(t)\}^2$ attaining the high output.

That is, unless the RF signals of the original amplitudes $\{a_1(t)\}^2$ and $\{a_2(t)\}^2$ simultaneously attain the high output, the RF signal of the combined amplitude $G_1\{a_1(t)\}^2 + G_2\{a_2(t)\}^2$ does not attain the high output. The probability of the RF signals of the original amplitudes $\{a_1(t)\}^2$ and $\{a_2(t)\}^2$ simultaneously attaining the high output is lower than the probability of solely one of the RF signals of the original amplitudes $\{a_1(t)\}^2$ and $\{a_2(t)\}^2$ attaining the high output without exception. Accordingly, the frequency of the RF signal of the combined amplitude $G_1\{a_1(t)\}^2 + G_2\{a_2(t)\}^2$ exceeding the preset threshold value is lower than that of the RF signals of the original amplitudes $\{a_1(t)\}^2$ and $\{a_2(t)\}^2$ without exception.

Accordingly, in the case of the second embodiment of the present invention, as compared to the case where the RF signal's PAR (peak-to-average power ratio) reduction technique is applied to the conventional technique disclosed in Patent Literature 6, the frequency of subjecting the amplitude peak value to suppression can be reduced. The achievement of a reduction in the frequency of subjecting the amplitude peak value to suppression leads to the advantage of being capable of reducing the amount of signal distortion in realizing the same PAR (peak-to-average power ratio) reduction amount.

First Variation of Second Embodiment

Figure 30:
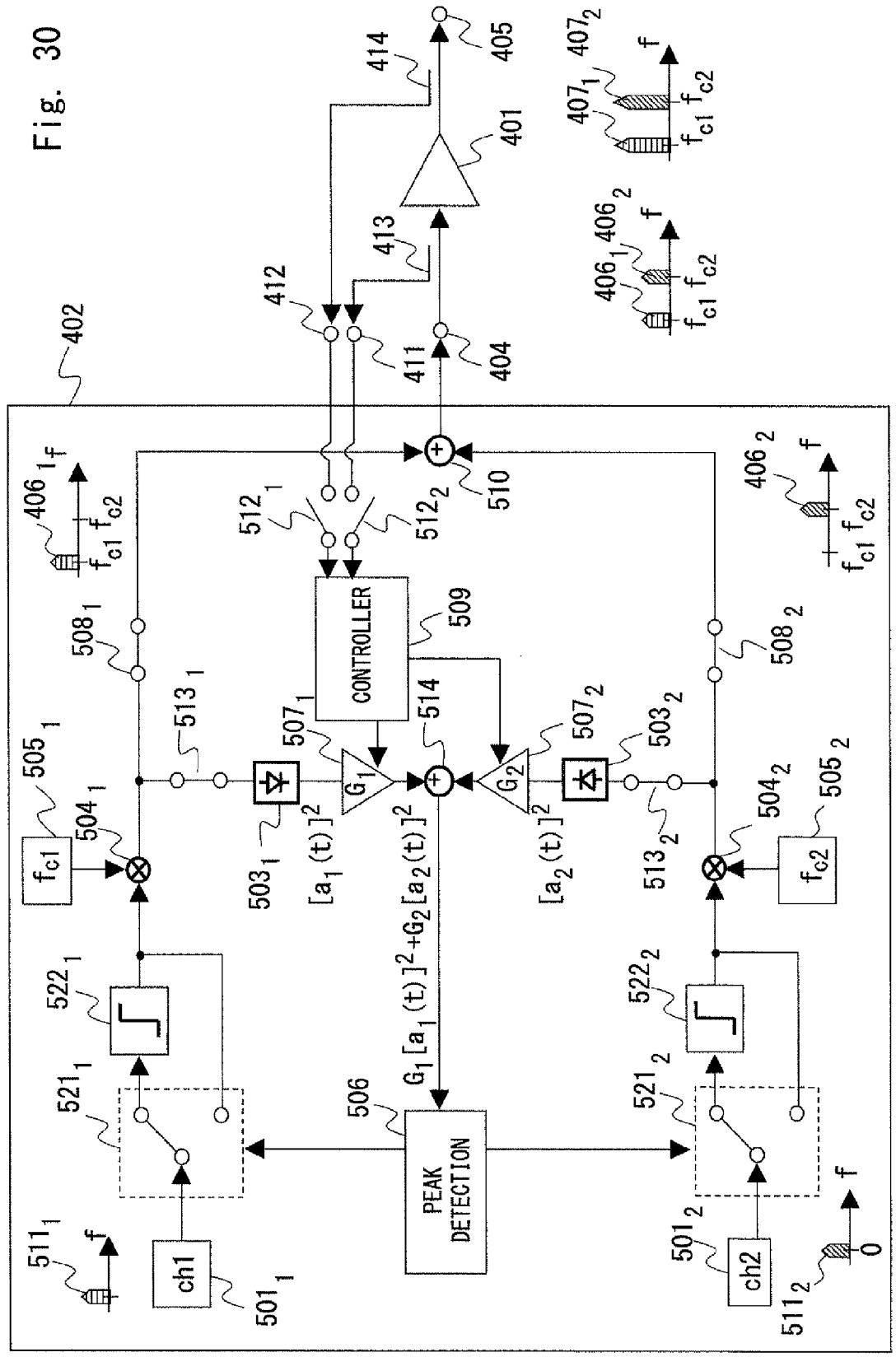
FIG. 30 is a block configuration diagram showing the block configuration of a signal generator according to a first variation of the second embodiment of the present invention.
Figure 31:
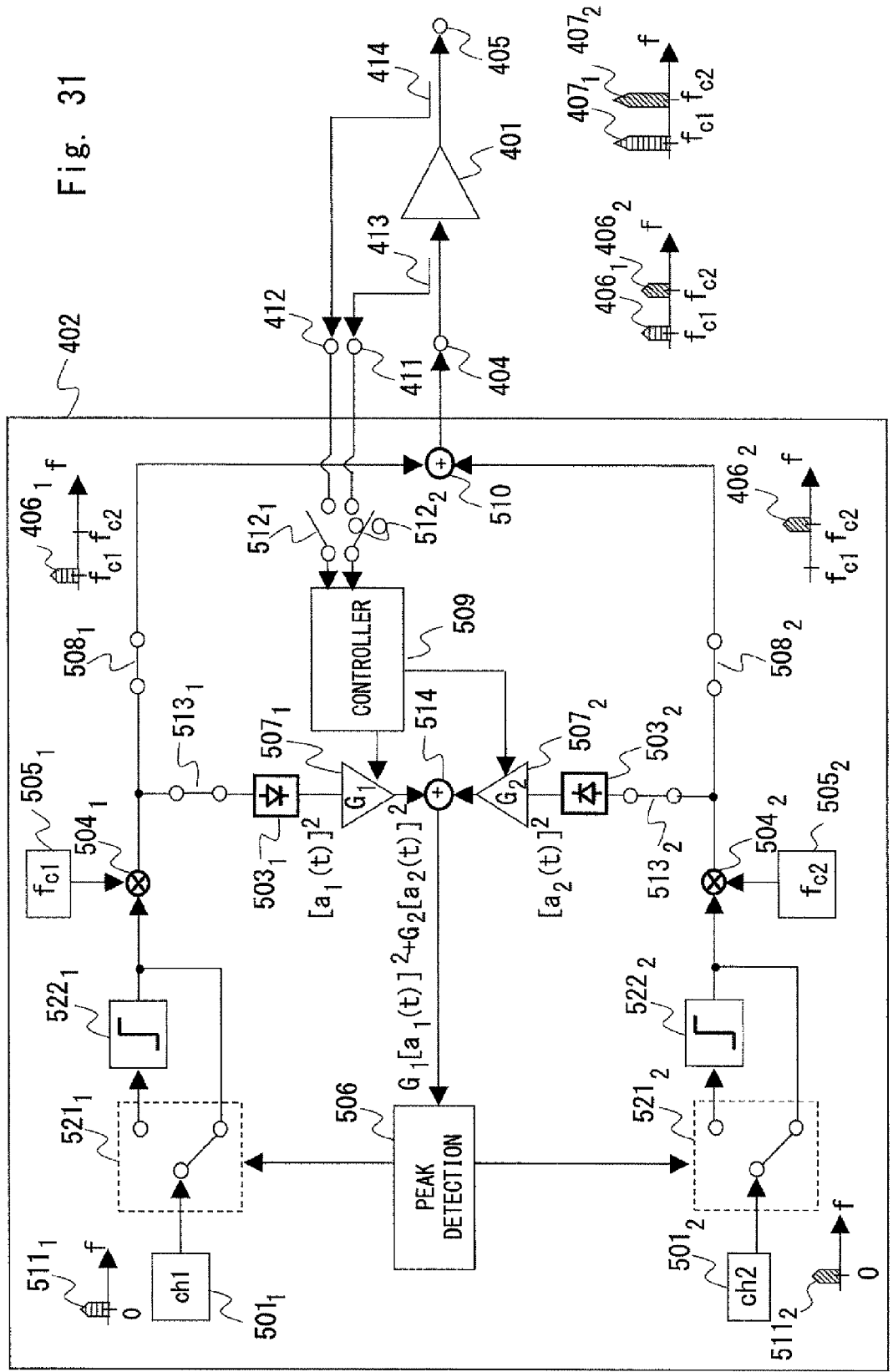
FIG. 31 is a block configuration diagram showing the block configuration of a signal generator according to the first variation of the second embodiment of the present invention.

FIGS. 30 and 31 are each a block configuration diagram showing the block configuration of a signal generator according to a first variation of the second embodiment of the present invention. In the drawings, the operation modes are also shown. FIGS. 30 and 31 each show the first variation of the block configuration of the signal generator 402 shown in FIGS. 24 and 25 as the second embodiment.

In the signal generator 402 shown in FIGS. 30 and 31, in each of the drawings, one end of the switch 513$_1$ and that of the switch 513$_2$ are connected to the output side of the mixer 504$_1$ and the mixer 504$_2$, and the amplitude detecting unit 503$_1$ and the amplitude detecting unit 503$_2$ detect the amplitudes of the RF signal 406$_1$ and the RF signal 406$_2$. Except for the connection position of the one end of the switch 513$_1$ and that of the switch 513$_2$, the block configuration in the signal generator 402 is identical between the second embodiment shown in FIGS. 24 and 25 and the first variation of the second embodiment shown in FIGS. 30 and 31.

Similarly to FIG. 24, FIG. 30 shows the operation mode in a period during which the combined amplitude $G_1\{a_1(t)\}^2 + G_2\{a_2(t)\}^2$ obtained at the peak detector 506 exceeds a preset threshold value.

On the other hand, similarly to FIG. 25, FIG. 31 shows the operation mode in a period during which the combined amplitude $G_1\{a_1(t)\}^2 + G_2\{a_2(t)\}^2$ obtained at the peak detector 506 is equal to or lower than the preset threshold value.

Accordingly, with the signal generator 402 according to the first variation of the second embodiment shown in FIGS. 30 and 31 also, the operation which is identical to that in the second embodiment shown in FIGS. 24 and 25 can be achieved. As a result, in the first variation of the second embodiment shown in FIGS. 30 and 31 also, the function and effect which are totally identical to those of the second embodiment shown in FIGS. 24 and 25 can be achieved.

Second Variation of Second Embodiment

Figure 32:
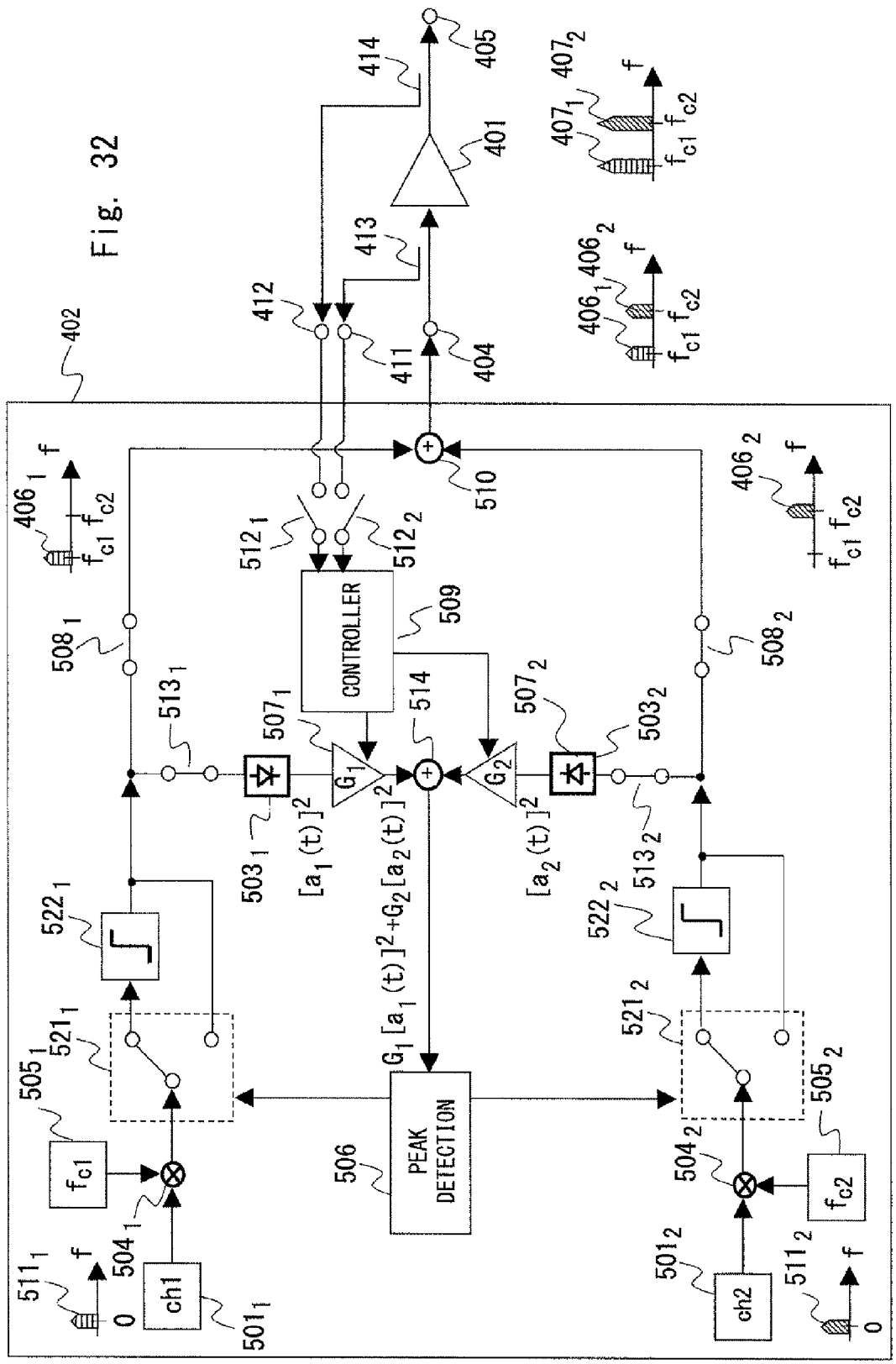
FIG. 32 is a block configuration diagram showing the block configuration of a signal generator according to a second variation of the second embodiment of the present invention.
Figure 33:
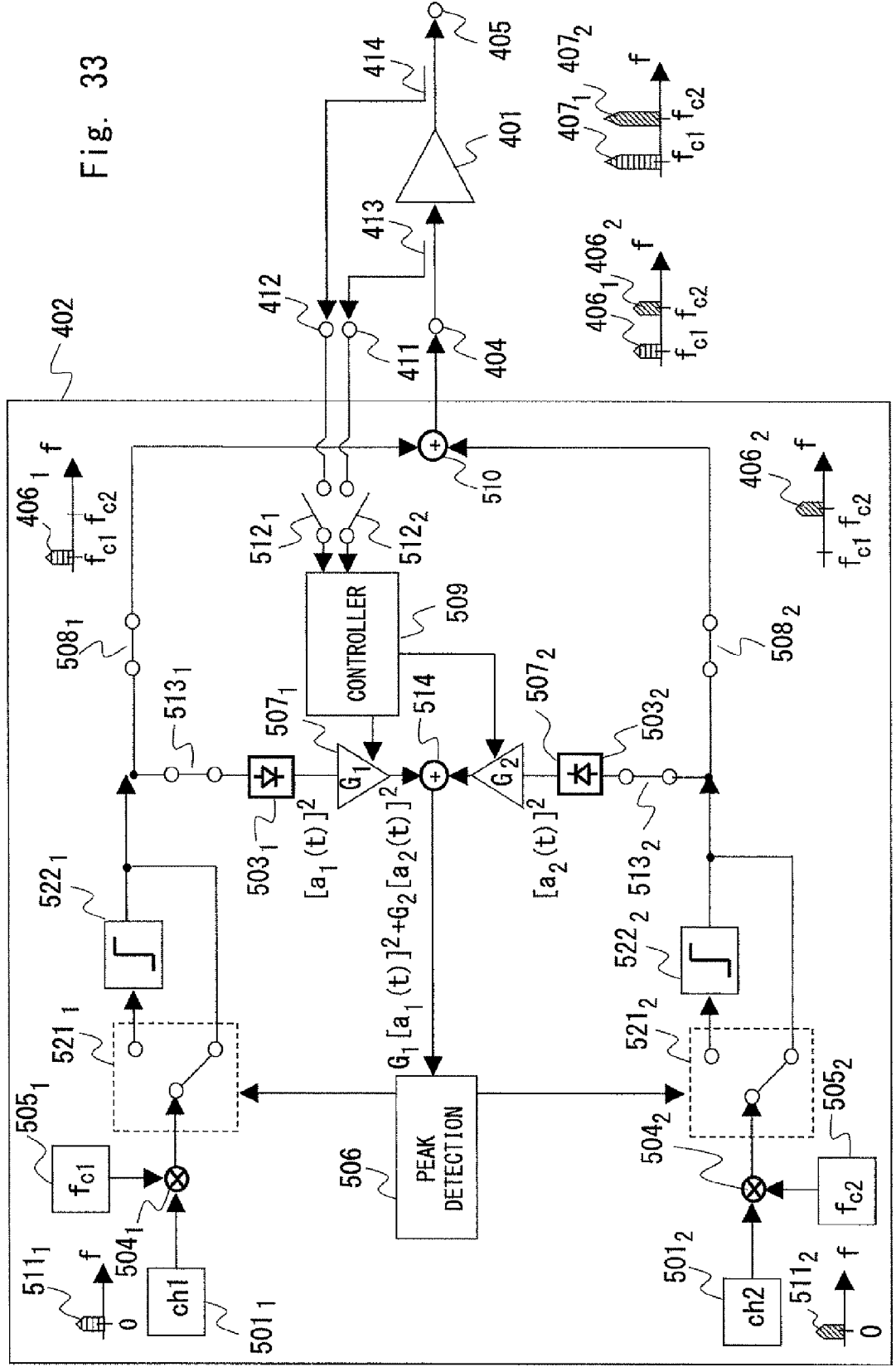
FIG. 33 is a block configuration diagram showing the block configuration of a signal generator according to the second variation of the second embodiment of the present invention.

FIGS. 32 and 33 are each a block configuration diagram showing the block configuration of a signal generator according to a second variation of the second embodiment of the present invention. In the drawings, the operation modes are also shown. FIGS. 32 and 33 each show the second variation of the block configuration of the signal generator 402 shown in FIGS. 24 and 25 as the second embodiment.

In the signal generator 402 shown in FIGS. 32 and 33, the switches $513_1$ and $513_2$ and the limiters $522_1$ and $522_2$ are provided on the output side of the mixer $504_1$ and the mixer $504_2$. Except for the disposition position of the switches $513_1$ and $513_2$ and the limiters $522_1$ and $522_2$, the block configuration in the signal generator 402 is identical between the second embodiment shown in FIGS. 24 and 25 and the second variation of the second embodiment shown in FIGS. 32 and 33.

Similarly to FIG. 24, FIG. 32 shows the operation mode in a period during which the combined amplitude $G_1\{a_n(t)\}^2 + G_2\{a_2(t)\}^2$ obtained at the peak detector 506 exceeds a preset threshold value.

On the other hand, similarly to FIG. 25, FIG. 33 shows the operation mode in a period during which the combined amplitude $G_1\{a_1(t)\}^2 + G_2\{a_2(t)\}^2$ obtained at the peak detector 506 is equal to or lower than the preset threshold value.

Accordingly, with the signal generator 402 according to the second variation of the second embodiment shown in FIGS. 32 and 33 also, the operation which is identical to that in the second embodiment shown in FIGS. 24 and 25 can be achieved. As a result, in the second variation of the second embodiment shown in FIGS. 32 and 33 also, the function and effect which are totally identical to those of the second embodiment shown in FIGS. 24 and 25 can be achieved.

Third Variation of Second Embodiment

Figure 34:
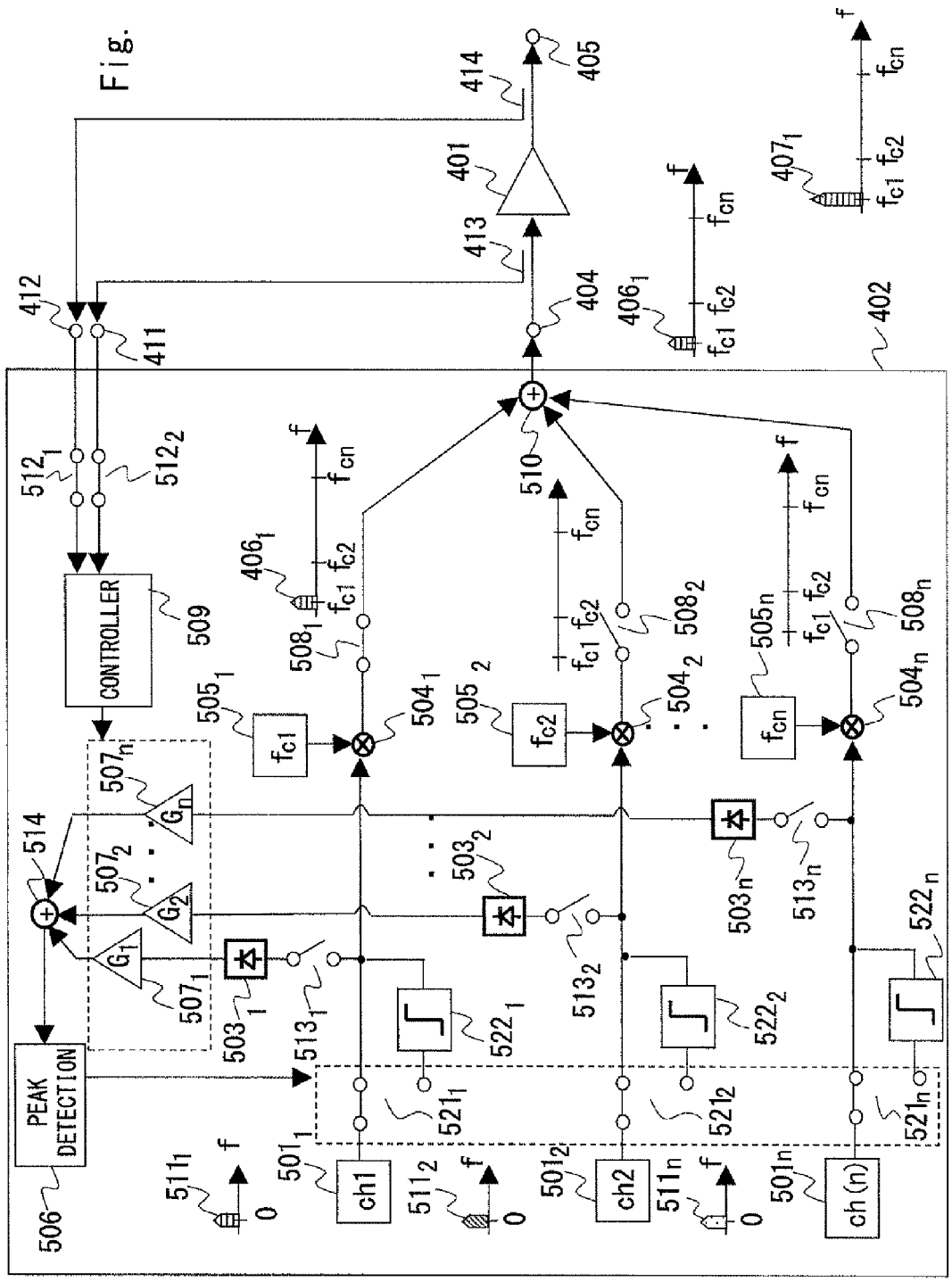
FIG. 34 is a block configuration diagram showing the block configuration of a signal generator according to a third variation of the second embodiment of the present invention.
Figure 35:
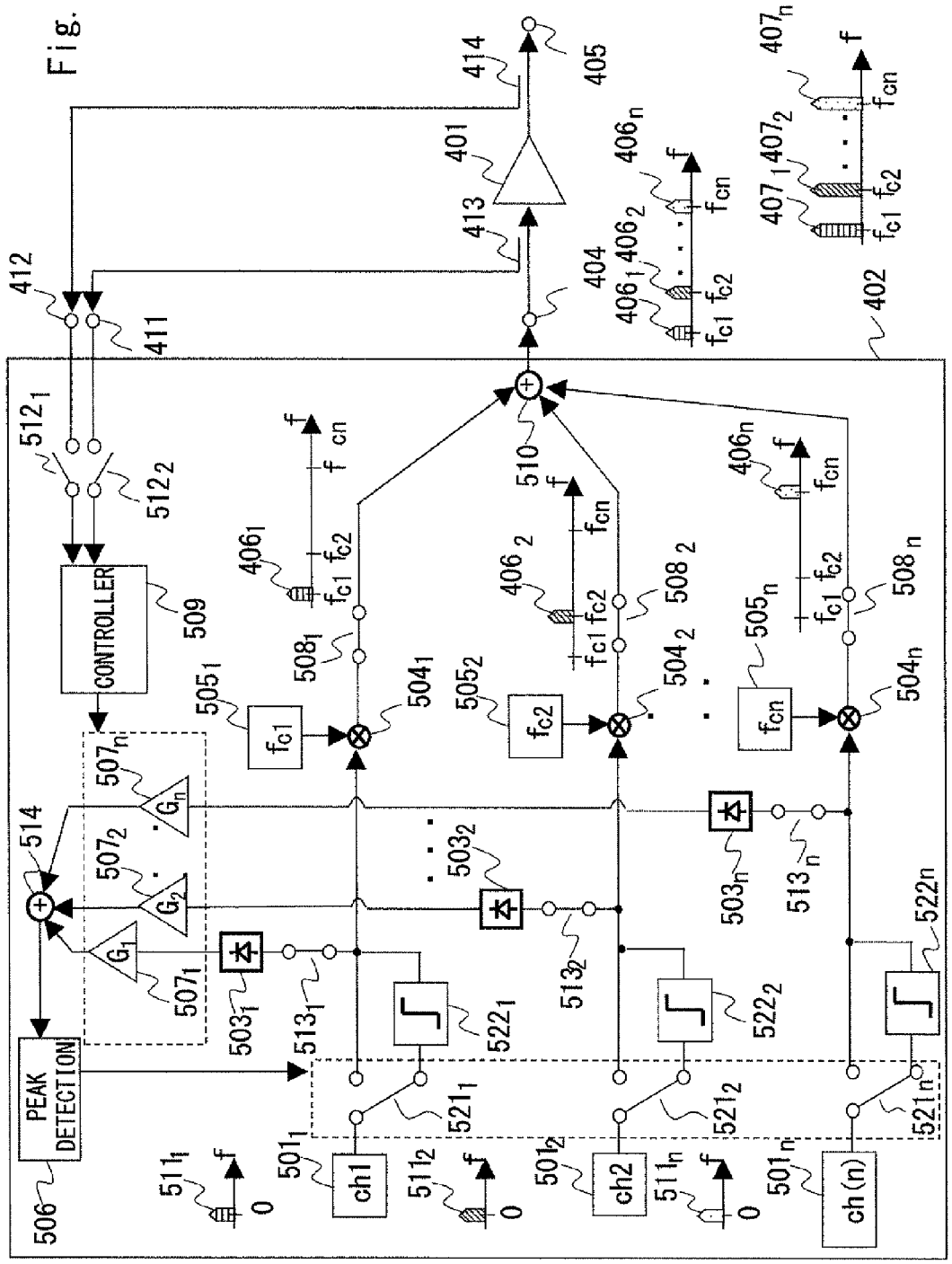
FIG. 35 is a block configuration diagram showing the block configuration of a signal generator according to the third variation of the second embodiment of the present invention.
Figure 36:
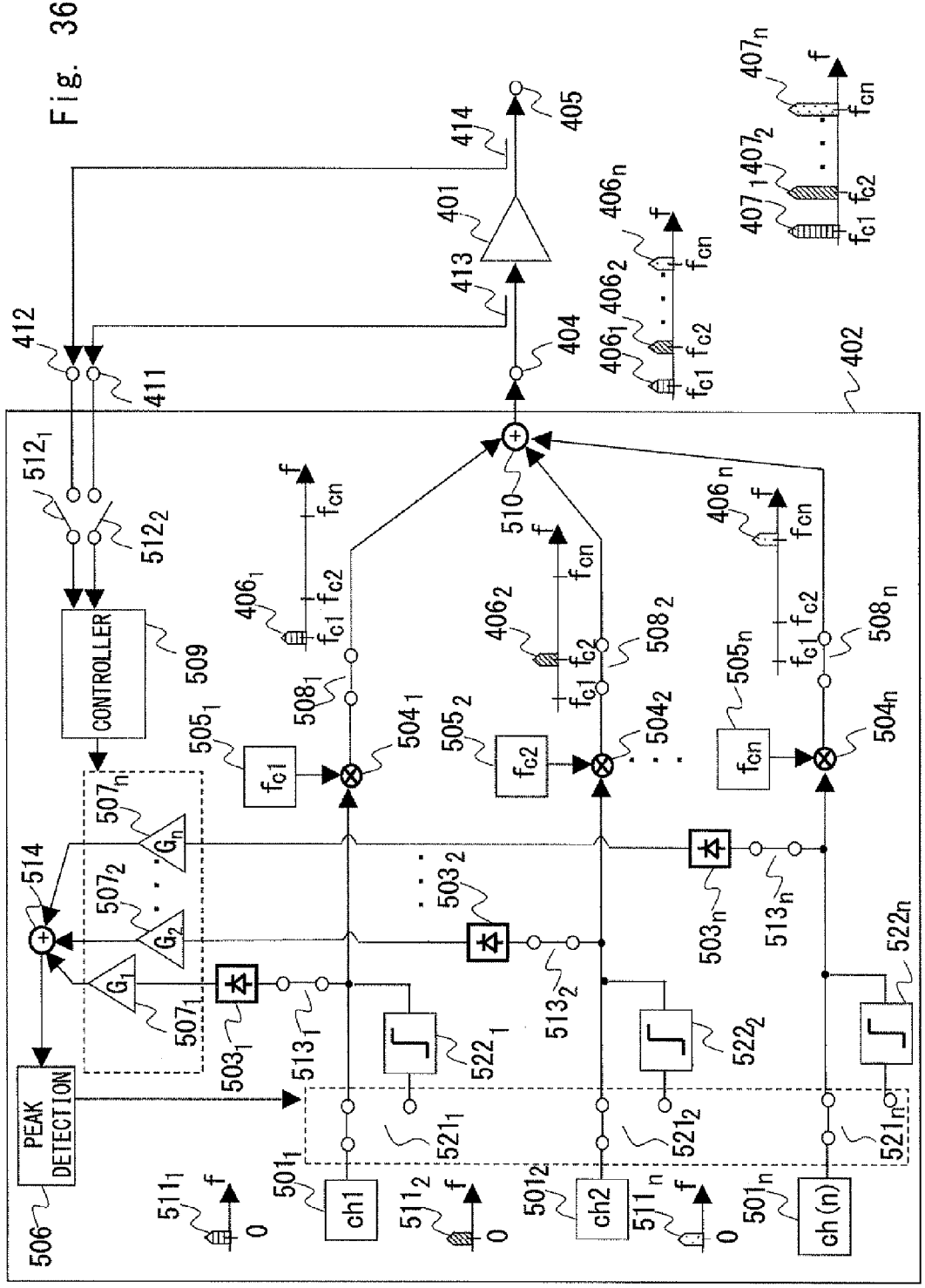
FIG. 36 is a block configuration diagram showing the block configuration of a signal generator according to the third variation of the second embodiment of the present invention.
Figure 37:
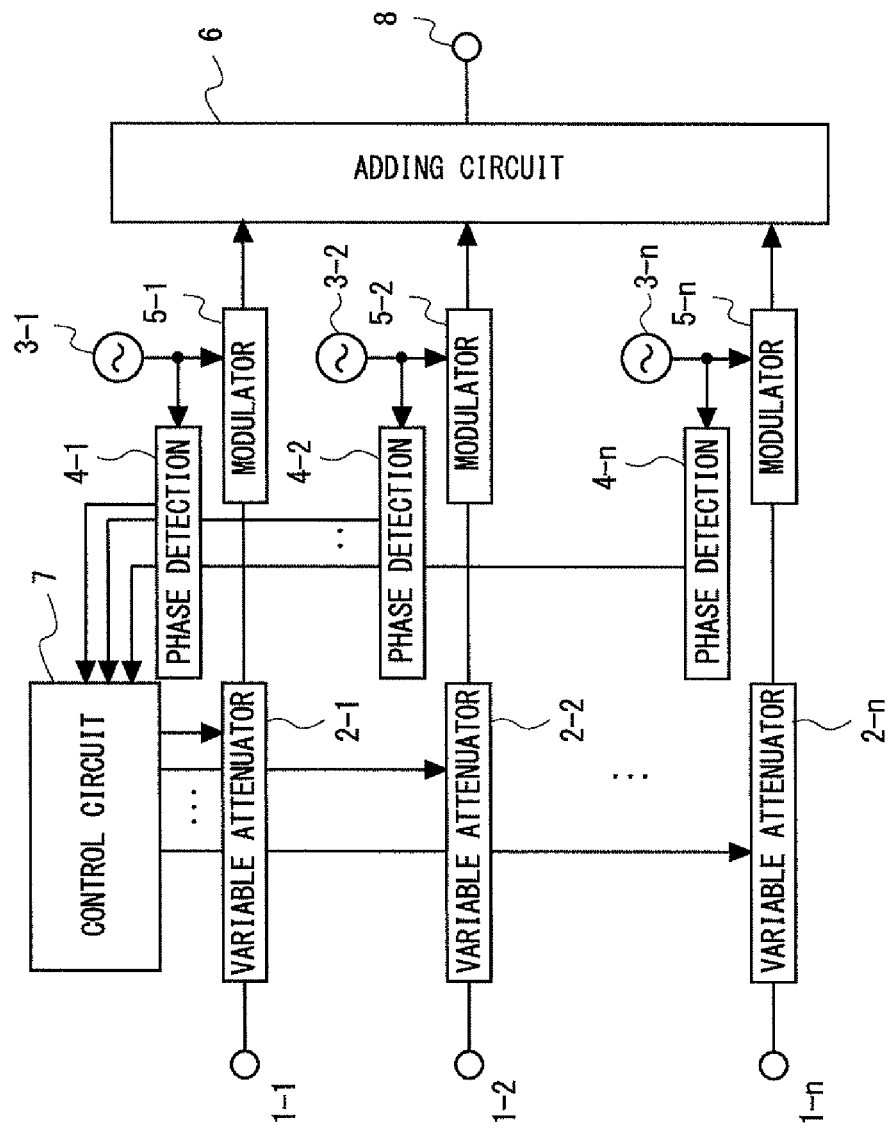
FIG. 37 is a block configuration diagram showing the block configuration of a transmission apparatus disclosed in Patent Literature 1.
Figure 38:
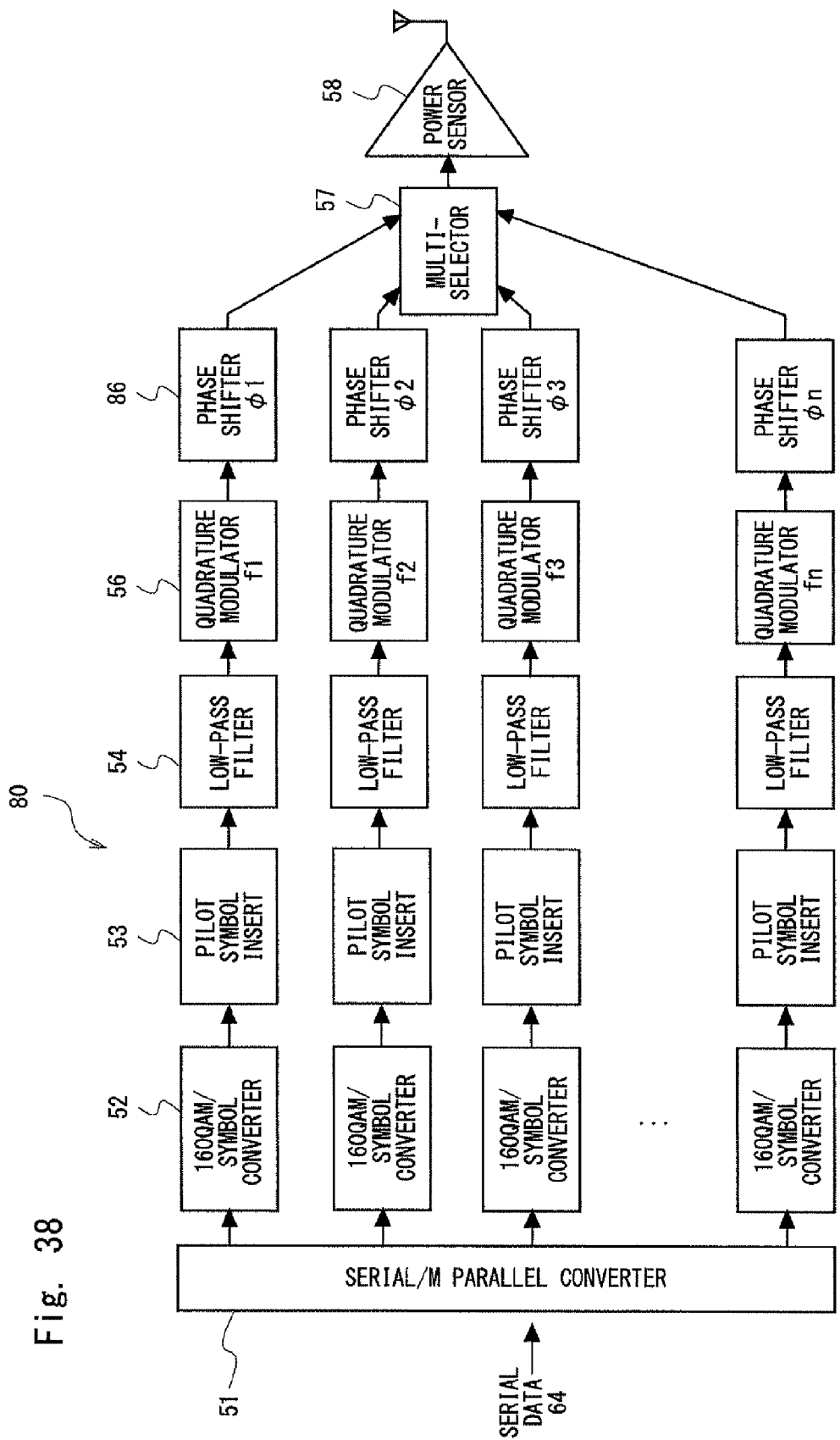
FIG. 38 is a block configuration diagram showing the block configuration of a transmission apparatus disclosed in Patent Literature 2.
Figure 39:
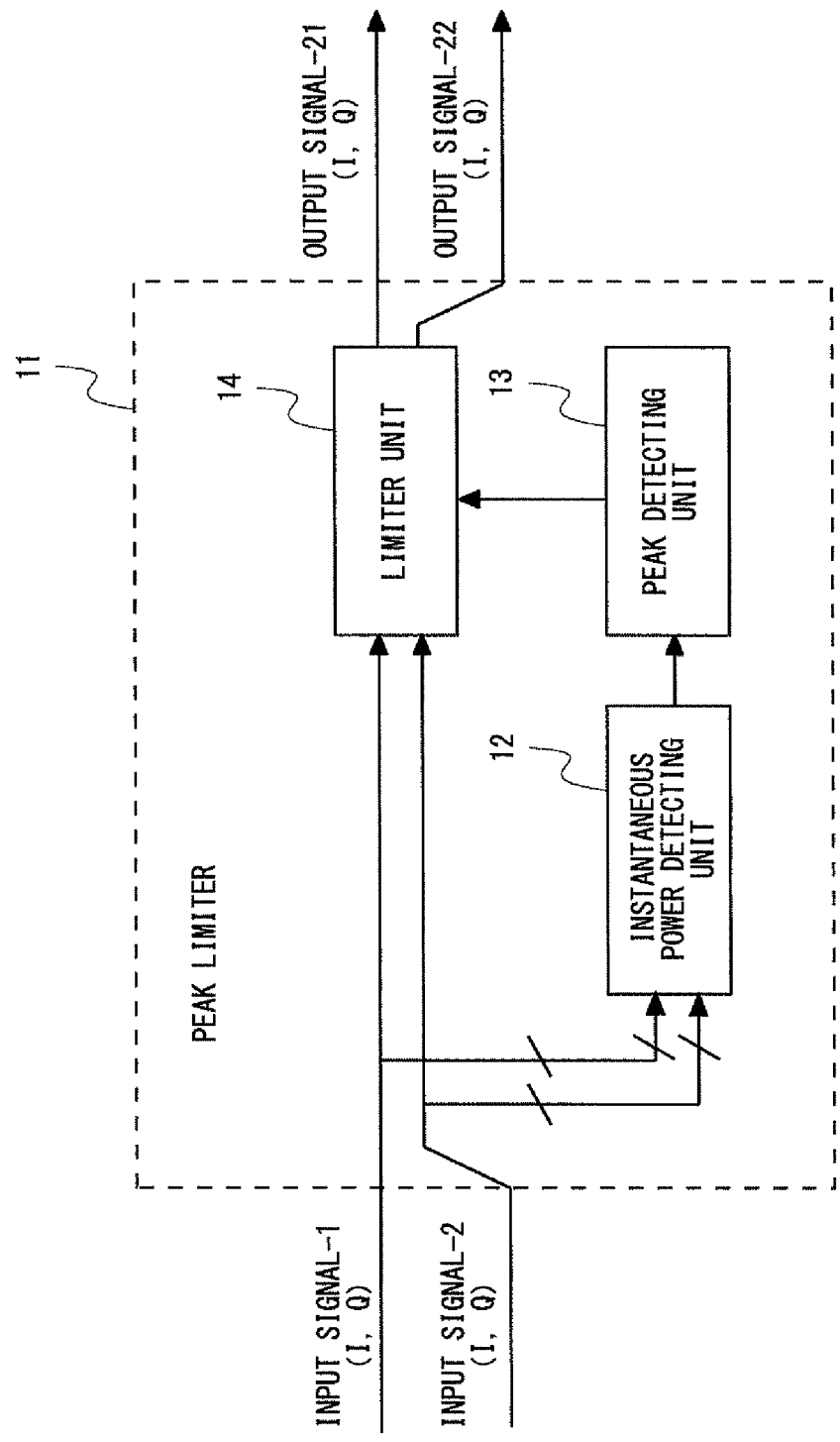
FIG. 39 is a block configuration diagram showing the block configuration of a transmission apparatus disclosed in Patent Literature 3.
Figure 40:
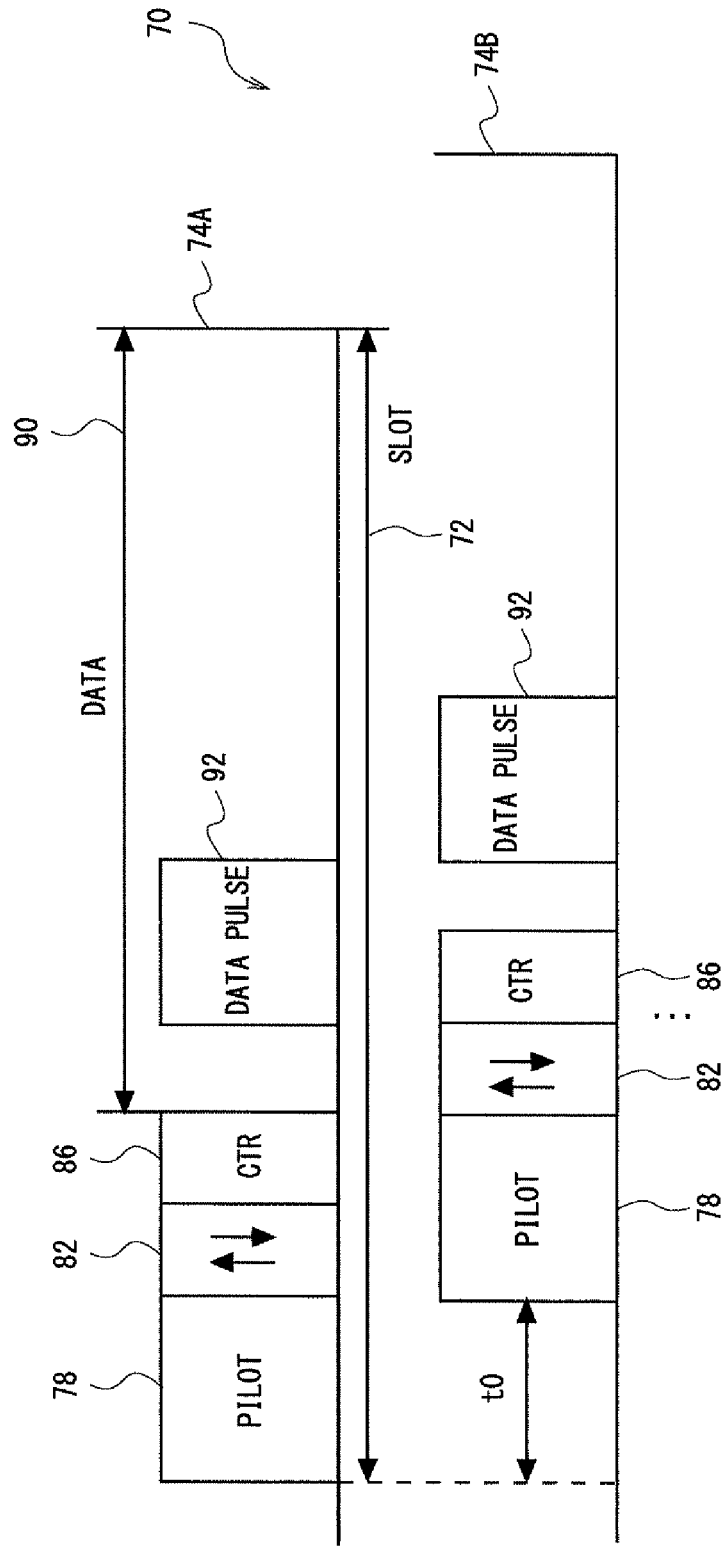
FIG. 40 is a schematic diagram showing the concept of the scheme for reducing the PAR of a communication signal disclosed in Patent Literature 4.
Figure 41:
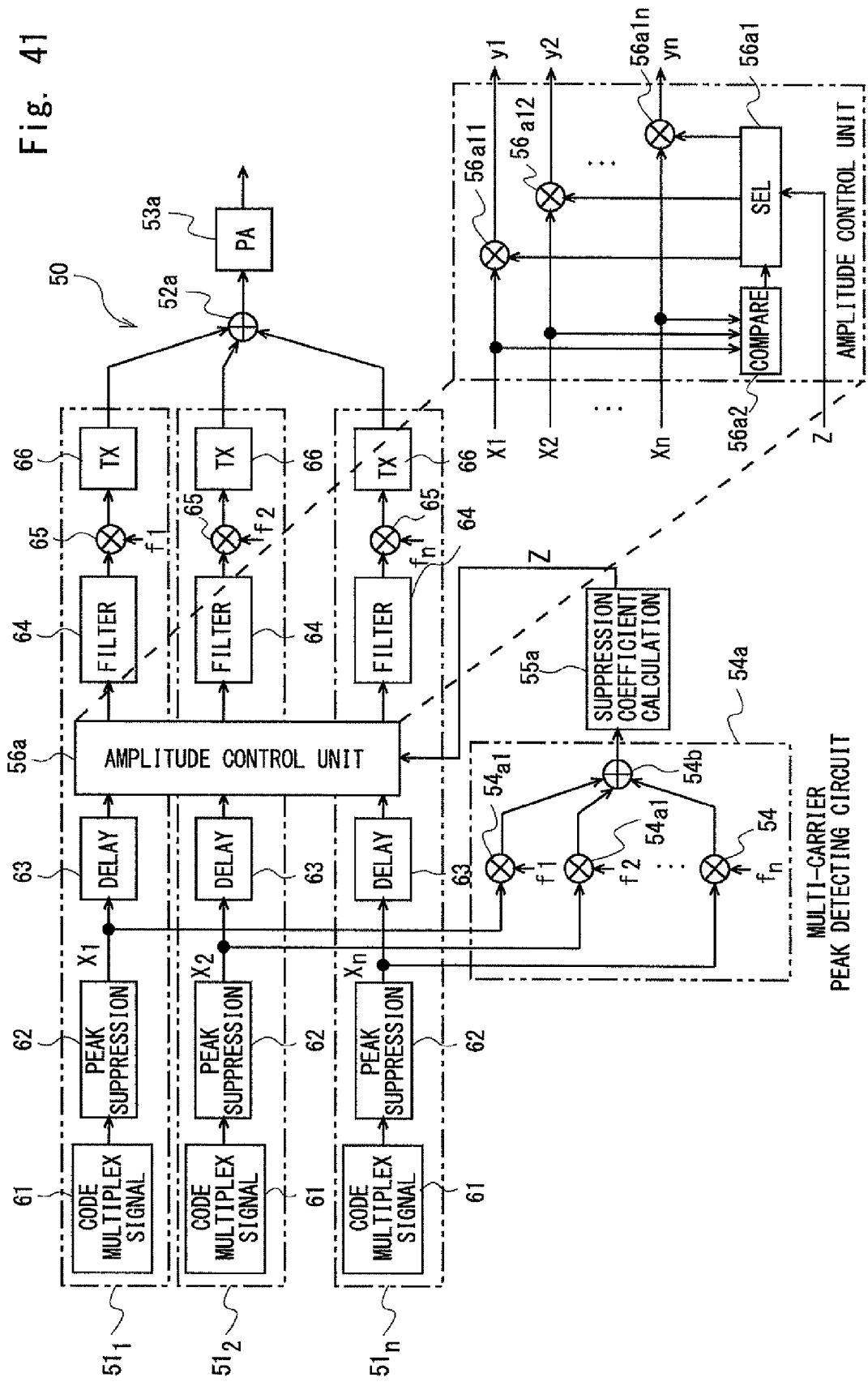
FIG. 41 is a circuit diagram showing a carrier multiplexing circuit that reduces the PAR of a communication signal disclosed in Patent Literature 5.

FIGS. 34 to 36 are each a block configuration diagram showing the block configuration of a signal generator according to a third variation of the second embodiment of the present invention. FIGS. 34 to 36 each show the third variation of the block configuration of the signal generator 402 shown in FIGS. 22, 24 and 25 as the second embodiment. FIGS. 34 to 36 each show the operation of the signal generator 402 also. That is, similarly to FIG. 22, FIG. 34 shows the mode in which the gain $G_{PA1}$ of the power amplifier 401 at the carrier frequency $f_{c1}$ is measured. Similarly to FIGS. 24 and 25, FIGS. 35 and 36 each show the actual operation mode in which the RF signal $406_1$ on the carrier frequency $f_c$, to the RF signal $406_n$ on the carrier frequency $f_{cn}$ are simultaneously input to the power amplifier 401, and n-signals, namely the RF signal $407_1$ to the RF signal $407_n$, are sent out from the power amplifier 401.

In the second embodiment shown in FIGS. 22 to 25, the RF signal $406_1$ and the RF signal $406_2$ on the two carrier frequencies are output from the signal generator 402. On the other hand, in the third variation of the second embodiment shown in FIGS. 34 to 36, the RF signals $406_1$ to $406_n$ on n-carrier frequencies (n: an integer of 2 or greater) are output from the signal generator 402. That is, in the third variation of the second embodiment, the number of channels (the number of carrier frequencies) of transmitted signals is expanded to the general channel numbers.

Firstly, as described above, similarly to FIG. 22, the signal generator 402 shown in FIG. 34 shows the mode in which the gain $G_{PA1}$ of the power amplifier 401 at the carrier frequency $f_{c1}$ is measured. That is, in FIG. 34, the signal generator 402 outputs solely the RF signal $406_1$ on the carrier frequency $f_{c1}$ to the terminal 404. In this case, the switch $508_1$ is closed and other switches $508_2$ to $508_n$ are opened, such that solely the RF signal $406_1$ on the carrier frequency $f_{c1}$ is output to the terminal 404, and other RF signals $406_2$ to $406_n$ on the carrier frequencies $f_{c2}$ to $f_{cn}$ are not output to the terminal 404.

In the block configuration diagram of FIG. 34, the RF signal $406_1$ input to the power amplifier 401 is output to the terminal 411 via the coupler 413. Further, the RF signal $407_1$ output from the power amplifier 401 is output to the terminal 412 via the coupler 414. The RF signal $406_1$ and the RF signal $407_1$ output to the terminal 411 and the terminal 412 are output to the controller 509 via the closed switches $512_1$ and $512_2$. The controller 509 detects the power of the RF signal $406_1$ and that of the RF signal $407_1$, and calculates the gain $G_{PA1}$ of the power amplifier 401 at the carrier frequency $f_{c1}$ based on the power ratio between the RF signal $406_1$ and the RF signal $407_1$.

Subsequently, after the switch $508_1$ is opened, solely one of the switches $508_2$ to $508_n$ is closed in turn in the similar procedure. Thus, solely the RF signal on one carrier frequency out of the RF signals $406_2$ to $406_n$ on the carrier frequencies $f_{c2}$ to $f_{cn}$ is input in turn from the signal generator 402 to the power amplifier 401 via the terminal 404, and the gain of the power amplifier 401 is measured. In this manner, the gain $G_{PA2}$ to the gain $G_{PAn}$ of the power amplifier 401 at the carrier frequency $f_{c2}$ to the carrier frequency $f_{cn}$ are calculated in turn.

In the gain measuring mode shown in the block configuration diagram of FIG. 34, the switch $513_1$ to the switch $513_n$ are opened, and no signals are input to the amplitude detecting unit $503_1$ to the amplitude detecting unit $503_n$. In the gain measuring mode shown in the block configuration diagram of FIG. 34, none of the amplitude detecting unit $503_1$ to the amplitude detecting unit $503_n$, the variable gain amplifier $507_1$ to the variable gain amplifier $507_n$, the adder 514, and the peak detector 506 operate.

Further, as described above, similarly to FIGS. 24 and 25, FIGS. 35 and 36 each show the actual operation mode in which the RF signal $406_1$ on the carrier frequency $f_{c1}$ to the RF signal $406_n$ on the carrier frequency $f_{cn}$ are simultaneously input to the power amplifier 401, and n-signals, namely the RF signal $407_1$ to the RF signal $407_n$, are sent out from the power amplifier 401.

In the operation modes shown in FIGS. 35 and 36, similarly to FIGS. 24 and 25, the switch $513_1$, the switch $513_2$, . . . , and the switch $513_n$ are all closed, and connection to the peak detector 506 is established via the amplitude detecting unit $503_1$, the amplitude detecting unit $503_2$, . . . , the amplitude detecting unit $503_n$, the variable gain amplifiers $507_1$, $507_2$, . . . , $507_n$, and the adder 514. The peak detector 506 detects the peak value of the combined amplitude $G_1\{a_1(t)\}^2 + G_2\{a_2(t)\}^2 + \ldots + G_n\{a_n(t)\}^2$ of the signals input for a predetermined certain period.

Further, in the operation modes shown in FIGS. 35 and 36, similarly to FIGS. 24 and 25, the switch $513_1$, the switch $513_2, \ldots$, the switch $513_n$ are all closed, and connection to the peak detector 506 is established via the amplitude detecting unit $503_1$, the amplitude detecting unit $503_2, \ldots$, the amplitude detecting unit $503_n$, the variable gain amplifier $507_1$, the variable gain amplifier $507_2, \ldots$, the variable gain amplifier $507_n$, and the adder 514. The peak detector 506 detects the peak value of the signals $G_1\{a_1(t)\}^2 + G_2\{a_2(t)\}^2 + \ldots + G_n\{a_n(t)\}^2$ having been input for a predetermined certain period.

Here, in the operation modes shown in FIGS. 35 and 36 also, similarly to FIGS. 24 and 25, the gain $G_1$ to the gain $G_n$ of the variable gain amplifier $507_1$ to the variable gain amplifier $507_n$ are set such that the proportion of the gain $G_{PA1}$ to the gain $G_{PAn}$ of the power amplifier 401 at the carrier frequency $f_{c1}$ to the carrier frequency $f_{cn}$ agrees with the proportion of the gain $G_1$ to the gain $G_n$ of the variable gain amplifier $507_1$ to the variable gain amplifier $507_n$. In other words, the gain $G_1$ to the gain $G_n$ are set such that the relationship $G_{PA1}:G_{PA2}:\ldots:G_{PAn} = G_1:G_2:\ldots:G_n$ is established.

The setting of the gain $G_1$ to the gain $G_n$ of the variable gain amplifier $507_1$ to the variable gain amplifier $507_n$ in this manner allows the signal $G_1\{a_1(t)\}^2 + G_2\{a_2(t)\}^2 + \ldots + G_n\{a_n(t)\}^2$ input to the peak detector 506 to become proportional to the combined amplitude $\{a_{out1}(t)\}^2 + \{a_{out2}(t)\}^2 + \ldots + \{a_{outn}(t)\}^2$ of the RF signal $407_1$ to the RF signal $407_n$.

Accordingly, sensing of the peak value of the signals $G_1\{a_1(t)\}^2 + G_2\{a_2(t)\}^2 + \ldots + G_n\{a_n(t)\}^2$ input to the peak detector 506 is equivalent to sensing of the peak value of the combined amplitude $\{a_{out1}(t)\}^2 + \{a_{out2}(t)\}^2 + \ldots + \{a_{outn}(t)\}^2$ of the RF signal $407_1$ to the RF signal $407_n$ which are the output signals of the power amplifier 401. The setting of the gain in the above-described manner reflecting the frequency variations of the gain of the power amplifier 401 makes it possible to properly sense the peak value of the combined amplitude of the RF signal $407_1$ to the RF signal $407_n$ output from the power amplifier 401.

As described above, similarly to FIG. 24, the block configuration diagram of FIG. 35 shows the operation mode in a period during which the combined amplitude $G_1\{a_1(t)\}^2 + G_2\{a_2(t)\}^2 + \ldots + G_n\{a_n(t)\}^2$ obtained at the peak detector 506 exceeds a preset threshold value. In the operation mode shown in FIG. 35, the switch $521_1$ to the switch $521_n$ are closed to establish the routes through which the baseband signal $511_1$ to the baseband signal $511_n$ are input to the mixer $504_1$ to the mixer 504n via the limiter $522_1$ to the limiter $522_n$. The limiter $522_1$ to the limiter $522_n$ have the function of suppressing the amplitudes of the baseband signal $511_1$ to the baseband signal $511_n$ to be equal to or lower than the threshold value, when the amplitudes of the input baseband signals $511_1$ to $511_n$ exceed the threshold value.

By the routing by the switch $521_1$ to the switch $521_n$, in the period during which the combined amplitude $G_1\{a_1(t)\}^2 + G_2\{a_2(t)\}^2 + \ldots + G_n\{a_n(t)\}^2$ exceeds the preset threshold value, the amplitudes of the baseband signal $511_1$ to the baseband signal $511_n$ are suppressed to be equal to or lower than the threshold value by the limiter $522_1$ to the limiter $522_n$, and the baseband signal $511_1$ to the baseband signal $511_n$ are input to the mixer $504_1$ to the mixer 504n. Such an operation suppresses the amplitude peak value of the RF signal $406_1$ to the RF signal $406_n$ to be equal to or lower than the threshold value, whereby a reduction in the PAR (peak-to-average power ratio) can be realized.

On the other hand, as described above, similarly to FIG. 25, the block configuration diagram shown in FIG. 36 shows the operation mode in a period during which the combined amplitude $G_1\{a_1(t)\}^2 + G_2\{a_2(t)\}^2 + \ldots + G_n\{a_n(t)\}^2$ obtained at the peak detector 506 is lower than the preset threshold value. In the operation mode shown in FIG. 36, the switch $521_1$ to the switch $521_n$ are closed to establish routes through which the baseband signal $511_1$ to the baseband signal $511_n$ are directly input to the mixer $504_1$ to the mixer $504_n$ without being passed through the limiter $522_1$ to the limiter $522_n$.

By such routing by the switch $521_1$ to the switch $521_n$, in the period during which the combined amplitude $G_1\{a_1(t)\}^2 + G_2\{a_2(t)\}^2 + \ldots + G_n\{a_n(t)\}^2$ is lower than the preset threshold value, amplitude limitation by the limiter $522_1$ to the limiter $522_n$ on the baseband signals $511_1$ to $511_n$ and the RF signals $406_1$ to $406_n$ is not performed.

As has been described above, in the third variation of the second embodiment, whether or not amplitude limitation is performed for the RF signal $406_1$ to the RF signal $406_n$ by means of the limiter $522_1$ to the limiter $522_n$ is determined based on the relationship of the magnitude between the combined amplitude $G_1\{a_1(t)\}^2 + G_2\{a_2(t)\}^2 + \ldots + G_n\{a_n(t)\}^2$ and the preset threshold value. Through the amplitude limitation of the RF signal $406_1$ to the RF signal $406_n$ input to the power amplifier 401, limitation of the combined amplitude $\{a_{out1}(t)\}^2 + \{a_{out2}(t)\}^2 + \ldots + \{a_{outn}(t)\}^2$ of the RF signal $407_1$ to the RF signal $407_n$ at the output of the power amplifier 401, that is, a reduction in the PAR (peak-to-average power ratio), is performed.

In the foregoing, the structures of the preferred embodiments of the present invention have been described. However, the contents disclosed in Patent Literatures and the like noted above can be incorporated into the present invention by reference. The embodiments and the examples can be changed or adjusted within the scope of the entire disclosure of the present invention (including the claims) and based on the basic technical idea thereof. Further, various combinations or selections of any disclosed elements can be made within the scope of the claims of the present invention. That is, it goes without saying that the present invention includes any variations and modifications that can be made by a person skilled in the art based on the entire disclosure including the claims and the technical idea.

This application is based upon and claims the benefit of priority from Japanese patent application No. 2011-277032, filed on Dec. 19, 2011, the disclosure of which is incorporated herein in its entirety by reference.

INDUSTRIAL APPLICABILITY

The present invention can be applied to a terminal that performs wireless communication.

REFERENCE SIGNS LIST 1 input signal
1-1, 1-2, ..., 1-n input terminal
2 input signal
2-1, 2-2, ..., 2-n variable attenuator
4-1, 4-2, ..., 4-n phase detector
5-1, 5-2, ..., 5-n modulator
6 adding circuit
7 control circuit
8 output terminal
11 peak limiter
12 instantaneous power detecting unit
14 limiter unit
21 output signal
22 output signal
41 output terminal 50 carrier multiplexing circuit
51 serial/M parallel converter
51b output terminal
$51_1$ to $51_n$ code multiplex signal transmitting unit
52 16QAM/symbol converter
52a adding unit
52b output terminal
53 pilot symbol inserter
53a power amplifier
54 low-pass filter
56 quadrature modulator
56a amplitude control unit
$56a_2$ comparator
$56a_3$ selector
$56a_{1_1}$ to $56a_{1_n}$ multiplier unit
57 multiplexer
58 power amplifier
60 multiplexer circuit
61 code multiplex signal generating unit
62 peak suppressing unit
63 delay unit
64 filter
65 frequency shifting unit
66 transmission circuit
70 CDMA system
74A first transmission waveform
74B second transmission waveform
78 pilot portion
80 transmission apparatus
86 phase shifter
251, 252 matching circuit
311, 321, 331 power amplifier (PA)
312, 322, 332 power amplifier (PA)
401 power amplifier
402 signal generator
403 load
404, 405, 411, 412 terminal
406, 407 RF signal
$406_1, 406_2, \ldots, 406_n$ RF signal
$407_1, 407_2, \ldots, 407_n$ RF signal
413, 414 coupler
501 baseband signal generator
$501_1, 501_2, \ldots, 501_n$ baseband signal generator
502 delay adjuster
$502_1, 502_2, \ldots, 502_n$ delay adjuster
503 amplitude detecting unit
$503_1, 503_2, \ldots, 503_n$ amplitude detecting unit
504 mixer
$504_1, 504_2, \ldots, 504_n$ mixer
505 local oscillation (LO) signal generator
$505_1, 505_2, \ldots, 505_n$ local oscillation (LO) signal generator
506 peak detector
507 variable gain amplifier
$507_1, 507_2, \ldots, 507_n$ variable gain amplifier
508 switch
$508_1, 508_2, \ldots, 508_n$ switch
509 controller
510, 514 adder
$511_1, 511_2, \ldots, 511_n$ baseband signal
512 switch
$512_1, 512_2$ switch
513 switch
$513_1, 513_2, \ldots, 513_n$ switch
521 switch
$521_1, 521_2, \ldots, 521_n$ switch
522 limiter
$522_1, 522_2, \ldots, 522_n$ limiter

What is claimed is:

1. A transmission apparatus comprising at least a signal generator that generates RF (Radio Frequency) signals on a plurality of carrier frequency bands to be transmitted, and a power amplifier that amplifies the RF signals from the signal generator,
wherein the signal generator has a PAR reducing function of reducing a PAR (Peak-to-Average Ratio) that represents a ratio between a peak value and an average value in a combined amplitude obtained as a result of calculation in which an amplitude square value of the RF signal at each carrier frequency band is weighted with a specified gain and added with each other, the specified gain being based on a frequency characteristic of the power amplifier for each carrier frequency band.

2. The transmission apparatus according to claim 1, wherein the signal generator has, as the PAR reducing function, a function of setting a send-out timing of the RF signals to a timing specified for each of the carrier frequency bands.

3. The transmission apparatus according to claim 2, wherein
the signal generator further includes at least a plurality of baseband signal generators, delay adjusters as many as the number of the baseband signal generators, local oscillation signal generators as many as the number of the baseband signal generators, mixers as many as the number of the baseband signal generators, amplitude detecting units as many as the number of the baseband signal generators, variable gain amplifiers as many as the number of the baseband signal generators, at least one amplitude adder, at least one amplitude detector, at least one controller, and at least one RF signal adder,
the baseband signal generators send out the generated baseband signals of respective channels to the mixers directly or via the delay adjusters,
the local oscillation signal generators send out local oscillation signals on the respective carrier frequencies of the respective channels to the mixers,
the mixers mix the baseband signals of the respective channels with the local oscillation signals on the carrier frequencies of the respective channels to obtain RF signals of the respective channels, the mixers sending out the obtained RF signals to the RF signal adder directly or via the delay adjusters,
the RF signal adder sends out, to the power amplifier, an RF signal obtained by combining the RF signals of the respective channels,
the delay adjusters delay the baseband signals or the RF signals of the respective channels by a delay time specified by a control signal from the amplitude detector and send out the baseband signals or the RF signals to the mixers or the RF signal adder,
the amplitude detecting units detect the amplitude square values of the baseband signals or the RF signals of the respective channels and send out the detected amplitude square values to the variable gain amplifiers,
the variable gain amplifiers amplify or attenuate the amplitude square values of the baseband signals or the RF signals of the respective channels based on the specified gain values of the respective channels or the carrier frequency bands specified by the controller, and send the amplified or attenuated baseband signals or the amplified or attenuated RF signals to the amplitude adder,
the amplitude adder sends out, to the amplitude detector, an amplitude sum value obtained by adding the amplitude square values having been amplified or attenuated based on the specified gain values of the respective channels or the respective carrier frequency bands together, and the amplitude detector detects the amplitude sum value and outputs, to the delay adjusters, the control signal specifying the delay time at the delay adjusters as to the baseband signals or the RF signals of the respective channels so as to minimize the amplitude sum value.

4. The transmission apparatus according to claim 1, wherein the signal generator has, as the PAR reducing function, a function of limiting amplitude values of the RF signals to be equal to or smaller than a specified threshold value previously specified for each of the carrier frequency bands.

5. The transmission apparatus according to claim 4, wherein the signal generator further includes at least a plurality of baseband signal generators, switches as many as the number of the baseband signal generators, limiters as many as the number of the baseband signal generators, local oscillation signal generators as many as the number of the baseband signal generators, mixers as many as the number of the baseband signal generators, amplitude detecting units as many as the number of the baseband signal generators, variable gain amplifiers as many as the number of the baseband signal generators, at least one amplitude adder, at least one amplitude detector, at least one controller, and at least one RF signal adder, the baseband signal generators send out the generated baseband signals of respective channels to the mixers directly or via the switches or via the switches and the limiters, the local oscillation signal generators send out local oscillation signals on the respective carrier frequencies of the respective channels to the mixers, the mixers mix the baseband signals of the respective channels with the local oscillation signals on the carrier frequencies of the respective channels to obtain RF signals of the respective channels, the mixers sending out the obtained RF signals to the RF signal adder directly or via the switches or via the switches and the limiters, the RF signal adder sends out, to the power amplifier, an RF signal obtained by combining the RF signals of the respective channels, the switches switch between outputting, to the limiters, the baseband signals or the RF signals of the respective channels and outputting, to the mixers or the RF signal adder while bypassing the limiters, the baseband signals or the RF signals of the respective channels, based on a control signal specified by the amplitude detector, the limiters limit the amplitude values of the baseband signals or the RF signals of the respective channels input via the switches to be equal to or smaller than the specified threshold value and send out the baseband signals or the RF signals to the mixers or to the RF signal adder, the amplitude detecting units detect the amplitude square values of the baseband signals or the RF signals of the respective channels and send out the detected amplitude square values to the variable gain amplifiers, the variable gain amplifiers amplify or attenuate the amplitude square values of the baseband signals or the RF signals of the respective channels based on the specified gain values of the respective channels or the carrier frequency bands specified by the controller, and send the amplified or attenuated baseband signals or the amplified or attenuated RF signals to the amplitude adder, the amplitude adder sends out, to the amplitude detector, an amplitude sum value obtained by adding the amplitude square values having been amplified or attenuated based on the specified gain values of the respective channels or the respective carrier frequency bands together, and the amplitude detector detects the amplitude sum value, and outputs, to the switches, the control signal setting the switches to a state where the limiters are connected when the amplitude sum value exceeds a preset threshold value, the control signal setting the switches to a state where the limiters are bypassed when the amplitude sum value is equal to or smaller than the threshold value.

6. The transmission apparatus according to claim 1, wherein, as the specified gain value, a gain value of the power amplifier at each of the carrier frequency bands is employed.

7. The transmission apparatus according to claim 1, wherein the signal generator includes a controller that detects frequency characteristic of the power amplifier and specify the specified gain as appropriate for each of the carrier frequency bands based on the detected frequency characteristic of the power amplifier.

8. A wireless signal transmission method for generating RF (Radio Frequency) signals on a plurality of carrier frequency bands to be transmitted, and sending out the RF signals via a power amplifier, the wireless signal transmission method comprising:

reducing a PAR that represents a ratio between a peak value and an average value in a combined amplitude obtained as a result of calculation in which an amplitude square value of the RF signal at each carrier frequency band is weighted with a specified gain and added with each other, the specified gain being based on a frequency characteristic of the power amplifier for each carrier frequency band.

9. The wireless signal transmission method according to claim 8, wherein the wireless signal transmission method includes as the reducing PAR, a function of setting a send-out timing of the RF signal to a timing specified for each of the carrier frequency bands.

10. The wireless signal transmission method according to claim 8, wherein the wireless signal transmission method includes as the reducing PAR, a function of limiting amplitude values of the RF signals to be equal to or smaller than a specified threshold value previously specified for each of the carrier frequency bands.

11. The wireless signal transmission method according to claim 8, wherein, as the specified gain value, a gain value of the power amplifier at each of the carrier frequency bands is employed.

12. The wireless signal transmission method according to claim 8, further comprises:

detecting the frequency characteristic of the power amplifier, and specifying the specified gain as appropriate for each of the carrier frequency bands based on the detected frequency characteristic of the power amplifier.

* * * * *